United States Patent [19]

Schotz

[11] Patent Number: 5,491,839
[45] Date of Patent: Feb. 13, 1996

[54] SYSTEM FOR SHORT RANGE TRANSMISSION OF A PLURALITY OF SIGNALS SIMULTANEOUSLY OVER THE AIR USING HIGH FREQUENCY CARRIERS

[75] Inventor: Larry Schotz, Mequon, Wis.

[73] Assignee: L. S. Research, Inc., Cedarburg, Wis.

[21] Appl. No.: 70,149

[22] Filed: May 28, 1993

Related U.S. Application Data

[63] Continuation-in-part of Ser. No. 748,267, Aug. 21, 1991.
[51] Int. Cl.$^6$ ..................................................... H04B 7/00
[52] U.S. Cl. .............................. 455/66; 455/46; 455/103; 455/218; 381/79
[58] Field of Search .............................. 455/42, 59, 70, 455/76, 103, 112, 218, 221, 260, 66, 186.1, 129, 86, 6.3, 54.1, 39, 49.1, 179.1, 180.3, 183.1, 183.2, 202, 46; 381/14, 79, 77

[56] References Cited

U.S. PATENT DOCUMENTS

| | | |
|---|---|---|
| 3,256,389 | 6/1960 | Ehrich . |
| 3,471,646 | 2/1965 | Magnuski et al. . |
| 3,684,965 | 8/1972 | Gautney et al. ........................... 455/70 |
| 3,757,220 | 9/1973 | Abel .......................................... 455/42 |
| 3,787,772 | 1/1974 | Sedin . |
| 4,079,203 | 3/1978 | Dragoo . |
| 4,501,019 | 2/1985 | Matsukura et al. ....................... 455/76 |
| 4,586,081 | 4/1986 | St. Arnaud et al. . |
| 4,654,859 | 3/1987 | Kung et al. ............................... 455/76 |
| 4,704,715 | 11/1987 | Shibagaki et al. . |
| 4,710,970 | 12/1987 | Wu et al. . |

(List continued on next page.)

OTHER PUBLICATIONS

Brian C. Fenton Radio Electronics Editorial—Some Happenings at the FCC Jan. 1998.
Spec-Com-The Radio Amateur's Journal for Specialized Communications Sep./Oct. 1985.
NEC-General Purpose Dual Gate GaAs MESFET, NE25137, NE25139.
NEC-NPN Silicon High Frequency Transistor, NE856 Series.
Sanyo VCO Non-adjusting PLL FM MPX Demodulator with SNC, HCC Functions, Pilot Canceller for Car Stereos, LA3430.
Sanyo Monolithic Linear Integrated Circuit FM IF System, LA1235.
Siemens Coaxial Ceramic Resonators for UHF and Microwaves, Gundolf Kuchler.
RCA CMOS Analog Multiplexers/Demultiplexers, CD4051B, CD4052B, CD4053B Types.
RCA CMOS Ripple-Carry Binary Counter/Dividers, CD4020B, CD4024B, CD4040B Types.
Coaxial Ceramic Resonator Data Sheet—Murata Products for Mobile Telecommunications E-AMPS.

*Primary Examiner*—Reinhard J. Eisenzopf
*Assistant Examiner*—Nguyen Vo
*Attorney, Agent, or Firm*—Caesar, Rivise, Bernstein, Cohen & Pokotilow, Ltd.

[57] ABSTRACT

A transmitter/receiver system for the simultaneous transmission and reception of plural audio signals over the air for a short range using carrier signals of frequencies over 900 MHz. A combined signal having a plurality of carrier signals, each modulated by a different audio signal, is transmitted. The receiver, separated from the transmitter by a distance of 10 to 300 feet, receives the combined signal and the listener then selects one of the frequency modulated carrier signals in the combined signal at the receiver with a selector switch. One of a set of combined signals is selected at the transmitter, allowing for a choice of different frequencies for transmission, to avoid interference with other systems in the vicinity. Moreover, where predetermined, e.g., fault, conditions occur in the transmitter and/or receiver, muting circuits within the receiver are activated for the duration of the predetermined, e.g., fault, condition to silence the audio output signal to the listener and thereby prevent the thumping and hissing that a listener usually experiences during power transients and unlocked signal conditions.

38 Claims, 23 Drawing Sheets

U.S. PATENT DOCUMENTS

| | | |
|---|---|---|
| 4,829,570 | 5/1989 | Schotz . |
| 4,864,636 | 9/1989 | Brunius . |
| 4,922,483 | 5/1990 | Kobayashi . |
| 4,932,072 | 6/1990 | Toko ............................................. 455/76 |
| 4,951,006 | 8/1990 | Cohen . |
| 5,012,350 | 4/1991 | Streck et al. ............................... 455/66 |
| 5,046,132 | 9/1991 | Trefney . |
| 5,077,835 | 12/1991 | Margairaz et al. . |
| 5,106,826 | 4/1992 | Alford et al. ............................. 455/129 |
| 5,152,003 | 9/1992 | Poch .......................................... 455/66 |
| 5,155,590 | 10/1992 | Beyers, II et al. . |
| 5,216,378 | 6/1993 | Einbinder et al. ......................... 455/86 |
| 5,299,264 | 3/1994 | Schotz et al. .............................. 381/14 |

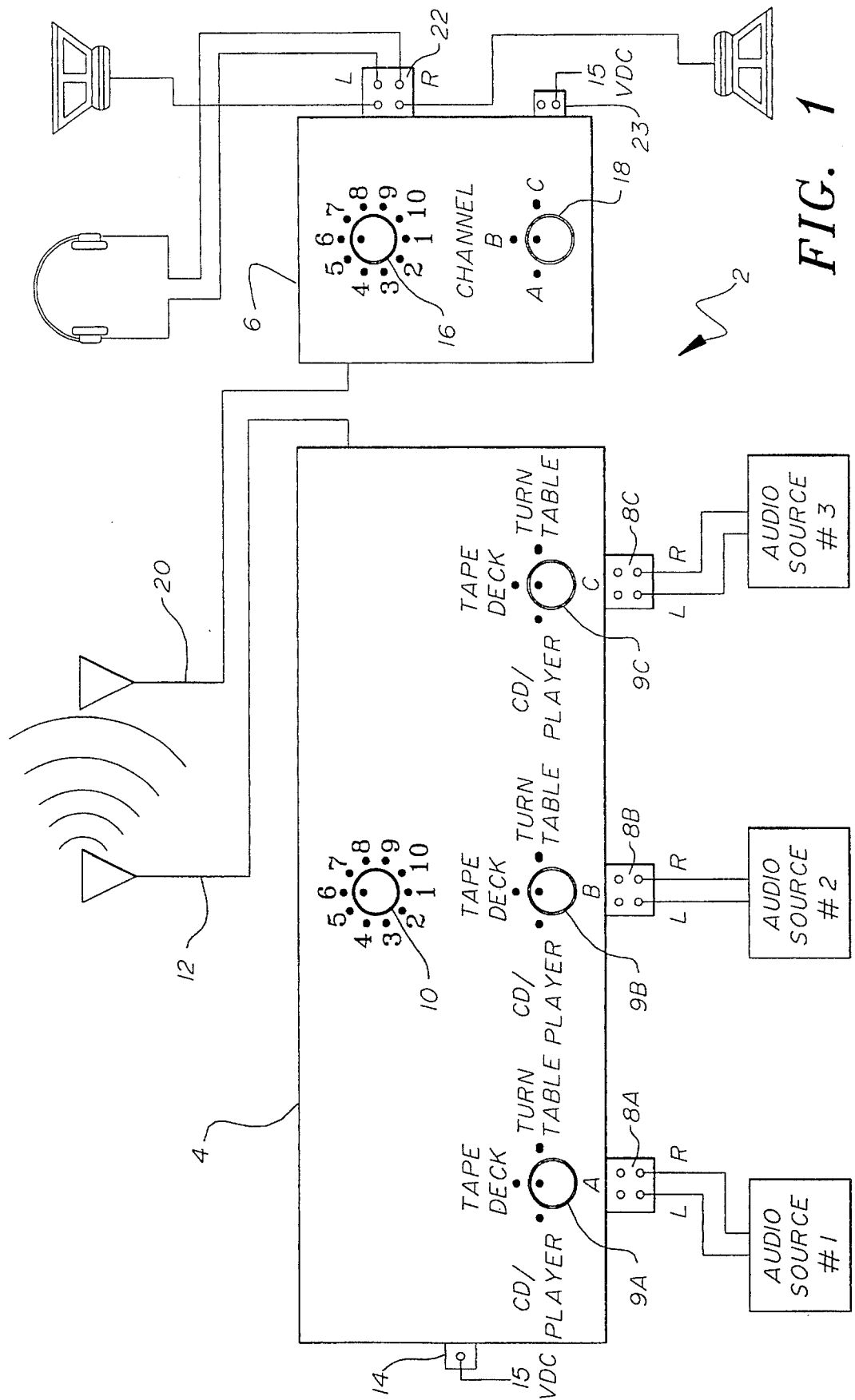

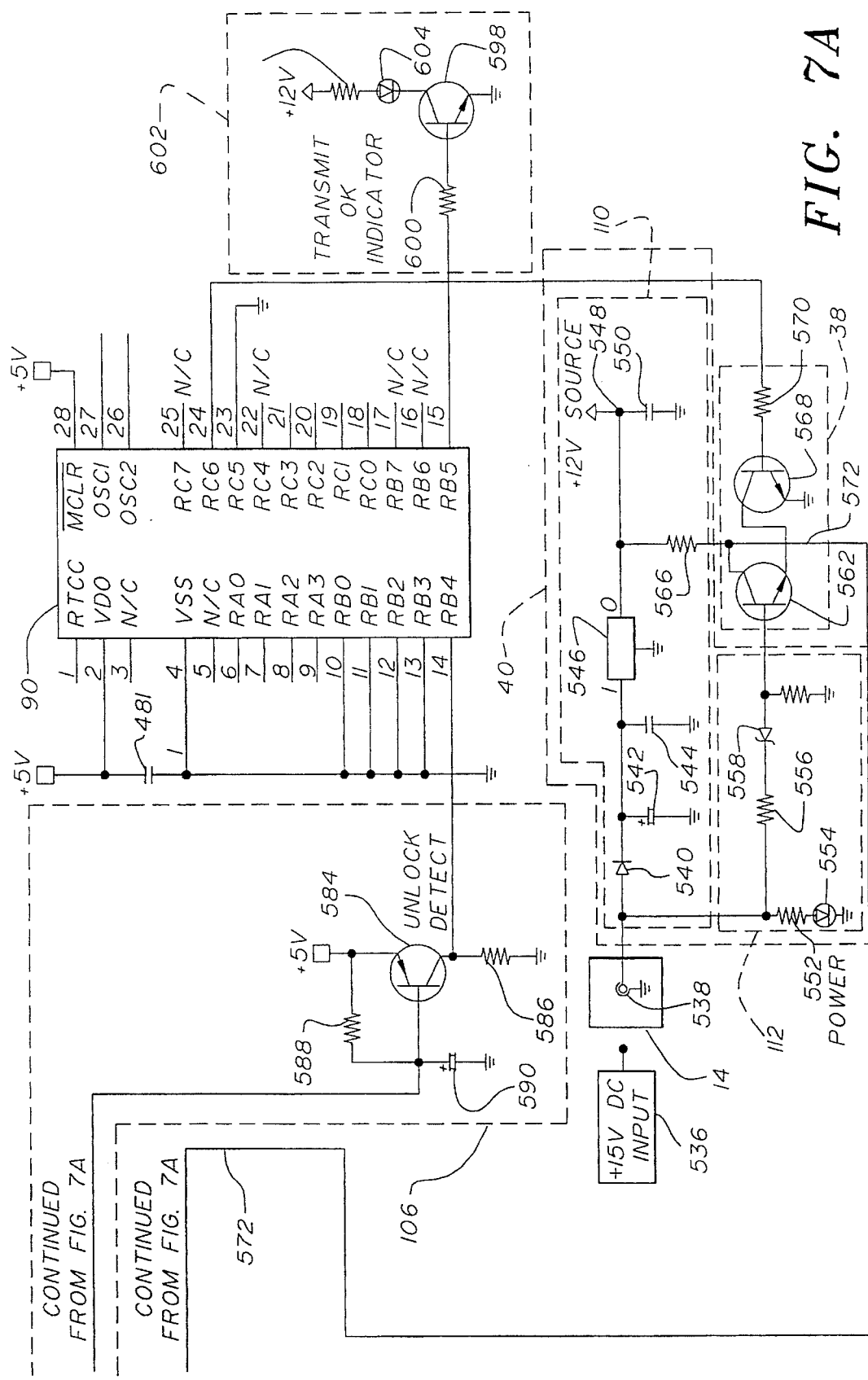

SYSTEM FOR SHORT RANGE TRANSMISSION OF A PLURALITY OF SIGNALS SIMULTANEOUSLY OVER THE AIR USING HIGH FREQUENCY CARRIERS

BACKGROUND OF THE INVENTION

This application is a Continuation-in-Part of application Ser. No. 07/748,267, filed Aug. 21, 1991, entitled System for Short Range Transmission of Signals Over the Air Using a High Frequency Carrier, assigned to the same assignee as this invention and whose disclosure is incorporated by reference herein.

The present invention relates generally to the transmission and reception of information such as analog or digital data signals over the air. More particularly, the present invention relates to the transmission over a short distance to a receiver of information over the air via the use of high frequency carriers (above 900 Mhz).

This invention provides for the simultaneous broadcast of more than one audio signal over a short distance using more than one carrier frequency above 900 MHz while giving the user the ability to manually select one of the audio sources.

An existing transmitter/receiver system is found in U.S. Pat. No. 5,106,826 (Alford et al.). The device disclosed by Alford uses a resonant cavity made of superconducting material which can be tuned to a particular resonant frequency in the frequency range of 10 MHz–2000 MHz. Alford suggests the possibility of a plurality of transmitters whose outputs can be combined for radiation by a single antenna, but not a single transmitter which generates a plurality of modulated carrier signals which are radiated simultaneously by a single antenna, as does the present invention.

Thus, a need exists for a system capable of simultaneously transmitting and receiving multiple signals over the air using high frequency carriers (above 900 MHz) while maintaining the quality of the signals.

OBJECTS OF THE INVENTION

Accordingly, it is a general object of this invention to provide a transmitter/receiver which overcomes the disadvantages of the prior art and meets that need.

It is another object of this invention to provide a transmitter that can receive the inputs of a plurality of audio sources and can simultaneously broadcast a plurality of audio signals over a short range.

It is still another object of this invention to provide a transmitter than can simultaneously broadcast a plurality of audio signals via a combined signal comprising carrier signals of frequencies of at least 900 MHz.

It is yet still another object of this invention to provide a transmitter local oscillator that is not susceptible to microphonics and poor signal-to-noise ratios by use of high impedance buffering coupled between the local oscillators and the transmitter antenna.

It is an additional object of this invention to provide a receiver that can simultaneously receive the combined signal of the plurality of audio signals broadcast by the transmitter, and can select one of the audio signals broadcast from the transmitter.

It is still an additional object of this invention to provide a receiver local oscillator that is not susceptible to microphonics and poor signal-to-noise ratios by use of high impedance buffering coupled between the local oscillator and the receiver antenna.

It is yet a further object of this invention to provide a method for alerting the receiver that a predetermined condition, e.g., failure, has occurred in the system and to mute the receiver until such predetermined condition has been corrected.

It is still a further object of this invention to provide a method for silencing the receiver when the receiver itself experiences a fault.

SUMMARY OF THE INVENTION

These and other objects of this invention are achieved by providing a system for transmitting and receiving plural, e.g., three, electrical signals, each representing a respective electrical input signal. Each electrical input signal may comprise a signal from a conventional audio source, e.g., a compact disk (CD) player, a tape deck, a turntable, or some other device.

The system basically comprises a transmitter and a receiver. The transmitter includes input means, carrier signal producing means, modulating means, combining means, and antenna means. The input means is arranged for receiving the plurality of the electrical input signals. The carrier signal producing means is arranged for providing at least a first group of carrier signals, with that group comprising a set of different carrier signals. Each of the carrier signals of the group is preselected and is different from the others of the group, and is at a frequency of at least 900 MHz.

The modulating means is coupled to the input means for modulating the carrier signals of the first group with respective ones of the plurality of input signals to produce a plurality of modulated carrier signals. The means for combining is coupled to the modulating means for combining the modulated carrier signals into a combined signal and for providing the combined signal to the antenna means. The antenna means radiates the combined signal over the air.

The receiver means is arranged for receiving the combined signal and for demodulating a selected one of the carrier signals in the group so that the input signal is extracted therefrom for reproduction by transducer means, e.g., a pair of headphones, coupled to the receiver means.

In accordance with one preferred aspect of this invention the transmitter means provides plural, e.g., ten, groups of different carrier signals, with each group of carrier signals comprising plural, e.g., three, carrier signals which are different from the other signals in that group and from the carrier signals in the other groups and are of a frequency of at least 900 MHz. First user-selectable means are provided in the transmitter means and in the receiver means to select a desired group of carrier frequencies for system operation. Second user-selectable means are provided in the receiver means to enable the user to select a desired carrier frequency of the selected group to be demodulated so that he/she can hear the audio signal extracted therefrom by such demodulation. The multiple groups of carrier frequencies available enables selection of a group of carrier frequencies which are different from those which may be used by another like system operating within the operating range of the system to ensure that there will be no interference by that other system.

BRIEF DESCRIPTION OF THE DRAWINGS

FIG. 1 is a block diagram of the overall transmitter/receiver system configured in accordance with this invention;

FIG. 5 is a schematic diagram of the multiplexing circuitry and the multiplexing control circuitry of the transmitter;

FIGS. 6A and 6B together make up a schematic diagram of the radio frequency circuitry with the microcontroller circuitry and the combination broadcast circuitry of the transmitter;

FIGS. 7A and 7B together make up a schematic diagram of the pilot signal kill circuitry, the unlock detect circuitry, the power circuitry and the transmit-ok-circuitry of the transmitter;

DETAILED DESCRIPTION OF THE PREFERRED EMBODIMENT

Figure 2A:
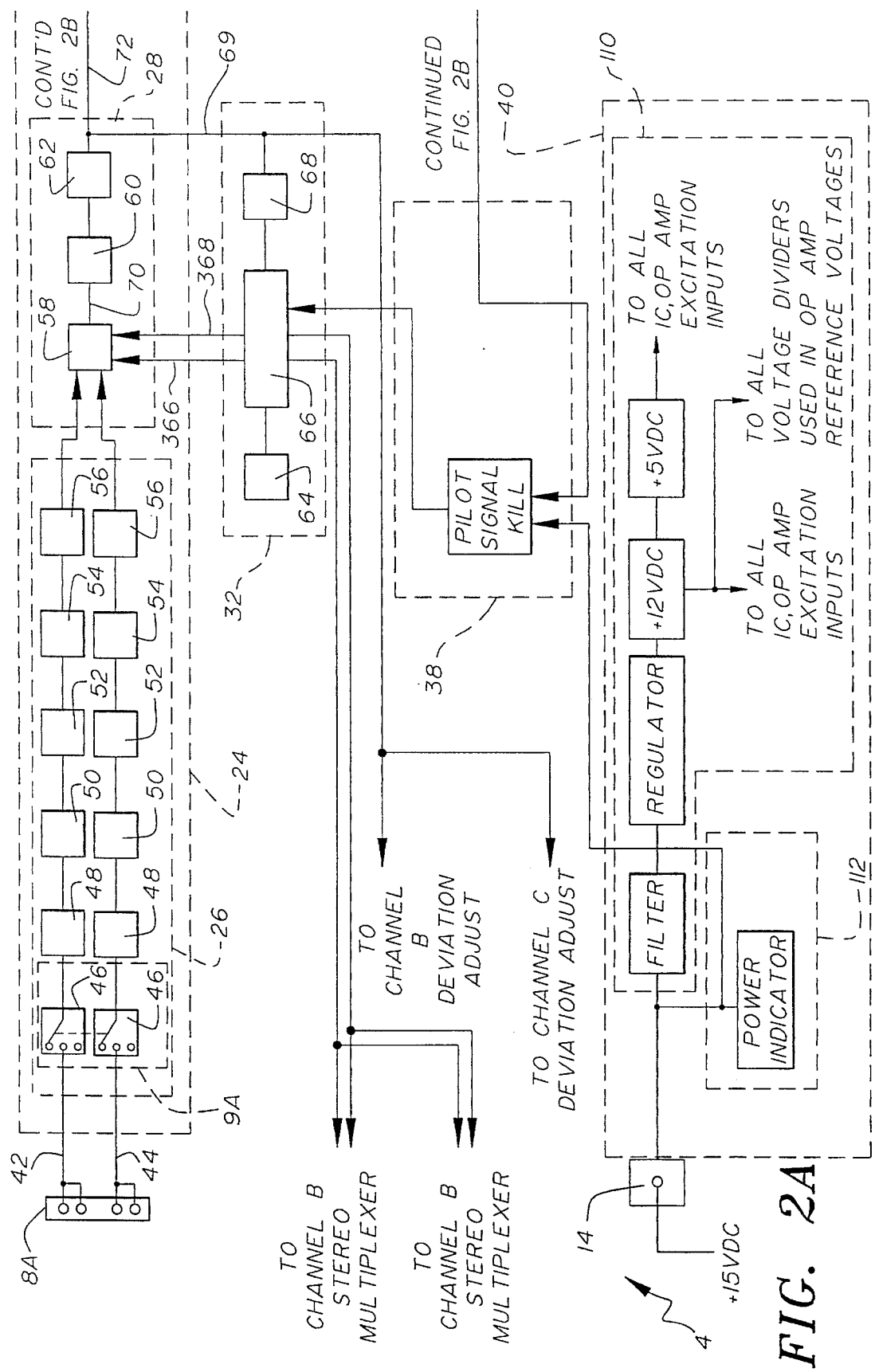
FIGS. 2A and 2B together make up a block diagram of the transmitter of the system.

Referring now in greater detail to the various figures of the drawings, wherein like reference numerals refer to like parts, there is shown in FIG. 1 the system 2 of the present invention. The system 2 comprises a transmitter 4 and a receiver 6. At the end of this Specification is an Appendix including Tables I and II. Table I in the Appendix sets forth exemplary component values and component and/or signal descriptions for all of the various components, signals, etc. of the system described hereinafter.

The transmitter 4 includes input connections 8A, 8B and 8C for audio input channels A, B and C, respectively, input level select switches 9A, 9B and 9C for audio input channels A, B and C, respectively, a 10-position house code select switch 10, a transmitting antenna 12 and a power connector 14. The three input channel connectors 8A, 8B and 8C accept left and right audio signals from three external audio sources, #1, #2 and #3, respectively. As will be explained later, breakout connections are available at each of the input connections to prevent dedicating each external audio source to the transmitter 4 only. The input level select switches 9A, 9B and 9C prevent the external audio sources from overloading the transmitter 4. The house code select switch 10 provides the user with ten combinations of three carrier frequencies at which the transmitter 4 will broadcast the channels A, B and C simultaneously, (one carrier frequency for each channel). The simultaneous broadcasting of the channels A, B and C is accomplished by the transmitting antenna 12. The transmitter 4 also includes a power connector 14 for +15 VDC and ground for power.

The receiver 6 also includes a 10-position house code select switch 16, a 3-position channel select switch 18, a receiving antenna 20, an audio output connector 22 and a power connector 23. Although FIG. 1 shows a pair of ear phones connected to the audio output connector 22, any other suitable audio transducer e.g., loudspeakers, can be used. The house code select switch 16 is set at the same position of the transmitter 4 house code select switch 10. Furthermore, by setting the 3-position channel select switch 18, the user can select one of the three channels being simultaneously broadcast by the transmitter 4. The transmitted signal is received by the antenna 20. The audio output connection 22 provides the user with a left and right audio output of the selected channel. As will be explained later, breakout connections are available at the audio output connection 22 to prevent dedicating the audio output to one listening device. The receiver 6 also includes a power connector 23 for +15 VDC and ground for power. Breakout connections for +15 VDC are also available at the power connector 23.

As will be described in detail below, the transmitter 4 is designed to independently process each audio input signal. The processing of the channel A, B and C signals occurs simultaneously. Each channel multiplexes the left and right audio signal from one audio source into one composite signal. This composite signal then modulates a carrier frequency, particular to a transmitter channel for each audio input signal. Three distinct channel carrier frequencies (three distinct frequencies selected within the range 902.8–926.8 MHz) are assigned to each channel by every position of the transmitter house code select switch 10 (see Table II). The three modulated carrier signals are then combined into one combined signal which is then transmitted. The result is that three modulated carrier signals are transmitted simultaneously in one combined signal.

As shown in Table II of the Appendix, the system has available ten groups of three distinct carrier frequencies, one carrier for channels A, B, and C, respectively.

The receiver 6 is designed to select one of the ten groups (by the user setting the receiver house code select switch 16 to the same setting of the transmitter house code select switch 10) and then to further select one of the three modulated carrier signals in that group (by the user setting the 3-position channel select switch 18). By doing this, the user is, in essence, selecting one of the three modulated carrier signals in the combined signal. The receiver 6 then processes the selected modulated carrier signal by appropriate mixing and filtering to filter out the composite signal. This composite signal is then demultiplexed into the original audio source's left and right audio signals.

As will be described in detail later, both the transmitter 4 and the receiver 6 are crystal controlled by use of microcontrollers and PLL (phase-locked-loop) synthesizers. This insures that the transmitter/receiver system 2 will never drift in operation. In particular, use of a synthesizer in the receiver 6 eliminates the need for several frequency demodulation functions necessary for conventional frequency demodulation, e.g., automatic frequency control (AFC) including buffering, centering tune indication, fine tune adjustment and oscillator AFC and tuning.

In addition, audio compression has been added to the transmitter 4 while audio expansion has been added to the receiver 6 which improves the audio signal-to-noise greater than 90 dB. Examples of suitable audio sources include phonographs, tape decks, stereo CD players and AM/FM tuners, where the destination is typically a loudspeaker, or ear phones.

While the embodiment given herein is described below in reference to the transmission of stereophonic audio signals which conventionally have been analog signals, the system is also usable for the transmission of digital stereophonic audio signals which may eventually replace analog audio signals for purposes of transmitting audio information. Furthermore, the system may be modified for purposes of transmitting digital data signals, without the use of data transmission wires, for such applications as transmitting digital data over short distances between computers, such as personal computers. By way of example, the system may be modified for the purpose of replacing the costly wiring in a computer network system with the ability to transmit digital data signals over the air. It should also be noted that although the preferred embodiment disclosed uses only three channels, more or less could be used.

Figure 2B:
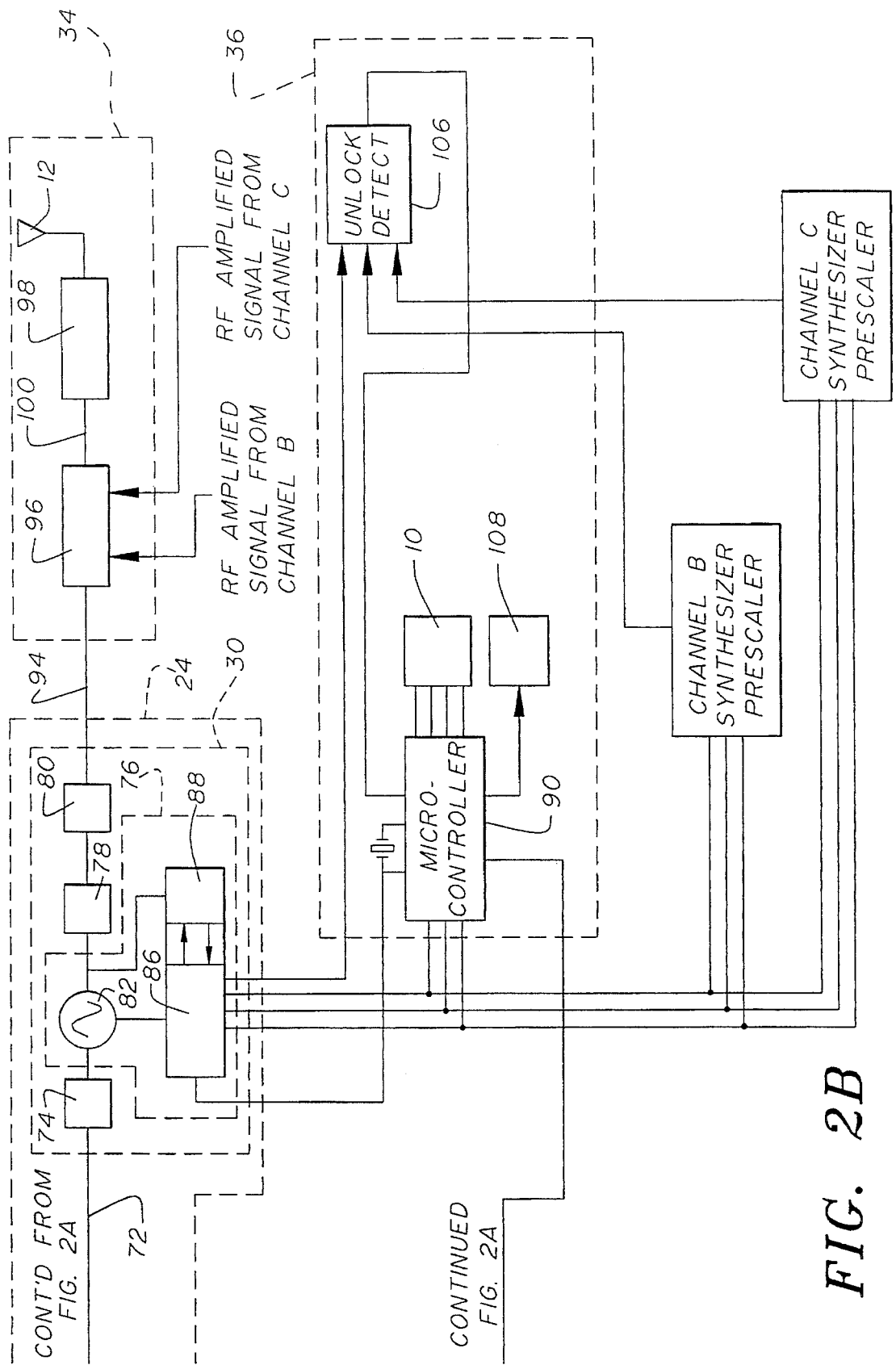

Referring to FIGS. 2A and 2B, the transmitter 4, shown in block diagram form, is depicted with only one channel 24 of the transmitter 4, it being understood that the other two channels are identical to the channel 24. The channel 24 includes audio input circuitry 26, multiplexing circuitry 28 and radio frequency (RF) circuitry 30. The transmitter 4 also includes the following circuitry: multiplexing control circuitry 32, combination broadcast circuitry 34, microcontroller circuitry 36, pilot kill circuitry 38 and transmitter power circuitry 40. The circuitry for transmitter 20 is illustrated in FIGS. 4A, 4B, 5, 6A, 6B, 7A and 7B and is described in further detail below.

The audio input circuitry 26 includes a left audio input 42 and a right audio input 44 for processing the left and right audio signals from one external source. The left and right output signals of a stereophonic audio signal source are applied to the inputs 42 and 44, respectively, via an appropriate arrangement such as conventional plug-in jacks located on one of the three input channel connectors 8A, 8B or 8C. The circuitry 26 also includes a input level select circuit 46, a buffer circuit 48, a low pass filter circuit 50, a gain circuit 52, a compression circuit 54 and a pre-emphasis circuit 56 associated with the left audio input 42 and the right audio input 46.

The audio signals at the channels 42 and 44 are first connected to the level select circuitry 46 which allows the level of the audio signals to be adjusted so that different output levels of various audio sources may be accommodated. The signals from circuits 44 are then sent to the buffering circuit 46. The buffering circuit 46 is designed to present a high input impedance and a low output impedance to the audio signals, which allows the transmitter 4 to operate without electrically loading the audio source coupled to the plug-in jacks. The filtering circuitry 50 provides a 20 kHz low pass filter for the audio signals. The low pass filter is used to attenuate high frequency noise, such as digital noise, present at the output jacks of such devices as low cost CD players. This is necessary to eliminate any beats with the 25 kHz pilot and also prevents problems due to the 50 kHz sampling frequency. The gain circuit 52 introduces an inverting gain of −1.

The output signals of the gain circuit 52 are applied to the compression circuitry 54. To avoid nonlinear distortion of the audio signals and cross-talk, companding is used to keep the left and right audio signal amplitudes within the linear operation of the transmitter 4 and the receiver 6. Companding is accomplished by using two nonlinear devices, a compressor in the transmitter 4 and an expander in the receiver 6. The compressor reduces the amplitude range of the input signal so that it falls within the linear range of the channel. The typical compressor uses a 2:1 compression ratio whereby the compressor output amplitude increases 1 dB for each 2 dB increase in input amplitude. The expander simply reverses this process.

The compressed audio signals from the compression circuitry 54 are connected to the pre-emphasis circuits 52. Transmitter pre-emphasis is a standard technique used to improve the signal-to-noise ratio of RF transmission schemes. Typically, the noise voltage output of an FM detector, resulting from phase noise modulation, increases directly in proportion to the frequency, or at 6 dB per octave. By introducing a filter after an FM detector to attenuate at 6 dB per octave, the noise spectrum can be leveled off, thus improving the signal-to noise ratio. A standard time constant of 50 microseconds (3.18 kHz) is typically used. 0f course, other de-emphasis time constants, such as 25 and 75 microseconds, may be used for different applications.

The multiplexing circuitry 28 includes the use of a stereo multiplexor circuitry 58, a buffer circuit 60 and a composite filter circuit 62. The multiplexing control circuitry 32 controls the stereo multiplexor circuitry 58 to convert the left and right audio signals into one composite signal. The stereo multiplexor 58 provides the time division multiplexing to allow the audio information from the left and right channels to be transmitted simultaneously on a common carrier. The multiplexing control circuitry 32 includes a 200 kHz oscillator circuit 64, a programmable frequency divider circuit 66 and a sine wave shaping circuit 68. The oscillator circuit 64 provides a stable 200 kHz square wave as a reference to programmable frequency divider circuit 66. The frequency divider circuit 66 divides down this reference signal into a 50 kHz and a 25 kHz square wave signal. The frequency divider circuit 66 uses the 50 kHz square wave to control left and right audio switches within each channel's stereo multiplexor circuitry 58 to accomplish time division multiplexing of the left and right audio signals into the composite signal 70. The frequency divider circuit 66 uses the 25 kHz square wave signal as means to control muting of receiver 6 under certain circumstances. The 25 kHz square wave signal is applied to the sine wave shaping circuit 68. The sine wave shaper 68 operates as a double integrator of the 25 kHz square wave to provide a 25 kHz sine wave pilot signal 69. This pilot signal 69 is transmitted along with each channel's RF amplified signal to be used in muting the receiver 6.

The composite signal 70 is applied to the buffer circuit 60. The buffer 60 includes low pass filtering to remove any high frequency harmonics generated during the multiplexing operation of the stereo multiplexor 58. The output of the buffer 60 is applied to the composite filter 62. The composite filter 62 is a low pass filter which converts the 50 kHz square wave switching rate, acquired during multiplexing in the stereo multiplexor circuitry 58, to a sine wave. By removing the third and fifth harmonics of the 50 kHz sine wave, the required transmission bandwidth of the system is reduced. The 25 kHz pilot signal is then added to each channel's filtered composite signal to form a tagged composite signal 72.

The radio frequency (RF) circuitry 30 includes a deviation adjust circuit 74, a local oscillator circuitry 76, an oscillator buffering circuit 78 and an RF amplifier circuit 80. The tagged composite signal 72 is applied to a deviation adjust circuit 74. The deviation adjust circuit 74 limits the maximum amplitude of the tagged composite signal 72. The output of the deviation adjust circuit 74 is then applied to the local oscillator circuitry 76 which modulates the frequency of the VCO (voltage controlled oscillator) module 82. The frequency of the VCO module 82 is controlled by a tuning voltage signal 84 which itself is determined by a synthesizer 86 in conjunction with a pre-scaler 88. A microcontroller 90 provides the synthesizer 86 with the necessary frequency data for FM modulation, as will be described later.

The output of the local oscillator circuitry 76 is applied to the oscillator buffering circuit 78. The oscillator buffering circuit 78 and the RF amplifying circuit 80 provide very high reverse isolation and prevent external impedance fluctuations at antenna 12 from being reflected back and phase modulating the local oscillator circuitry 76.

The output of the oscillator buffering circuit 78 is then applied to the RF amplifying circuit 80. The RF amplifying circuit 80 amplifies the output signal of the circuit 78 to provide the required output power to the antenna 12. Such amplification brings up the local oscillator output to the correct level allowed by the FCC. Thus, the one channel 24 RF amplified modulated signal 94 is ready for summation with the other two channels' RF amplified modulated signals.

The combination broadcast circuitry 34 includes a ferrite combiner circuitry 96, a bandpass filter 98 and the transmitter antenna 12. All channel RF amplified modulated signals 94 are summed in the ferrite combiner 96. The combiner 96 provides better balance and better isolation for all three channels rather than just summing all three channels at one point. The combined signal 100 is then applied to the bandpass filter 98. The bandpass filter 98 matches the high output impedance of the amplifying circuit 80 to the low impedance of the antenna 12. The filtering circuit 98 is also used to attenuate the upper harmonics of the output signal of the amplifying circuit 80. This filtering circuit 98 is configured to be impedance-matched to the antenna 12. The output electrical signal of the filtering circuit 98 is applied to the antenna 12. The antenna 12 radiates the modulated radio waves produced by the transmitter 4 such that they may be applied to the antenna 20 of the receiver 6.

The microcontroller circuitry 36 includes the microcontroller 90, the 10-position house code select switch 10, an unlock detection circuitry 106 and a transmit-ok-indication circuitry 108. Stored within the microcontroller 90's memory are data to be used by each channel frequency synthesizer in generating a particular carrier frequency. This data is grouped in ten groups of three distinct frequencies. As shown in Table II in the Appendix, this grouping corresponds to three particular channel frequencies (channel A, B and C) for each of the ten settings of the house code select switch 10. When the user pre-sets the house code select switch 10 to one of the ten positions and upon powering up the transmitter 4, the microcontroller 90 selects from memory the particular frequency data corresponding to the channel A, B and C carrier frequencies for that position of the transmitter house code select switch 10. The microcontroller 90 then transmits to each channel synthesizer the respective serial frequency data for that channel. The respective serial frequency data is used by the respective channel frequency synthesizer to generate the tuning voltage necessary for the respective VCO module to generate the particular carrier frequency for that channel.

The unlock detection circuitry 106 monitors all three channel synthesizers 86 to determine whether any one of the three synthesizers is unlocked. If just one of the three synthesizers 86 is in an unlocked condition, the unlock detection circuitry 106 transmits and an "unlock" condition to the microcontroller 90. In response, the microcontroller 90 issues a "pilot signal kill" command to the pilot kill circuitry 38.

The microcontroller 90 also monitors the transmitter 4 status by driving the transmitter-ok circuitry 108. The transmitter-ok circuitry 108 illuminates its associated indicator whenever all three channels indicate a locked signal status.

The pilot kill circuitry 38 commands the programmable frequency divider circuitry 66 to kill the 25 kHz pilot signal under certain circumstances so that the receiver 6 no longer detects the pilot signal during broadcast. The loss of the pilot signal to the receiver 6 causes the receiver 6 to mute both the left and right audio outputs until the pilot signal is restored. Muting the receiver 6 is conducted to avoid the "thumping" of the receiver 6 whenever the transmitter 4 loses power or whenever transmitter 4 is powered up. It is also muted whenever there is no signal lock on any channel.

The transmitter power circuitry 40 includes a regulator circuitry 110 and a power muting circuitry 112. The regulator circuitry 110 takes +15 VDC supplied from an external power source via the power connector 14 and provides a regulated +12 VDC for all operational amplifier, integrated circuit (IC) and transistor excitations. The regulator circuitry 110 also provides the excitation for every voltage divider where "+12 VDC" is indicated, including voltage dividers used as "½ supply (+6 VDC)" reference voltages as applied to the noninverting terminals of various operational amplifiers. The regulator circuitry 110 also provides the required +5 VDC where indicated. The signal ground or "ground" as used in this specification is with respect to ground as derived from the regulated +12 VDC.

The power muting circuitry 112 monitors the presence of +15 VDC provided by an external source. If the +15 VDC is lost, the power muting circuitry 112 issues a pilot signal kill command to the pilot kill circuitry 38. The power muting circuitry 112 also controls the power light emitting diode (LED) "Power Indicator" which illuminates whenever +15 VDC is applied to the transmitter 4 power jack.

Figure 3A:
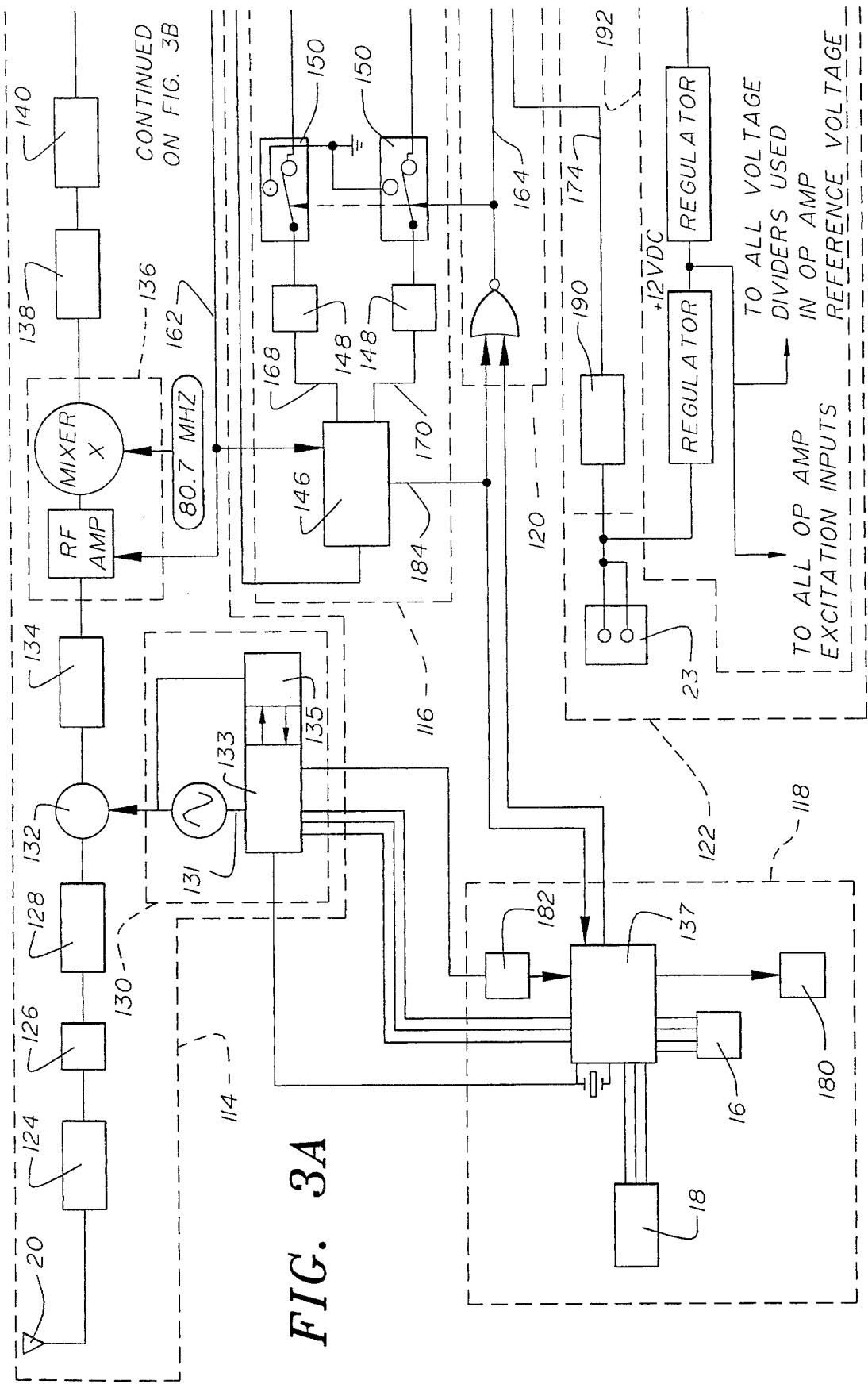
FIGS. 3A and 3B together make up a partial block diagram of the receiver used with the transmitter.
Figure 3B:
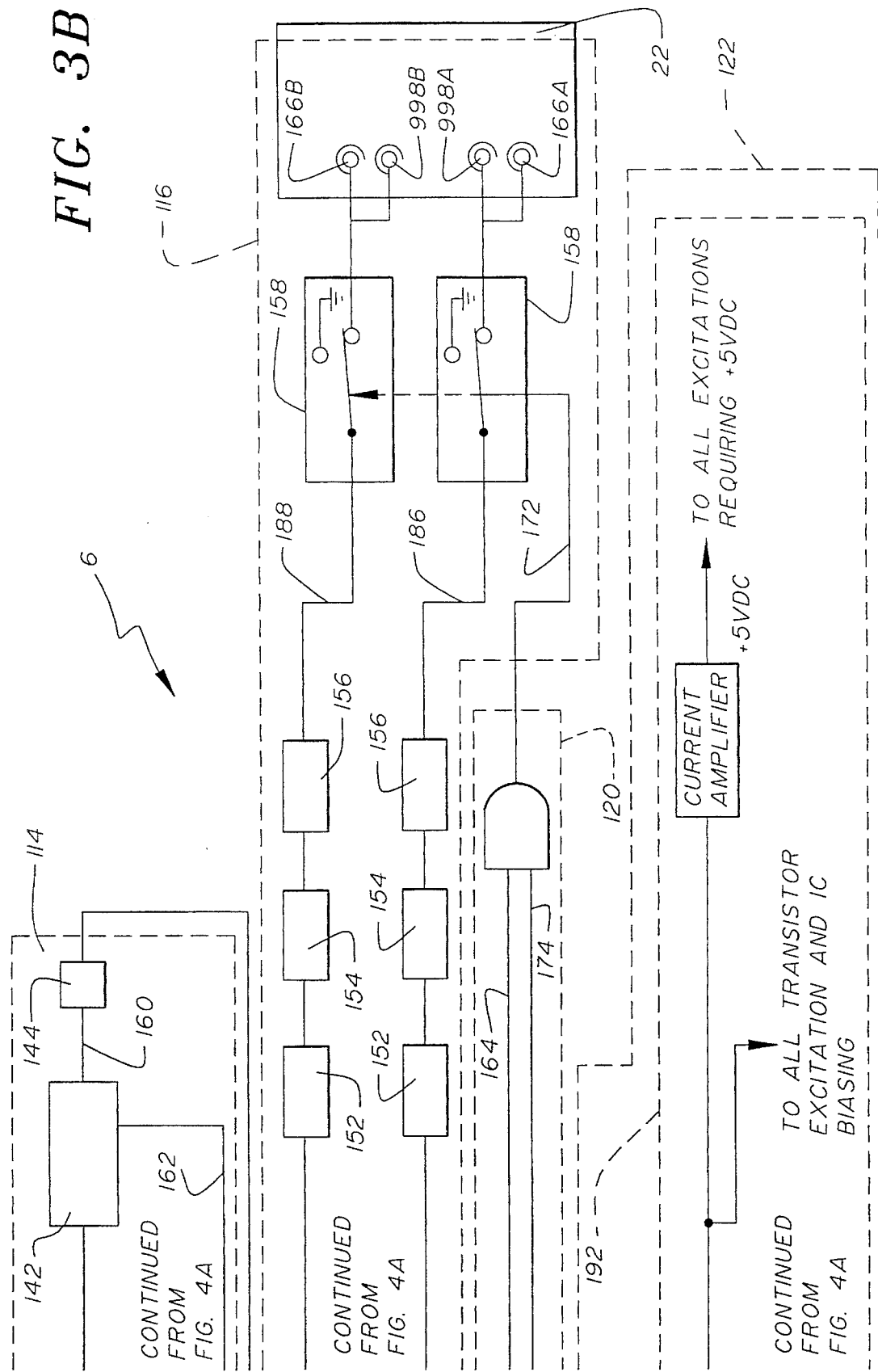

Referring to FIGS. 3A and 3B, the receiver 6, shown in block diagram form, includes an antenna matching and intermediate frequency (IF) circuitry 114 and a demultiplexing and audio output circuitry 116. The receiver 6 also comprises a microcontroller circuitry 118, a muting control circuitry 120 and a receiver power circuitry 122. The circuitry for the receiver 6 is illustrated in FIGS. 8A, 8B, 9A, 9B, 9C, 9D, 10A, 10B, 11A and 11B and is described in further detail below.

The antenna matching and IF circuitry 114 includes the antenna 20, a bandpass filter I 124, an RF amplifying circuit 126, a bandpass filter II 128, a local oscillator circuitry 130, a mixing I circuitry 132, a bandpass filtering III 134, a mixing II circuitry 136, a bandpass filter IV 138, a bandpass filter V 140, a quadrature detection circuitry 142 and a buffer circuitry 144. The receiver antenna 20 receives the radio waves radiated by the transmitter antenna 12 by way of the user presetting two switch mechanisms, located on the receiver 6, which select the particular local oscillator frequency downstream of the antenna 20. In response to the reception of the combined signal, the antenna 20 applies an electric signal to the bandpass filter I 124. This circuit 124 matches the impedance of the antenna 20 to the impedance of the RF amplifying circuit 126. The output signal of the circuit 124 is provided at high gain by the amplifying circuit 126, which then applies the signal to the bandpass filter II 128. The RF amplifying circuitry 126 provides a high level signal for driving the mixing I circuit 132. The bandpass filter II 128 provides high reverse isolation, low noise and low input capacitance. The amplified output signal from the circuit 126 is filtered by the bandpass filter II 128 prior to application to the mixing I circuit 132. The bandpass filter II 128 filters the output of the RF amplifying circuit 126 to select the specific signals to which the receiver 6 is set.

The filtered and amplified signal from the bandpass filter II 128 is applied to the mixing I circuit 132. Additionally, the output signal of the local oscillator circuitry 130 is applied to mixing I circuit 132. The frequency of the local oscillator circuitry 130 is controlled by the tuning voltage signal 131, which itself is determined by the synthesizer 133 in conjunction with the prescaler 135 and frequency data provided by the microcontroller 137. The circuit 132 mixes this output signal from the local oscillator circuitry 130 and the output from the filter circuit 128 to produce a signal whose frequency is 70 MHz and is known as the "first IF" signal. The "first IF" signal from the circuit 132 is the difference between the signals from the circuits 128 and 130. The signal from the bandpass filter II 128 includes a carrier component (e.g., 902.8–926.8 MHz) which is offset from (typically greater than) the output signal of local oscillator circuitry 130 by an offset frequency. In this preferred embodiment, the offset is the "first IF" of 70 MHz. This mixing process is commonly referred to as a hetrodyne process. Because of the use of a dual gate GaAsFET as the mixer, this mixer also provides high reverse isolation, low noise, and low input capacitance.

The first IF output signal from the mixing I circuitry 132 is applied to a bandpass filter III 134. The bandpass filter III 134 is a selective filter which filters the first IF signal to produce a filtered output signal which may be centered about an IF frequency, e.g., 70 MHz. The filtered output signal of the bandpass filter III 134 is applied to a mixing II circuitry 136 which acts as an RF amplifier and second mixer. The mixing II circuitry 136 includes a crystal oscillator running at 80.7 MHz to provide an output a signal of that frequency. Upon mixing the filtered output signal of the bandpass filter III 134 with the 80.7 MHz signal, the result is a "second IF" signal whose frequency is 10.7 MHz, a typical IF frequency. The "second IF" signal from the mixing II circuitry 136 is the difference between the signals from the circuit 134 and the crystal oscillator signal of 80.7 MHz and is applied to a bandpass filter IV 138 and a bandpass filter V 140. Those components provide the necessary selectivity- the measure of the extent to which the receiver 6 is capable of differentiating between the desired signal and disturbances at other frequencies. This filtered output signal of the circuit 140 is applied to a quadrature detection circuitry 142 for frequency demodulation.

The quadrature detection circuitry 142 acts first as an IF amplifier to boost the filtered output signal of the circuit 142 and then uses quadrature detection techniques to derive the composite signal 160. The composite signal 160 is then applied to a buffering circuit 144. The buffering circuit 144 amplifies the composite output signal and provides the correct signal level to a multiplex stereo decoder circuitry 146. The quadrature detection circuitry 142 also outputs a strength indicating signal 162 directly to the multiplex stereo decoder circuitry 146 and also back to the RF amplifier portion of the mixing II circuitry 136.

The composite signal 160 and the strength indicating signal 162 are applied to demultiplexing and audio output circuitry 116. The demultiplexing and audio output circuitry 116 includes multiplex stereo decoder circuitry 146 which has a left audio signal output 168 and a right audio signal output 170. The circuitry 116 also includes a low pass filter 148, a first muting circuitry 150, a compandor input adjust 152, a de-emphasis circuitry 154, an expander circuitry 156 and a second muting circuitry 158. One of the circuits 148, 150, 152, 154, 156 and 158 is associated with the left audio signal output whereas the other of circuits 148, 150, 152, 154, 156 and 158 is associated with the right audio signal output.

The multiplex stereo decoder circuitry 146 uses a phase-locked loop (PLL) multiplex decoder to demultiplex the amplified composite signal back into a left signal 168 and a right signal 170. Based upon the strength indicating signal 162, the multiplex stereo decoder circuitry 146 provides blending of a left audio signal at the left audio output and a right audio signal at the right audio output for the purpose of providing noise cancellation under weak signal conditions to improve the signal-to-noise ratio. To remove any pilot or multiplexing by-products, these two output signals are passed through low pass filters 148. Following the filtering of the two signals, these signals are applied to a buffering and de-emphasis circuitry 154. The de-emphasis circuitry 154 provides 50 microsecond de-emphasis to compensate for the pre-emphasis applied in the transmitter 4. The first muting circuitry 150 provides partial muting during absence of signal. A first mute command signal 164 is derived from both a signal strength detector and a pilot detector. This prevents any false signals from being received because it would be unlikely for another product to have a 25 kHz pilot.

The left 168 and right 170 output signals pass through their respective expander circuits 156. Each such circuit is set up to complement the associated compressor circuitry 54 of the transmitter 4. The output of each expander circuit 156 is connected to a conventional audio output jack, providing a left audio signal 186 to output jacks 166A and 998A and a right audio signal 188 to output jacks 166B and 998B whenever the second muting circuitry 158 is inactive.

The second muting circuitry 158 provides final muting of the left 186 and the right 188 audio signals just prior to user reception. A second mute command signal 172 is derived from both a first mute command signal 164 and a power presence signal 174. The second muting circuitry 158 is mostly used to avoid the "thumping" sound that occurs in the external speakers whenever the receiver 6 power is lost or rapidly changes. The first mute command signal 164 can also drive the second muting circuitry 158 despite the presence of power to receiver 6.

The microcontroller circuitry 118 includes the microcontroller 137, the 10-position house code select switch 16, the 3-position channel select switch 18, a signal-ok indicator circuitry 180 and an unlock detect circuitry 182.

Stored within the microcontroller 137's memory are data for thirty unique frequencies. This data is grouped in ten groups of three distinct frequencies. As shown in Table II, this grouping corresponds to three particular channel frequencies (channel A, B and C) for each of the ten settings of the receiver 6's house code select switch 16. To operate the overall system correctly, the user must set the receiver house code select switch 16 to the identical setting of the transmitter house code select switch 10. By doing so and upon power up of receiver 6, microcontroller 137 reads both the setting of the house code select switch 16 and the setting of the 3-position channel select switch 18 to select the frequency data corresponding to the one particular frequency to which the receiver 6 is set. The microcontroller 137 then sends serial data for the one particular channel selected to the synthesizer 133.

The microcontroller 137 also monitors the receiver 6 status by driving the signal-ok indicator circuitry 180. The indicator "signal ok" is illuminated whenever there is both signal lock and the presence of a stereo signal (i.e., the pilot signal is present).

The microcontroller 137 works with the phase-locked loop (PLL) synthesizer 133 through the unlock detect circuitry 182 to insure that the transmitter/receiver system 2 never drift. The microcontroller 137 also drives the muting control circuitry 120. The multiplexor stereo decoder circuitry 146 constantly sends a pilot status signal 184 to the microcontroller 137. Based on this signal, the microcontroller 137 activates the muting circuitry 120 to temporarily mute the left 168 and right 170 signals.

The receiver power circuitry 122 includes a muting control path 190 and a regulator path 192. The muting control path 190 contains circuitry to control the secondary muting circuitry 158. The regulator path 192 includes regulators and filtering for providing +12 VDC, +9 VDC and +5 VDC to all operational amplifier excitation, all voltage dividers and all transistor and IC (integrated circuit) excitation.

FIGS. 4A–7B constitute the schematic circuit diagrams for the transmitter 4, while FIGS. 8A–11B constitute the schematic circuit diagrams for the receiver 6.

Both the transmitter 4 and the receiver 6 operational amplifiers utilize +12 VDC at their positive voltage supply terminal and ground at their negative voltage supply terminal. As such, half power supply voltage (+6 VDC) is utilized as the reference voltage applied to their respective noninverting terminals where the operational amplifiers are configured in a single signal input mode. These reference voltages are obtained from voltage dividers consisting of two identical series resistors tied between the regulated +12 VDC power and ground. The +6 VDC is obtained from the common tie point of the two series resistors. Also tied to that common tie point is a capacitor that helps filter out (or decouple) power supply noise from reaching the noninverting input.

Both the transmitter 4 and the receiver 6 also utilize electrolytic input capacitors in series with various inputs to block any DC or low frequency noise from propagating through the system 2.

The details of the transmitter circuitry will now be discussed. As a note, since the transmitter 4 channels A, B and C are identical up to the ferrite combiner circuitry 94, the detailed circuitry for one channel 24 only will be discussed. In the preferred embodiment, up to three external audio sources can be simultaneously connected to the inputs of the transmitter 4.

Figure 4A:
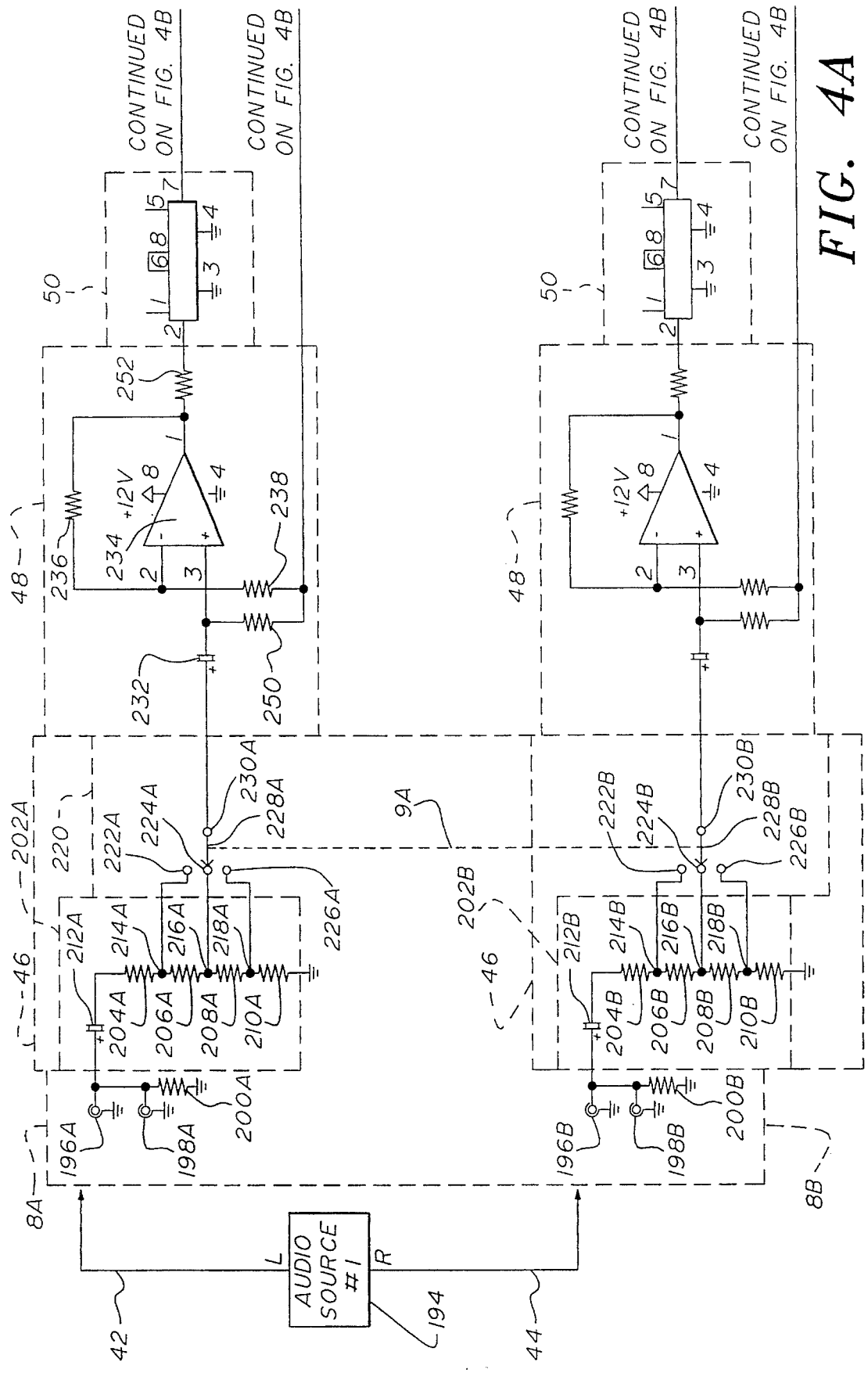
FIGS. 4A, 4B and 4C together make up a schematic diagram of the audio input circuitry of the transmitter.
Figure 4B:
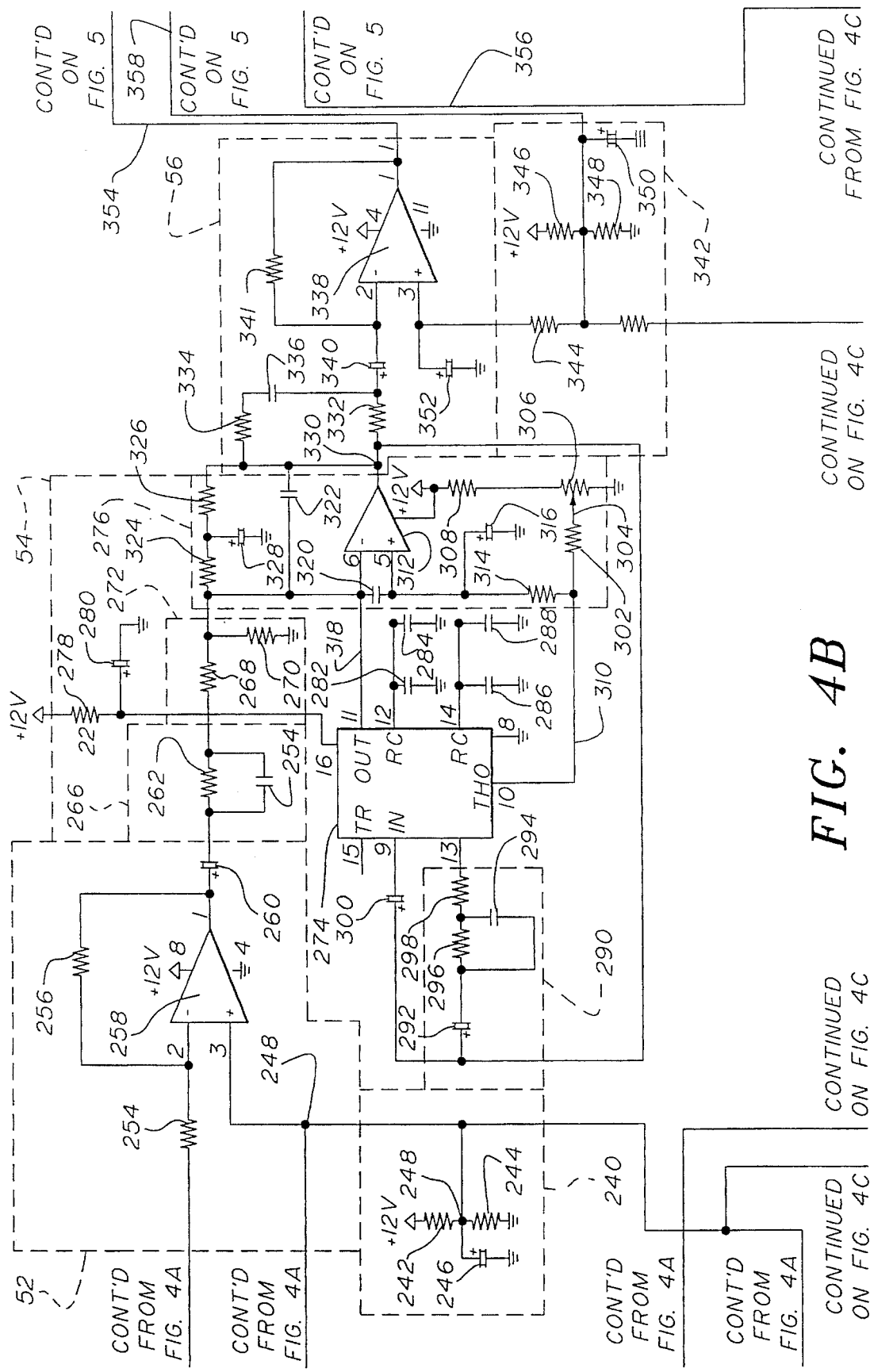
Figure 4C:
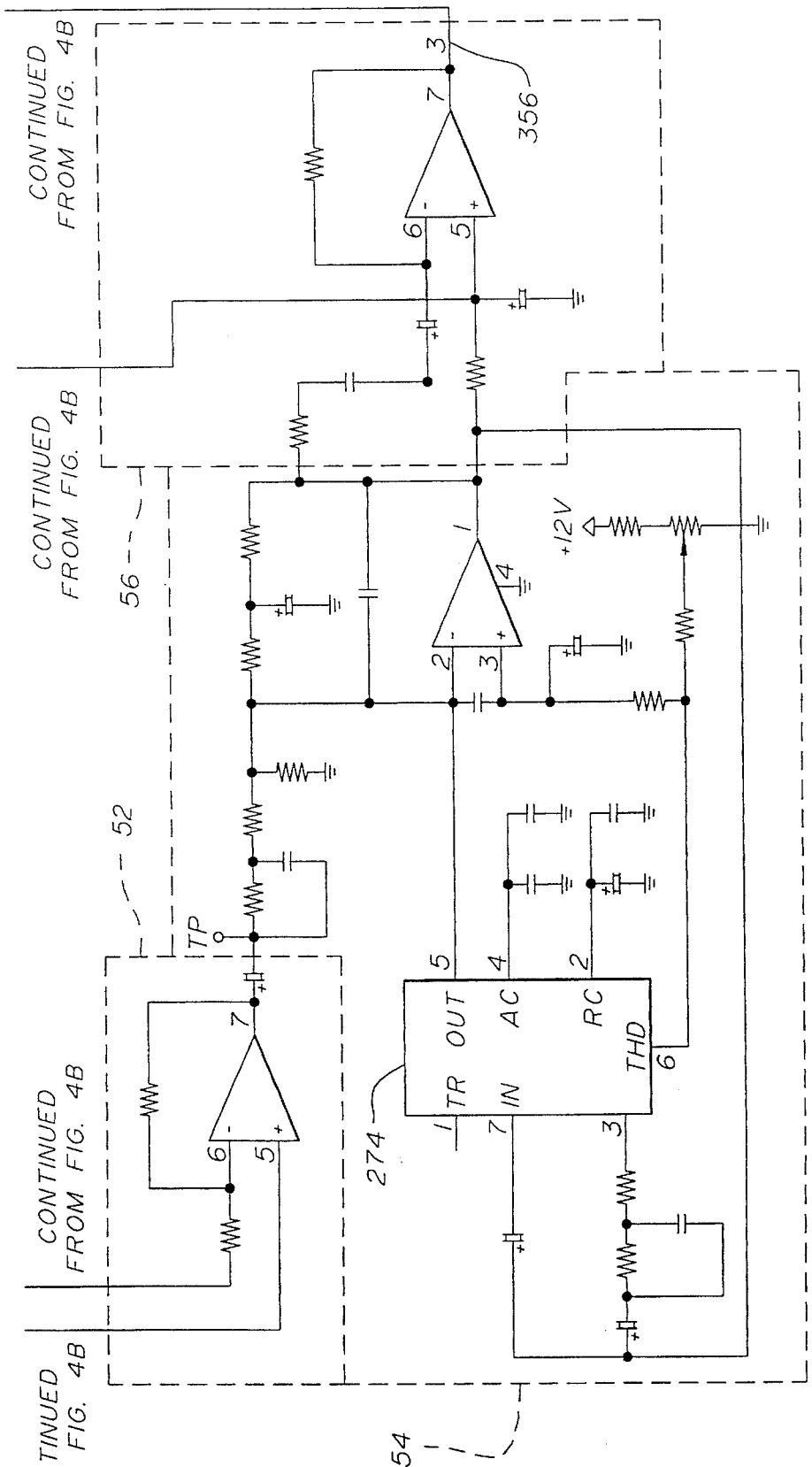

Referring to FIG. 4A–4C, FIGS. 4A–4C illustrate the transmitter 4 audio input circuitry. In FIG. 4A, the left 42 and right 44 audio inputs from one external audio source 194 are connected to the transmitter 4 by way of conventional plug-in jacks 196A and 196B, respectively. The plug-in jacks 198A and 198B, known as breakout jacks, permit the extraction of the left 42 and the right 44 audio input signals for other use by the user. Without these, the left 40 and right 42 input audio signals from the external source 194 would be totally dedicated to the transmitter 4. For example, the user may want to connect the audio source 194 to a tape deck to record, while simultaneously listening to the audio source 194 over the receiver 6. The plug-in jacks 196A and 198A are both tied to a resistor 200A whose other end is coupled to ground, while the plug-in jacks 196B and 196B are both tied to a resistor 200B whose other end is coupled to ground.

To avoid the audio source overloading the transmitter 4, it is necessary to attenuate the left 40 and right 42 audio input signals through the input level select circuitry 46. Because the type of the external audio source 194 that can be connected to the transmitter may vary, the left 42 and right 44 audio signal input voltages to the transmitter 4 from the audio source 194 can be either 0.15 volts, 1.0 volts or 5.0 volts. Each of these input voltages requires a different level of attenuation. Identical attenuation of the left 42 and right 44 audio signal input pair is accomplished by the use of two identical attenuators 202A and 202B for the left 42 and the right 44 audio input signals, respectively.

The attenuator 202A consists of the resistors 204A, 206A, 208A and 210A connected in series, with one end of the resistor 210A connected to ground. The left audio jacks 196A and 198A and the resistor 200A are connected to the attenuator 202A through a coupling capacitor 212A located at the input of the attenuator 202A. The other side of the capacitor 212A is connected to the resistor 204A. Pick-off points 214A, 216A and 218A provide the necessary voltage attenuation for the left input voltage. Similarly, the right audio jacks 196B and 198B and the resistor 200B are connected to the attenuator 202B through a coupling capacitor 212B located at the input of the attenuator 202B. The attenuator 202B consists of resistors 204B, 206B, 208B and 210B connected in series, with one end of the resistor 210B connected to ground. The other side of the capacitor 212B is connected to the resistor 204B. Pick-off points 214B, 216B and 218B provide the necessary voltage attenuation for the right audio input voltage. The attenuation voltage at the pick-off points 214A and 214B are identical, as is the attenuation voltage at the pick-off points 216A and 216B and as is the attenuation voltage at the pick-off points 218A and 218B.

Each attenuator pick-off point is connected to the input level selector switch 9A. The input level selector switch 9A gives the user the ability to select the appropriate attenuation voltages for any one left and right audio channel pair. In order to be able to manually select anyone of three possible attenuation voltages for both the left and right audio signal input pair simultaneously, a double pole-triple throw switch is provided and comprises a pair of movable arms or levers 228A and 228B and stationary contacts or terminals 222A, 224A, 226A, 222B, 224B, 226B, 230A and 230B. The attenuator 202A's three pick-off points 214A, 216A and 218A are connected to the level selector switch 9A terminals 222A, 224A and 226A, respectively. Similarly, the attenuator 202B's three pick-off points 214B, 216B and 218B are connected to the level selector switch 9A terminals 222B, 224B and 226B, respectively.

The switch's movable contact or lever 228A is mechanically connected at one end to a left audio pole or contact 230A while the other end of the lever 228A rests on one of the three terminals 222A, 224A or 226A. Similarly, the switch's movable contact or lever 228B is mechanically connected at one end to a right audio pole or contact 230B while the other end of the lever 228B rests on one of the three terminals 222B, 224B or 226B. The switch's levers 228A and 228B are mechanically connected such that activating the input level selector switch 9A causes identical motion of the switch levers 228A and 228B. Thus, when the user activates the input level selector switch 9A, the left and right audio input channel pair signals will be identically attenuated.

At this point, there is no other coupling, mechanical or electrical (except for common use of voltage dividers for reference voltages used at the noninverting terminals of different operational amplifiers) of the left and right audio input signals 42 and 44, and as such the following electrical circuit description will focus only on left audio input signal processing; it being understood that right audio input signal processing is identical, unless otherwise indicated.

Following the attenuation of the left audio signal by way of the input level selector switch 9A, the left audio signal is buffered by the buffer circuit 48. The coupling capacitor 232 isolates any DC signal from the level selector switch 9A output. The circuit 48 input utilizes a noninverting gain configuration to provide a +2 DC gain to the left audio input signal. The left audio signal is applied to the noninverting terminal of the operational amplifier 234. A feedback resistor 236 is connected between the inverting terminal of the operational amplifier 234 and its output. A resistor 238 is connected between the inverting terminal of the operational amplifier 234 and a voltage divider 240 (FIG. 4B) The buffered output is sent through an output resistor 252.

Referring to FIG. 4B, the voltage divider 240 provides a 6VDC reference voltage to the noninverting terminal of the operational amplifier 234. The voltage divider 240 consists of resistors 242 and 244 connected in series between +12VDC and ground. A filtering capacitor 246 connects the tie point 248 of the resistors 242 and 244 to ground. The tie point 248 provides the +6VDC reference voltage. Also note that the tie point 248 is connected to the noninverting terminal of the operational amplifier 234 through a resistor 250. Application of the voltage divider 240 to the signal input line is to avoid latch-up.

The voltage divider 240 also supplies the reference voltage used in the buffering circuit for right audio signal processing.

Following the buffering circuit 48, the left audio signal is then applied to the low pass filter circuitry 50 to filter out any audio frequency above 20 kHz. This is necessary to eliminate any beats with the 25 kHz pilot (the sine wave shaping circuitry 68) and also prevents problems due to the 50 kHz sampling frequency (the frequency divider circuitry 66).

The filtered left audio signal is then applied to the gain circuit 52 (FIG. 4B). The circuit 52 utilizes an inverting gain configuration to provide a −1 gain to both the left audio input signal. The left audio signal is applied to the circuit 52 through a resistor 254 which is connected to the inverting terminal of an operational amplifier 258. A feedback resistor 256 is connected between the inverting input of the operational amplifier 258 and its output. The voltage divider 240 again supplies the reference voltage to the noninverting terminal of the operational amplifier 258. The voltage divider 240 also supplies the equivalent reference voltage used in the gain circuit for right audio signal processing. A coupling capacitor 260 is connected between the output of the gain circuit 52 and the following compressor circuitry 54 stage.

Following the gain circuit 52, the left audio signal is ready to be compressed by the compressor circuitry 54. Just prior to signal compression, the left audio signal is filtered by a filter 266 consisting of a resistor 262 and a capacitor 264 connected in parallel. This filtered left audio signal is then voltage divided between a resistor 268 and a resistor 270, forming a voltage divider 272. The resistor 268 is connected between the output of the filter 266 and one side of the resistor 270. The resistor 270 is connected at its other end to ground. Both the filter 266 and the voltage divider 272 configure the left audio signal for input into the compressor circuitry 54.

Compander processing is implemented with a NE/SA572 programmable analog expander IC 274. This device is dual channel allowing for one audio signal pair, left (internal channel B) and right (internal channel A) audio signals, to be independently compressed using only one device. Gain compression is controlled by the IC 274 working in conjunction with an external operational amplifier circuit 276 for each internal channel. An external operational amplifier circuitry 276 controls the left audio signal compression.

The IC 274 is powered through pin 16 from +12VDC by way of a limiting resistor 278, which is connected between the +12 VDC and pin 16, and a filtering capacitor 280, which is connected between pin 16 and ground. The IC 274 is grounded through pin 8.

Because the internal channel A and the internal channel B operate identically, biasing and external operational amplifier control will only be discussed for internal channel B. The only difference in the discussion between internal channel A and internal channel B processing is the pin assignments of the IC 274, those dedicated to the internal channel A and those dedicated to the internal channel B.

The internal channel B compression circuitry is correctly biased with two sets of parallel capacitors: parallel capacitors 282 and 284 connected between pin 12 and ground; and parallel capacitors 286 and 288 connected between pin 14 and ground. The internal channel B includes a full-wave rectifier to detect the average value of the input signal, with the pin 13 being the input to internal channel B rectifier. The input to the rectifier is filtered by a filter circuit 290. The filter circuit 290 comprises a capacitor 292 connected in series with a capacitor 294 and a resistor 296, which are connected in parallel with respect to each other. A resistor 298 connects the parallel capacitor 294 and the resistor 296 to pin 13.

The left audio signal is applied to a capacitor 300 which is connected to input pin 9. Simultaneously, the left audio signal is fed into the filter circuit 290.

Total harmonic distortion (THD) can be externally controlled by a signal 310 from a potentiometer 306 provided to IC 274. In particular, for the left audio signal, pin 10 is connected to a resistor 302 whose other end is connected to the center tap 304 of a trim potentiometer 306. The potentiometer 306 is connected to +12VDC through resistor 308. The other end of the potentiometer 306 is tied to ground. Trimming of the potentiometer 306 changes the THD control signal 310 provided to pin 10. The left THD control signal 310 also serves as a reference voltage applied to the noninverting terminal of an operational amplifier 312 by way of a resistor 314. The resistor 314 is connected to the resistor 302 and to pin 10. A capacitor 316 is connected between the noninverting terminal of the operational amplifier 312 and ground. The output 318 of the internal channel B, pin 11, is directly connected to the inverting terminal of the operational amplifier 312. A capacitor 320 is connected between the inverting and noninverting terminals of the operational amplifier 312. A feedback capacitor 322 is connected between the inverting terminal of the operational amplifier 312 and the output. Feedback resistors 324 and 326 are connected in series from the inverting terminal of the operational amplifier 312 to its output. A capacitor 328 is connected between ground and the common tie point of the resistors 324 and 326.

The uncompressed left audio signal from the voltage divider 272 is summed with the output 318 of the internal channel B at the inverting terminal of the operational amplifier 312.

The output 330 of the external operational amplifier circuitry 276 is fed back as the input, pin 9, to the internal channel B through a capacitor 300. Moreover, the output 330 of the external operational amplifier circuitry 276 is also fed into a filtering circuit 290.

Following the compression of the left audio signal, the signal is then applied to the pre-emphasis circuit 56. The pre-emphasis circuit 56 consists of two input paths, one path consisting of a resistor 332 while the other path consists of a resistor 334 connected in series with a capacitor 336. These two paths are connected in parallel with one another, connecting the output of the compressor circuitry 54 to the inverting terminal of an operational amplifier 338 through a coupling capacitor 340. The combination of the resistor 332 and the capacitor 336 provide the 50 microsecond time constant for the pre-emphasis circuit 56, and the resistor 334 provides a 20 kHz shelf to restrict pre-emphasis to frequencies above 20 kHz. A resistor 341 provides the feedback for the operational amplifier 338.

The reference voltage applied to the operational amplifier 338 is obtained from a voltage divider circuit 342 by way of a resistor 344. The voltage divider 342 consists of resistors 346 and 348 connected in series between +12 VDC and ground with a resistor 344 connected to the common tie point of the resistors 346 and 348. A filtering capacitor 350 connects this common tie point to ground. This tie point provides the reference voltage to the noninverting terminal of the operational amplifier 338 through the resistor 344. The noninverting terminal of the operational amplifier 338 is also connected to ground by a filtering capacitor 352. The voltage divider 342 also supplies the reference voltage to the pre-emphasis circuit used in right audio signal processing.

FIG. 4C shows the identical gain circuit 52, compressor circuitry 54 and pre-emphasis circuitry 56 for the right audio input signal. The resulting signal from these circuits is a right emphasized signal 356.

Figure 5:
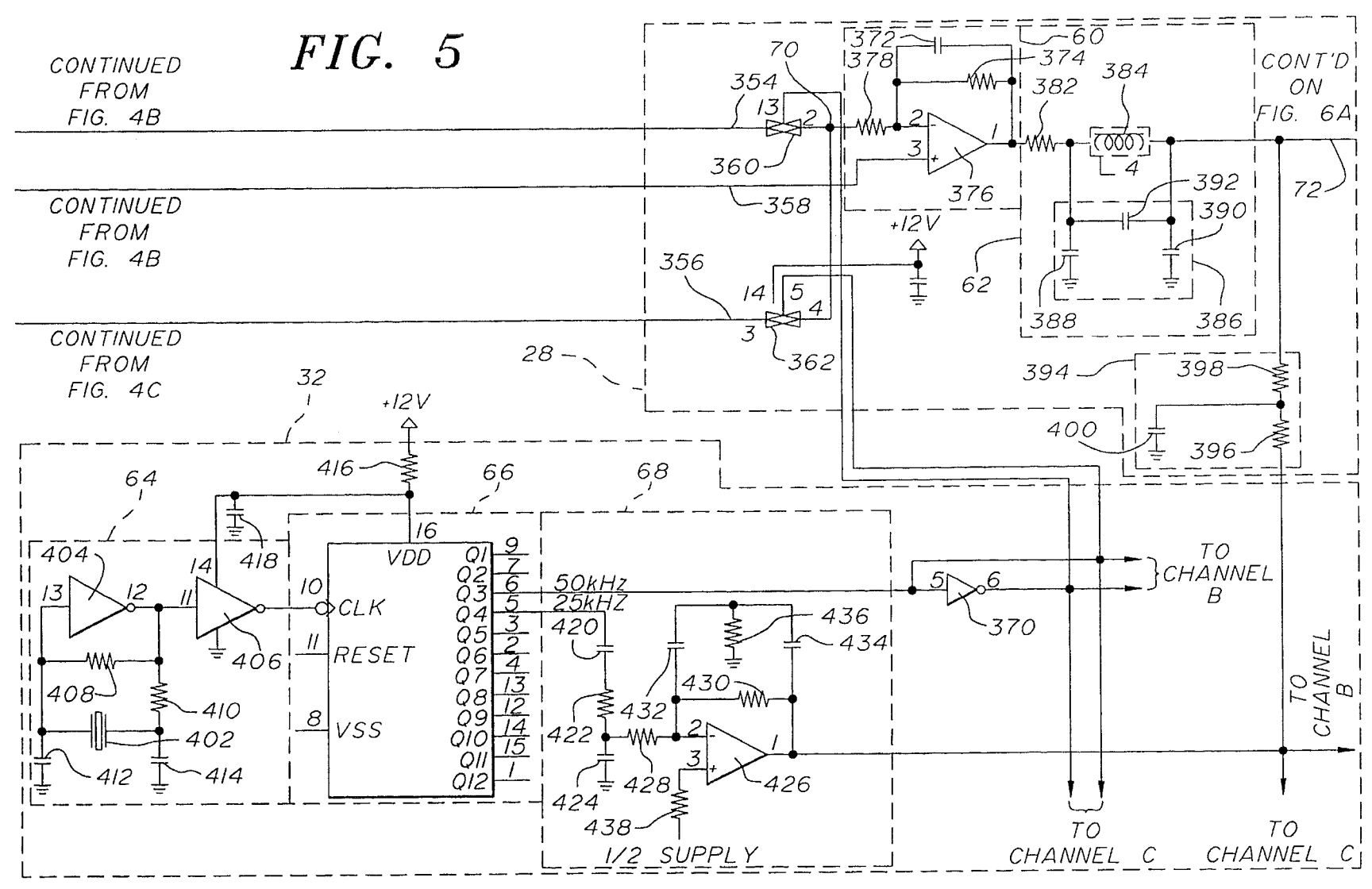

The left emphasized signal 354, the right emphasized signal 356, and the voltage reference signal 358 are then applied to the multiplexing circuitry 28. Referring to FIG. 5, the details of the multiplexing circuitry 28 and the multiplexing control circuitry 32 will now be described. The left emphasized signal 354 is applied to a left audio signal transmission gate 360 while the right emphasized signal 356 is applied to a right audio signal transmission gate 362. Both gates 360 and 362 are implemented in the preferred embodiment on a single IC CMOS 4066 and operate identically. Both gates have an input, output and control pin, the only difference being the pin assignments for the left and right signal multiplexing. The left emphasized signal 354 enters the left audio signal transmission gate 360 on pin 1 and outputs on pin 2. The gate 360 is controlled on pin 13. The right emphasized signal 356 enters the right audio signal transmission gate 362 on pin 3 and outputs on pin 4. The gate 362 is controlled on pin 5. The single IC CMOS 4066 is powered by +12 VDC applied to pin 14. A filter capacitor 364 connects pin 14 to ground. The output pin 2 of the gate 360 is connected to the output pin 4 of the gate 362.

The left multiplex control signal 366 opens and closes the transmission gate 360 based on the 50 kHz signal generated in the multiplexing control circuitry 32. Similarly, the right multiplex control signal 368 opens and closes the transmission gate 362 based on the 50 kHz signal generated in the circuitry 32. The inverter 370 insures that the left multiplex control signal 366 to the transmission gate 360 and the right multiplex control signal 368 to the transmission gate 362 work in opposition, i.e., when one gate is opened the other gate is closed. The result is time division multiplexing: only one signal, either a left or right audio signal, is alternately allowed to pass to buffer circuit 60. The resulting signal is a composite signal 70.

Also, identical multiplex control signals, 366 and 368, are being applied to channel B and channel C so that all channel left audio transmission gates are opened/closed simultaneously while all channel right audio transmission gates are opened/closed simultaneously.

The composite signal 70 is applied to a buffer circuit 60. The buffer circuit 60 provides isolation between a composite filtering circuitry 62 and the transmission gates 360 and 362. The buffer circuit 60 provides a DC gain of −1 while the 22 picofarad feedback capacitor 372 acts to minimize high frequency noise. The feedback resistor 374 is connected between the output of an operational amplifier 376 and its inverting terminal while the input resistor 378 is connected between the output of the transmission gates 360 and 362 and the inverting terminal of the operational amplifier 376. The resistors 374 and 378 provide the −1 DC gain. The reference voltage applied to the noninverting terminal of the operational amplifier 376 is the reference voltage 358. The buffered composite signal is then applied to the composite filter circuit 62. That circuit includes a resistor 382 connected to the output of operational amplifier 376 and a filter 384. The filter 384 has a capacitor network 386 tied across its input and output. The capacitor 388 is connected between the input of the filter 384 and ground while a capacitor 390 is connected between the output of the filter 384 and ground. Tied between these two capacitors is a capacitor 392.

The output of the composite filter 62 is summed with the 25 kHz pilot signal generated in the multiplex control circuitry 32. The 25 kHz pilot signal is summed with the output of the composite filter 62 to create a tagged signal 72 by way of a coupling network 394. Series resistors 396 and 398 connect the 25 kHz pilot signal to the output of the composite filter 62. A capacitor 400 connects the common point of these two resistors to ground. Also, identical 25 kHz pilot signals are being applied to channel B and channel C simultaneously through networks identical to the coupling network 394.

The multiplexing control circuitry 32 is also depicted in FIG. 5. A 200 kHz oscillator circuitry 64 forms the origin of the multiplexing control. The circuit 64 is the most common oscillator circuit for a ceramic resonator 402: a Colpitts circuit. An inverter 404 operates as an inverting amplifier for the oscillation circuit. Another inverter 406 is used as a waveform shaper and also acts as a buffer for the output. Inverters 404 and 406 are implemented on a single chip which is powered by +12 VDC applied on pin 14 by way of a resistor 416. A filtering capacitor 418 connects pin 14 to ground. A feedback resistor 408 provides negative feedback around the inverter so that oscillation will start when power is applied and when using a ceramic oscillator a typical value of 1M ohm is used. A resistor 410 decreases the load on the output of the inverter 404 and prevents spurious oscillation. The actual oscillation frequency of circuit 64 is a function of the internal series and parallel capacitance of the ceramic resonator 402 and the equivalent capacitance of loading capacitors 412 and 414. The circuit 64 outputs a 200 kHz square wave to programmable frequency divider 66.

The 200 kHz output signal of the inverter 406 is applied to the clock input programmable frequency divider 66. The voltage terminal of the divider 66 is coupled to ground by capacitor 418 and also coupled to +12 VDC through resistor 416. The divider 66 is grounded in a conventional manner. The output of the divider 66 provides an output square wave having a frequency equal to the clock frequency divided by M, where M is $2^n$, and where n may range between 1 and 12. In particular, to obtain a particular frequency square wave from the divider 66, the appropriate terminal on the divider 66 is chosen. For current application, the terminal providing a 50 kHz square wave is coupled to the left audio signal transmission gate 360 and right audio signal transmission gate 362 control inputs, pin 13 and 5, respectively.

In the sine wave shaper circuitry 68, the 25 kHz square wave is applied to a capacitor 420 which is coupled to ground by resistor 422 and capacitor 424. The terminal between capacitor 424 and resistor 422 is coupled to the inverting input of an operational amplifier 426 by a resistor 428. For feedback, the output of the operational amplifier 426 is coupled to the inverting input by a resistor 430 coupled in parallel with a series arrangement of capacitors 432 and 434. The junction between the capacitors 432 and 434 is coupled to ground by a resistor 436. The noninverting input of the operational amplifier 426 is coupled, through resistor 438, to the one-half power supply voltage (+6 VDC). The double integration of shaping circuit 68 acts to filter out from the square wave input everything but the 25 kHz fundamental to be used as the pilot signal 69.

The 25 kHz sine wave pilot signal 69 is applied, through a network 394, to the output of the composite filter circuitry 62. This same pilot signal 69 is simultaneously applied to the channel B and the channel C composite filter output. The sine wave shaper circuit 68 introduces a 25 kHz pilot signal component within each of the respective channel A, B and C composite signals. In particular, the channel A composite signal 70 is combined with the pilot signal 69 to form the tagged signal 72. This tagged signal 72 is then sent to the radio frequency (RF) circuitry 30.

Figure 6A:
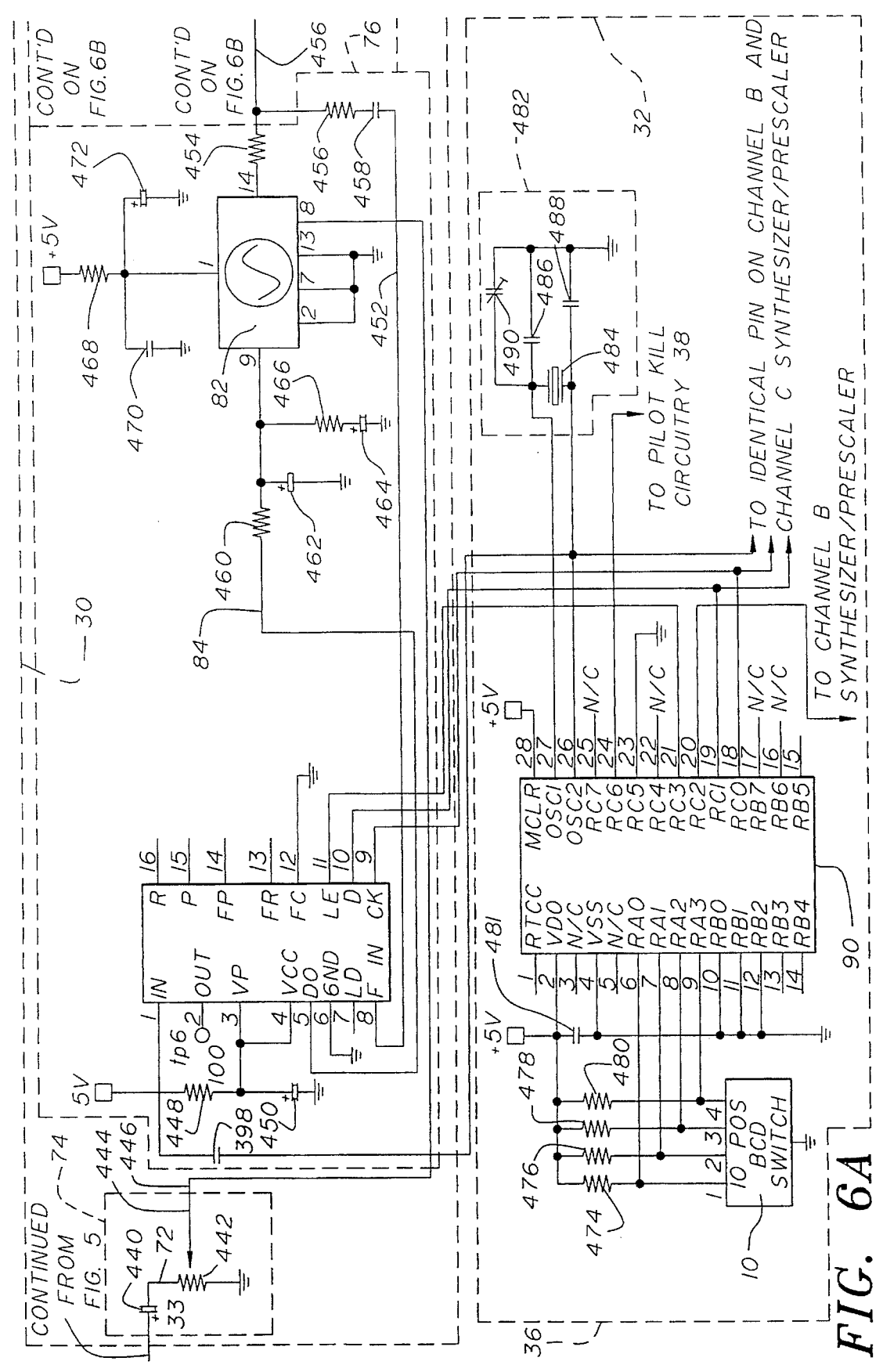

Referring to FIG. 6A, the details of the RF circuitry 30 and the microcontroller circuitry 36 will now be described. The tagged signal 72 is applied to the deviation adjust circuitry 74 through a coupling capacitor 440. The deviation adjust circuitry 74 includes 10 k ohm potentiometer 442 whose input is connected to a coupling capacitor 440 while the other end of the 10 k ohm potentiometer 442 is connected to ground. The center tap 444 provides a means of adjusting the tagged signal level 72 and limits the maximum amplitude of this signal. This adjusted signal is known as the modulation output signal 446 and is provided on line to the VCO module 82 at input pin 8. The VCO module 82 contains the ceramic resonator used to generate the high frequency carrier. The ceramic resonator (not shown) provides a very stable, low-noise resonating component which operates at the fundamental frequency of the VCO module 82 without the requirement of frequency multiplication. Additionally, the ceramic resonator is substantially immune from microphonic effects such as speaker vibration of mechanical shock. The ceramic resonator allows the VCO module 82 to operate in such a way that the transmitter 4 may transmit signals to the receiver 6, where high signal-to-noise ratios are obtained at the receiver 6.

The control and generation of the high frequency carriers is accomplished by the synthesizer 86 and the pre-scaler 88 with frequency data provided by the microcontroller 90. The synthesizer 86 and pre-scaler 88, as used in the preferred embodiment, are contained within a single IC. Power to the chip is provided to pin 4 from +5 VDC source through a resistor 448. Pin 4 is also connected to ground by a filtering capacitor 450. Pin 3 is also provided with the same +5 VDC power signal. The chip is provided with a ground through pin 12.

Both the synthesizer 86 and pre-scaler 88 work together to provide phase-lock-loop (PLL) frequency synthesis. The synthesizer 86 accepts a 4.00 MHz signal on pin 1 from a crystal oscillator 484 (discussed below). This 4.00 MHz signal is then internally divided down, creating an internal 100 kHz frequency (not shown). The synthesizer 86 reads the particular frequency serial data provided to it (on pin 10 D) by the microcontroller 90 (from pin 19 RC1). The pre-scaler 88 uses this particular frequency serial data to divide down a feedback frequency signal 452 from the VCO module 82 for internal phase comparison with the internal 100 kHz reference frequency. The feedback frequency signal 452 is the output of the VCO module 82 (frequency modulated signal 492, discussed below) that has been applied to an input network consisting of a resistor 456 and a capacitor 458, connected in series. The other side of capacitor 458 is connected to pin 8 of the pre-scaler 88. This closed-loop function, formed by the synthesizer 86, the pre-scaler 88 and the VCO module 82, establishes the particular tuning voltage signal 84 necessary for the VCO module 82 to generate the particular carrier frequency based on the serial data provided by the microcontroller 90. Moreover, once the VCO module 82 reaches the particular carrier frequency and locks onto that frequency, the closed-loop will maintain the lock and prevent the VCO module 82 from drifting.

The tuning voltage 84 is applied to the VCO module 82 pin through a low pass filter formed by a resistor 460, a capacitor 462, a capacitor 464 and a series resistor 466. The tuning voltage signal 84 establishes the carrier frequency signal which is then frequency modulated, internal to the VCO module 82, with the modulation signal 446. The VCO module 82 is a voltage controlled oscillator which is powered by +5 VDC applied to pin 1 through a limiting resistor 468. Parallel capacitors 470 and 472 connect pin 1 to ground. Pins 2, 7 and 13 are connected directly to ground.

The microcontroller circuitry 32 includes the microcontroller 90. The microcontroller 90 provides the serial data regarding the carrier frequency to the synthesizer 86 while also providing the clocking means to input that data to the synthesizer 86.

The 10-position house code select switch 10 has four input lines all tied high to +5 VDC through resistors 474 (line 1), 476 (line 2), 478 (line 3) and 480 (line 4). The switch 10 may be implemented with any commercially available 10 position BCD switch. When the user activates the switch 10, various input lines are grounded and therefore are driven low, while other input lines remain high, i.e., connected to +5 VDC. Each of these four input lines are connected to independent input ports of the microcontroller 90: Line 1 is connected to RA0, line 2 is connected to RA1, line 3 is connected to RA2 and line 4 is connected to RA3. The microcontroller 90 reads these high/low inputs to establish which one of ten sets of carrier frequencies it will assign to channel A, B and C (see Table II). Data for thirty carrier frequencies are stored in memory within the microcontroller 90, arranged in ten groups of channel A, B and C carrier frequencies.

The microcontroller 90 pin 19 RC1 then transmits, serially, the data for the channel A carrier frequency to the synthesizer 86 pin 10 Data. Following this, the microcontroller 90 pin 19 RC1 then transmits, serially, the data for the channel B carrier frequency to channel B's synthesizer (not shown). Finally, the microcontroller 90 pin 19 RC1 then transmits, serially, the data for the channel C carrier frequency to channel C's synthesizer (not shown). Power (+5 VDC) is supplied to the microcontroller 90 through pin 2 VDD while pin 4 VSS is tied to ground. A filtering capacitor 481 is connected between pin 2 and pin 4. An external oscillator circuit 482 provides the input frequency for the microcontroller 90's oscillator timing and control functions to OSC1 pin 27. A 4.00 MHz crystal oscillator 484 is connected across pins 27 OSC1 and 26 OSC2. A capacitor 486 is connected between pin 27 and ground while a capacitor 488 is connected between pin 26 and ground. An adjustable capacitor 490 is connected across the capacitor 486. The microcontroller 90 outputs on pin 18 RC0 a clock signal to the synthesizer 86 to clock in the frequency serial data to the synthesizer 86. The microcontroller 90 transmits the 4.00 MHz signal from pin 26 OSC2 to the synthesizer 86 pin 1 through the input capacitor 487. As discussed above, this 4.00 MHz signal provides the internal reference signal to the synthesizer 86, necessary for frequency synthesis.

Similarly, as with the serial data, the 4.00 MHz signal and the clocking signal RC0 are transmitted to the channel B synthesizer and channel C synthesizer from the same output pins of the microcontroller 90.

Figure 6B:
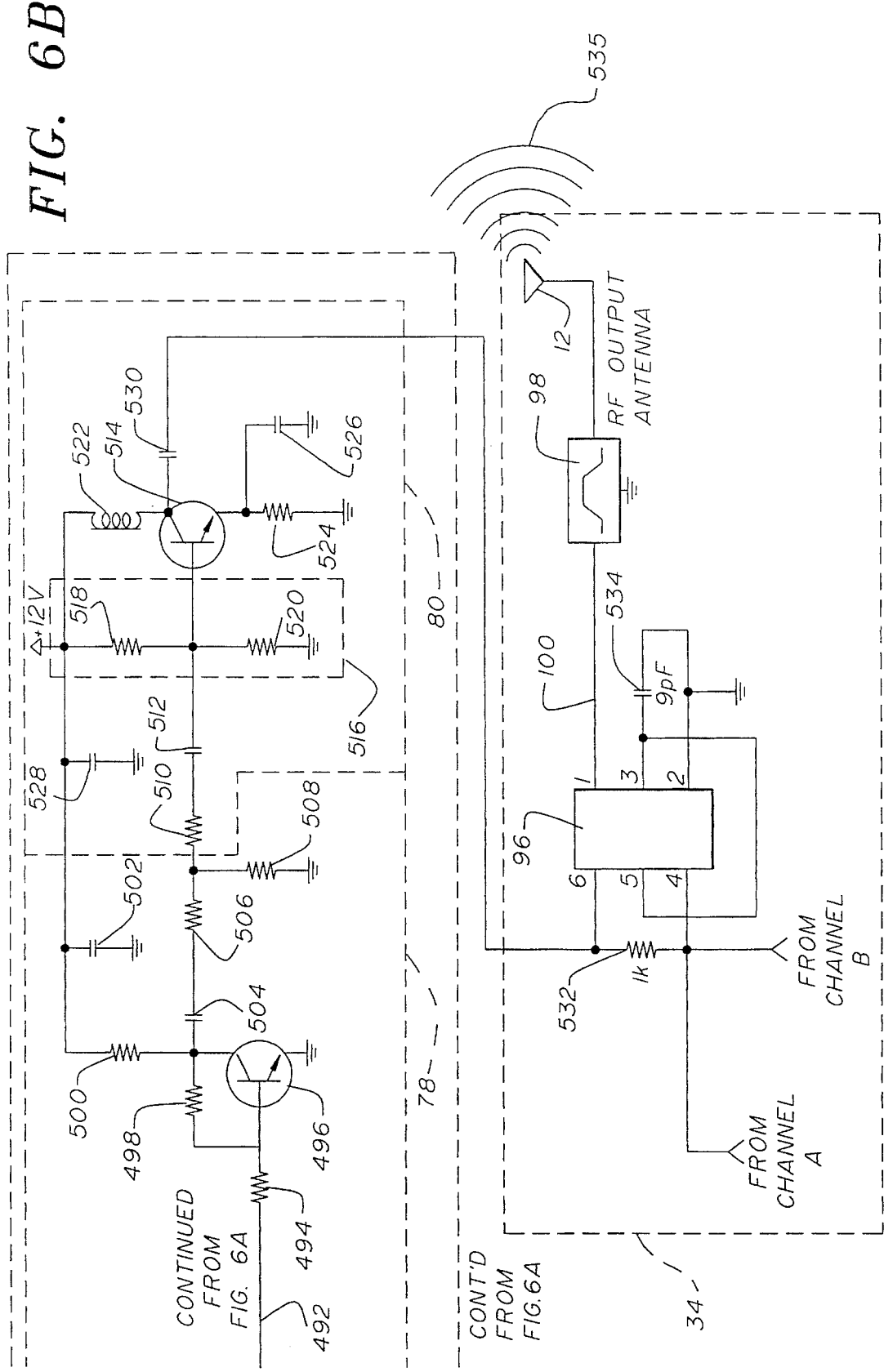

Referring to FIG. 6B, the remaining portion of RF circuitry, including the combination broadcast circuitry 36, will now be described. The frequency modulated signal 492, i.e., the output of the VCO module 82, is applied to the oscillator buffering circuitry 78. The oscillator buffering circuit 78 provides very high reverse isolation and prevents external impedance fluctuations at the antenna 12 from being reflected back and phase modulating the VCO circuitry 76. The buffer circuitry 78 also acts in conjunction with the following RF amplifier stage to amplify the frequency modulated signal 492 and bring it to the correct level allowed by the FCC.

The frequency modulated signal 492 is applied to the buffer circuitry 78 through one end of an input resistor 494, whose other end is connected to the base of a transistor 496. A feedback resistor 498 connects the collector and base of the transistor 496 together. The emitter of the transistor 496 is coupled directly to ground. The collector of the transistor 496 is connected to +12 VDC through a resistor 500. A power filtering capacitor 502 connects the power side of the resistor 500 to ground. The collector of the transistor 496 is connected to a capacitor 504, which is connected to a series resistor 506. The other side of resistor 506 is coupled to ground through resistor 508. The voltage divided signal between resistors 506 and 508 is then applied to the RF amplifier circuitry 80. In particular, the voltage divided signal from the buffer circuitry 78 is applied to a resistor 510. The resistor 510 is connected to a capacitor 512, whose other side is directly connected to the base of a transistor 514. The base of the transistor 514 is coupled to a voltage divider 516 which provides a constant +4 VDC forward bias on the base-emitter junction of the transistor 514 for amplifying the output of buffer circuit 78. The voltage divider 516 consists of series resistors 518 and 520 connected between +12 VDC and ground. The common tie point of these two resistors is connected to the base of the transistor 514. The collector of transistor 514 is connected to +12 VDC through an inductor 522 which provides isolation for the voltage applied to the collector of the transistor 514. The emitter of the transistor 514 is coupled to ground through a parallel resistor 524 and a parallel capacitor 526. A filter capacitor 528 connects the power side of the inductor 522 to ground. The output of the transistor 514 (i.e., the collector) is connected to a capacitor 530. Following the capacitor 530, the RF amplified signal 94 is then applied to the combination broadcast circuitry 34.

As shown in FIG. 6B, the first stage of the combination broadcast circuitry 34 is a ferrite combiner circuitry 96 which sums all three channel A, B and C RF amplified-frequency modulated signals together into the combined signal 100. Each channel's modulated signal is connected to a different pin on the ferrite combiner 96. The channel signals are buffered from one another by a buffering resistor. In particular, a buffering resistor 532 buffers channel A's RF amplified-frequency modulated signal 94 (which appears on pin 6 on the ferrite combiner) from channel B's RF amplified signal (which appears on pin 4 on the ferrite combiner). The combiner 96 is biased by a capacitor 534 which connects its pin 2 to pin 3. Pin 3 is grounded. Pin 2 is also connected to pin 5.

The combined signal 100 is then applied to the bandpass filter 98. This output filter removes undesired harmonics from the output signal of the transistor 496. Finally, the output signal from bandpass filter 98 is applied to transmitter antenna 12 from whence it is broadcast as transmitted signal 535. This signal is broadcast over the air to be received by the receiver 6.

Figure 7B:
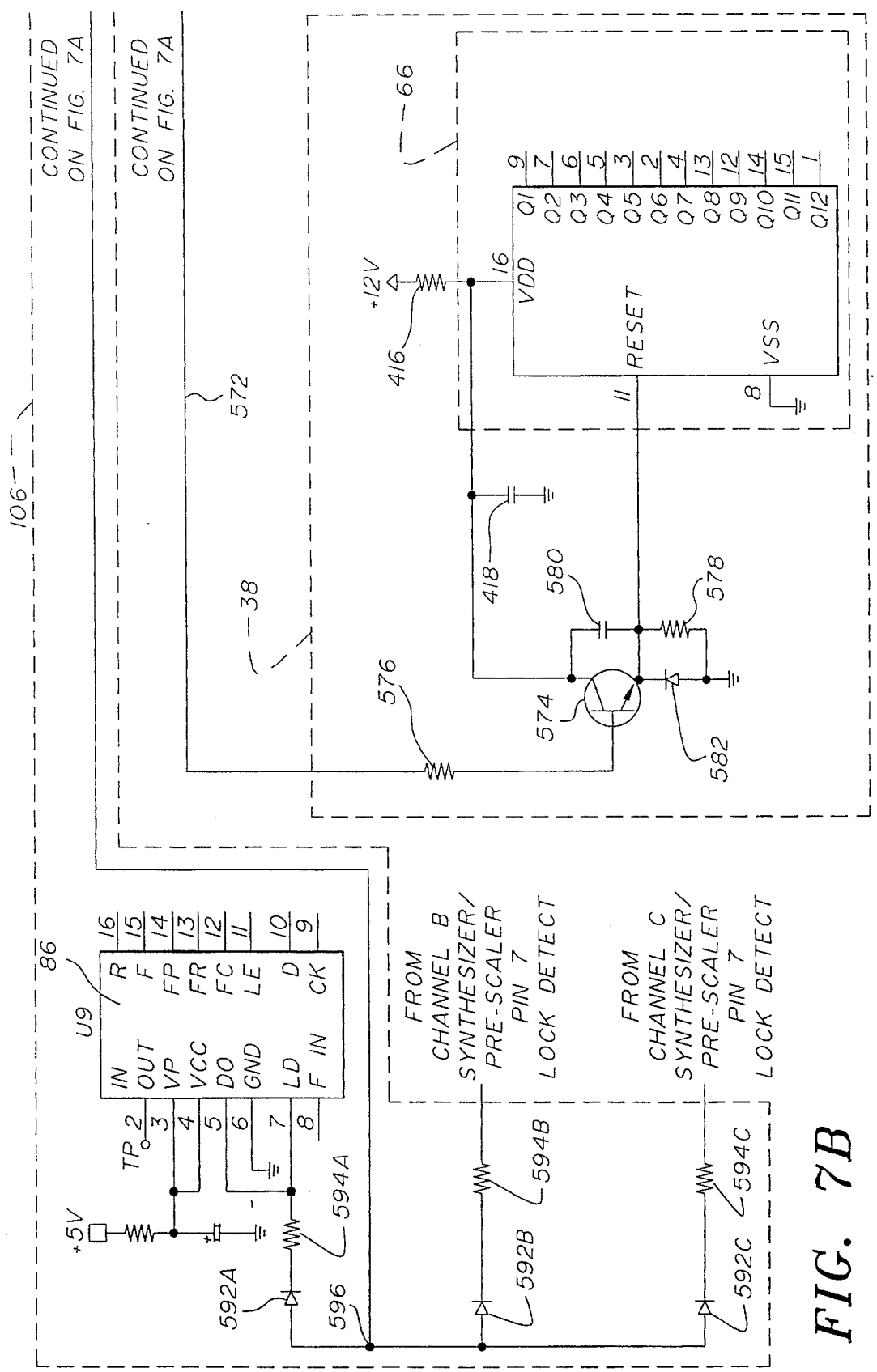

Referring to FIGS. 7A and 7B, the details of the transmitter power circuitry 40, the pilot kill circuitry 38, and portions of the microcontroller circuitry 36, namely, the unlock detection circuitry 106 and the transmit-ok circuitry 108, will now be described.

As shown in FIG. 7A, the transmitter power circuitry 40 takes in +15 VDC from an external source 536 that is connected to the power jack 538. The power jack 538 is connected to the regulator path 110 and the power muting circuitry 112. The power jack 538 is connected to an input diode 540 of the regulator path 110 with parallel filtering capacitors 542 and 544 connecting the diode 540 output to ground. A regulator 546 receives the diode 540 output and creates the regulated +12 VDC at its own output. A bus point 548 is connected to ground by a filter capacitor 550. The bus point 548 is where all the +12 VDC excitation is derived for the transmitter 4 electronics. The bus point 548 is also connected to the input of a LM78L05 +5 VDC regulator (not shown) which provides the regulated +5 VDC to those transmitter ICs requiring this supply voltage (e.g., VCO module 82).

The power jack 538 is also connected to the power muting circuitry 112. In particular, the jack 538 is connected to a current limiting resistor 552 which is connected to an LED (light emitting diode) 554. The other side of the LED 554 is connected to ground. The presence of the +15 VDC causes the LED 554 to illuminate, indicating that power is available to the transmitter 4. The power jack 538 is also connected to a resistor 556, which is connected to a zener diode 558. The other side of the zener diode 558 is connected to ground through a resistor 560. The connection point 564 of the zener diode 558 and the resistor 560 is tied to the base of a transistor 562. Whenever the +15 VDC is present at the power jack 538, the connect point 564 is high, turning the transistor 562 on. The collector of the transistor 562 is connected to +12 VDC through a resistor 566. The emitter of the transistor 562 is connected to the collector of the transistor 568. The power muting circuitry 112 controls the turn on and turn off of the transistor 562.

The pilot kill circuitry 38 is designed to "kill" the pilot signal in order to mute the receiver 6. When the transmitter 4 kills the pilot signal 69, loss of this signal will be detected in the receiver's stereo demultiplexor circuitry 146 and the receiver microcontroller 137 will then mute the receiver 6 until the pilot signal 69 is restored within the transmitter 4 and the receiver 6 begins detecting the pilot signal 69 again. The pilot kill circuitry 38 is designed to mute the receiver 6 under the following conditions: immediate power up of the transmitter 4, loss of +15 VDC power to the transmitter 4, and whenever there is a "no lock" condition of either the transmitter channel A (86), B or C synthesizer.

As long as +15 VDC is applied to the power jack 538, the transistor 562 is forward biased across its base-emitter junction because the voltage divider formed by the resistor 558 and the resistor 560 (at the connect point 564) provides more than the 0.7 volts necessary for transistor turn-on. Moreover, if the transmitter microcontroller 90 senses a "lock detect" indication from the unlock detection circuitry 106, the microcontroller 90 outputs from pin 24 RC6 a sufficient forward biasing voltage through a resistor 570 to turn on the transistor 538. In this configuration, with both transistors 562 and 568 turned on, the regulated +12 VDC from the regulator 546 output finds a path to ground by way of a resistor 566, a transistor 562 and a transistor 568. The result is that a signal 572 is grounded and no "pilot kill" command is issued. However, because the transistors 562 and 568 are in series, a loss of either forward biasing voltage to the transistor 562 or 568 will cut off the path to ground and the signal 572 will turn "high", floating to +12 VDC. When this happens, a pilot kill command is issued to a transistor 574 (FIG. 7B) through a resistor 576. The pilot kill command forward biases the base-emitter junction of the transistor 574 causing it to conduct with current flow down through resistor 578. When a voltage appears across resistor 578 a reset command is applied to pin 11 of the programmable frequency divider circuitry 66. The reset command kills the pilot signal 69. The collector of the transistor 574 is connected to +12 VDC through the resistor 416. The filtering capacitor 418 is connected to the other side of the resistor 416 and ground. A capacitor 580 is connected across the collector and emitter of the transistor 574. The capacitor 580 and the resistor 578 provide a 33 millisecond delay necessary to kill the pilot signal 69 whenever the transmitter 4 is powered up. Following this delay time, the pilot signal is transmitted. A diode 582 is connected between the emitter of the transistor 574 and ground to insure that no reverse current flows into the emitter.

As previously stated, the transmitter microcontroller 90 pin 24 RC6 controls the turn-on/off of the transistor 568, located in the pilot kill circuitry 38, through the resistor 570. Should signal lock be lost, unlock detection circuitry 106 will inform the microcontroller 90 of this loss by way of pin 14 RB4. The lock detection circuitry 106 consists of a p-n-p transistor 584, whose emitter is directly connected to +5 VDC, and whose collector connected to ground through a resistor 586. A feedback resistor 588 is connected between the transistor's base and its emitter. A filter capacitor 590 is connected between the base and ground. The transistor 584 turns on when the emitter-base junction is forward biased i.e., when the emitter is at least 0.7 volts higher than its base voltage. The collector is also connected to the microcontroller 90 pin 14 RB4.

As shown in FIG. 7B, the input to unlock detection circuitry 106 is the "OR'd" inputs of "unlock detection" signals from pin 7 "LOCK DETECTION" of each channel's synthesizer/prescaler IC (in channel A, 86). The synthesizer 86 pin 7 is connected to the transistor 584 base by way of an "OR" diode 592A and a series resistor 594A. The channel B and channel C synthesizers (not shown) pin 7 are also connected to the transistor 584 base at an "OR" junction 596 through "OR" diodes 592B and 592C, respectively, and series resistors 594B and 594C, respectively, as indicated in FIG. 7B.

If any one of these channel's lock detection signals is low, indicating an unlocked condition, that channel's OR diode will conduct, forcing the base of the transistor 584 to go low with respect to the emitter. The transistor 584 will then turn on, providing a path to ground for the +5 VDC connected to the emitter. Current flow through the resistor 586 will develop a voltage across the resistor 586 sending an "unlock detect" status to the microcontroller 90. The microcontroller 90 will, in response, shut off the transistor 568 in the pilot kill circuitry 38, which will in turn send a pilot kill command, resulting in the muting of the receiver 6, as will be discussed later.

As shown in FIG. 7A, the transmit-ok-indicator circuitry 108 is controlled by the microcontroller 90. The microcontroller 90 pin 15 RB5 provides the turn-on/off signal to a transistor 598 through a resistor 600. The resistor 600 is connected to the base of the transistor 598. +12 VDC is connected to a resistor 602 whose other side is connected to an LED 604. The other side of the LED 604 is connected to the collector of the transistor 598. If the transmitter 4 is operating with signal lock on all three channels, the microcontroller 90 issues a forward biasing voltage to the base of the transistor 598 through the resistor 600 causing the transistor 598 to conduct, sinking the +12 VDC signal and illuminating the LED 604, indicating to the user that transmitter 4 is operating correctly.

The details of the receiver 6 will now be discussed. Because correct operation of the receiver 6 requires the user to set the receiver 6, the local oscillator circuitry 130 will be discussed first, followed by discussion of the reception and electrical processing of the transmitted signal 535 from the transmitter 4.

Figure 8A:
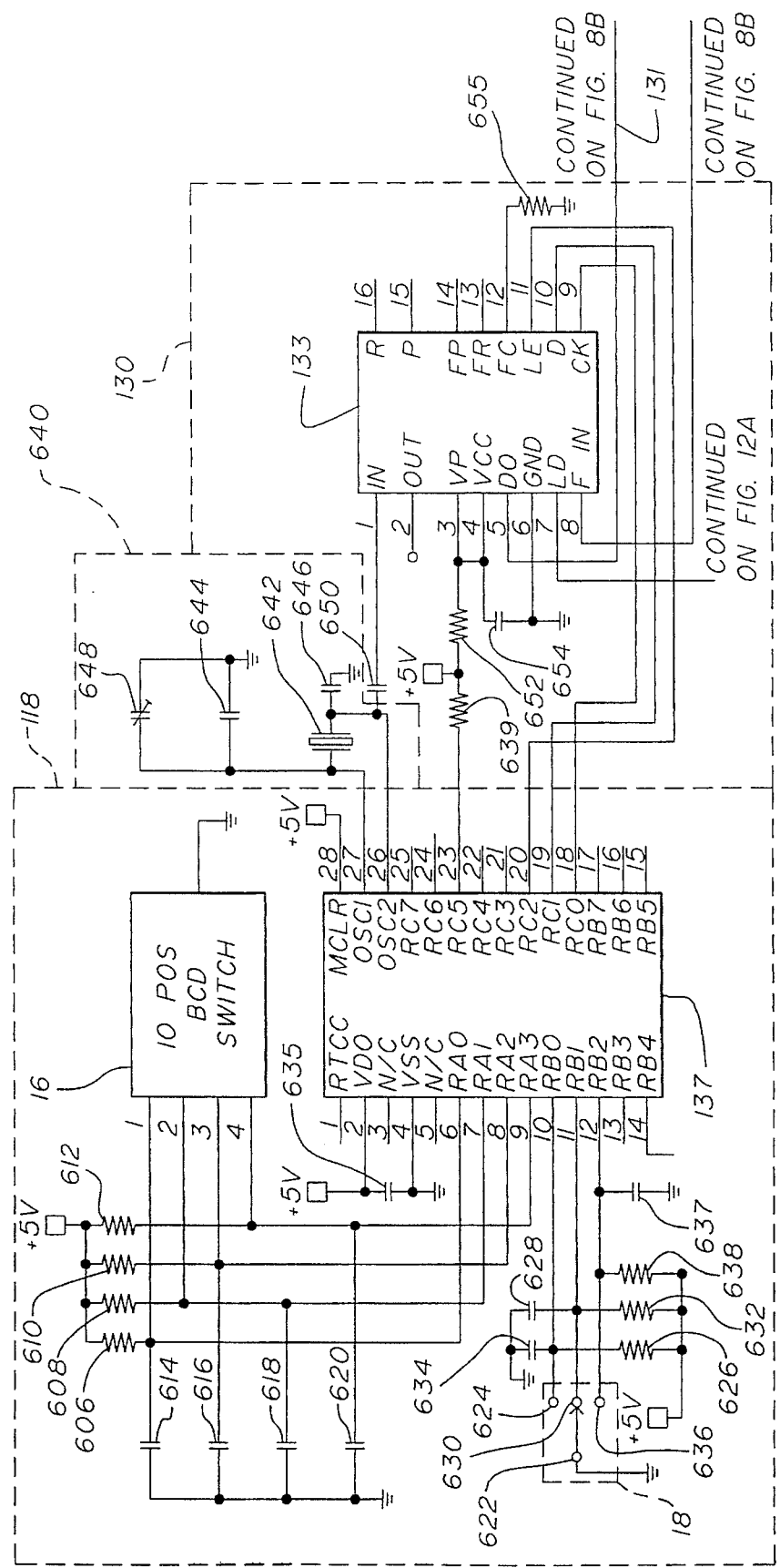
FIGS. 8A and 8B together make up a schematic diagram of the local oscillator circuitry portion of the antenna matching and intermediate frequency circuitry of the receiver.
Figure 8B:
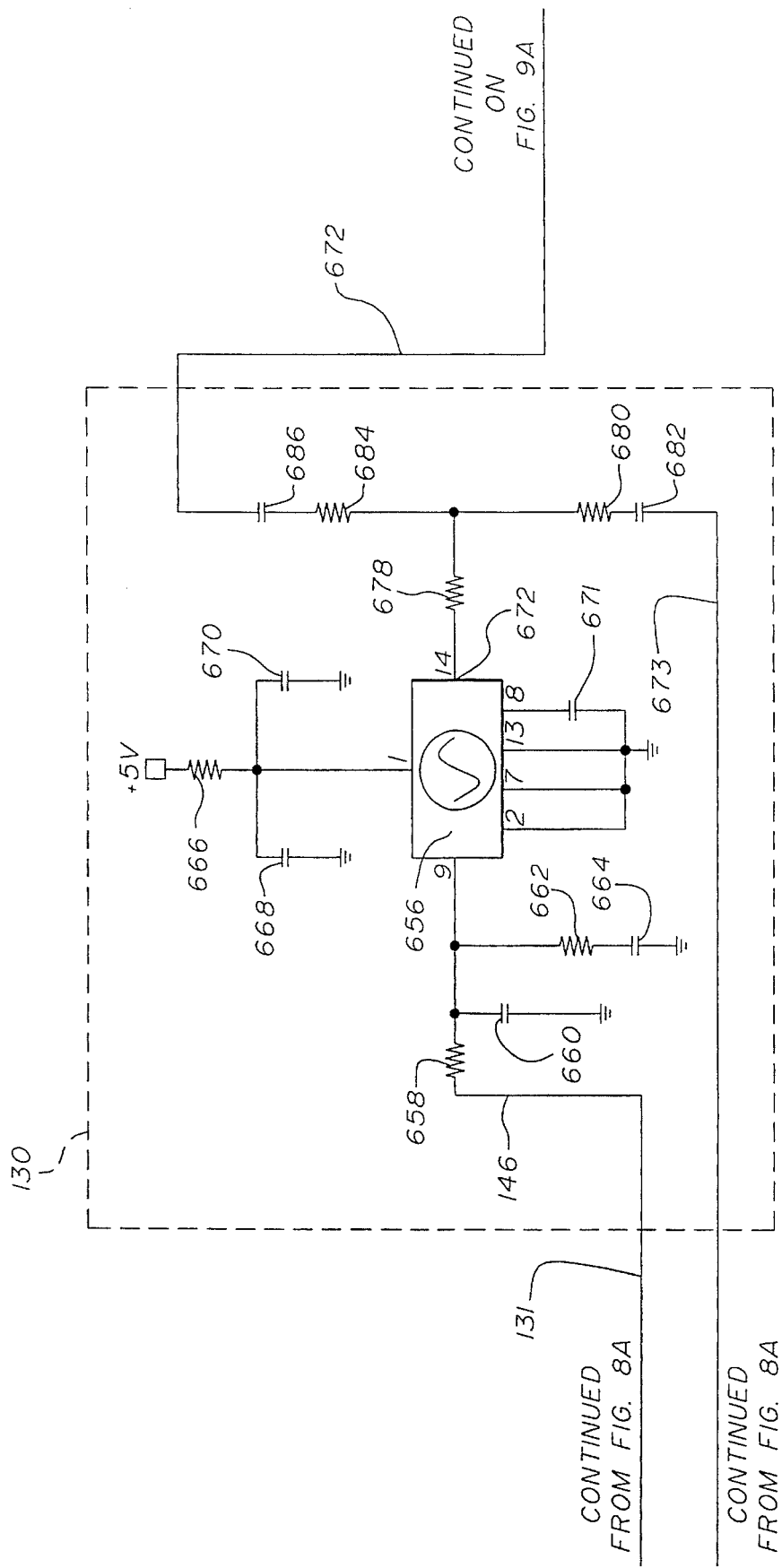

Referring to FIGS. 8A and 8B, the details of portions of the receiver microcontroller circuitry 118 and the local oscillator circuitry 130 portion for the antenna matching and intermediate frequency 114 circuitry for receiver 6 will be discussed. In particular, the microcontroller circuitry 118 includes the microcontroller 137. Power (+5 VDC) is supplied to the microcontroller 137 through pin 2 VDD while pin 4 VSS is tied to ground. A filtering capacitor 635 is connected between pin 2 and pin 4. Pin 23 RC5 also accepts +5 VDC through a resistor 639. An external oscillator circuit 640 provides the input frequency for the microcontroller 137's oscillator timing and control functions to OSC1 pin 27. A 4.00 MHz crystal oscillator 642 is connected across pins 27 OSC1 and 26 OSC2. A capacitor 644 is connected between pin 27 and ground, while a capacitor 646 is connected between pin 26 and ground. A variable capacitor 648 is connected across a capacitor 644. The microcontroller 137 outputs on pin 18 RC0 a clocking signal to the synthesizer 133 to clock in the frequency serial data to the synthesizer 133. The microcontroller 137 transmits the 4.00 MHz signal from pin 26 OSC2 to the synthesizer 133 pin 1 through an input capacitor 650. As discussed below, this 4.00 MHz signal provides the internal reference signal to the synthesizer 133, necessary for frequency synthesis. The microcontroller 137 also outputs an LE signal from port RC2 to pin 11 on synthesizer 133.

The receiver local oscillator circuitry 130 will now be discussed. In particular, the control and generation of the local oscillator signal used to mix with the received signal is implemented by the synthesizer 133 and the pre-scaler 135, with frequency data provided by the receiver microcontroller 137. The synthesizer 133 and the pre-scaler 135, as used in the preferred embodiment, are contained within a single IC chip. Power to the chip is provided to pin 4 from +5 VDC source through a resistor 652. Pin 4 is also connected to ground by a filtering capacitor 654. Pin 3 is also provided with the same +5 VDC power signal. The chip is provided with a ground at pin 12 via a biasing resistor 655.

Both the synthesizer 133 and the pre-scaler 135 work together to provide phase-lock-loop (PLL) frequency synthesis in the same manner as discussed previously concerning the transmitter synthesizer 86 and pre-scaler 88. In order for the transmitter 4 and the receiver 6 to operate with one another, the user must first set the receiver 6. Setting the receiver 6 requires that the receiver 10-position house code select switch 16 position of receiver 6 be identical to the transmitter 10-position house code select switch 10 position (implemented here with any commercially available ten-position BCD switch). The switch 16 has four input lines all tied high to +5 VDC through resistors 606 (line 1), 608 (line 2), 610 (line 3) and 612 (line 4). These four input lines are also connected to ground through filter capacitors 614, 616, 618 and 620, respectively. When the user sets the switch 16 to the identical setting of the transmitter switch 10, various input lines are grounded and are therefore driven low, while others input lines are high, remaining connected to +5 VDC. Each of these four input lines are connected to independent input ports to the microcontroller 137: Line 1 is connected to RA0, line 2 is connected to RA1, line 3 is connected to RA2, and line 4 is connected to RA3. The microcontroller 137 reads these high/low inputs to establish from which house code setting (see Table II) receiver 6 is to select the channel A, B or C frequency.

Setting the receiver 6 continues with the user then selecting one channel —A, B or C— at that particular house code switch position he/she wishes to listen. The 3-position channel select switch 18 can be set to channel A, B or C. The switch 18 is a single pole, triple throw switch. The common contact or pole 622 of the movable contactor is connected to ground. One stationary contact or terminal 624 is connected to +5 VDC through a resistor 626 and to ground through a filter capacitor 628. Another stationary contact or terminal 630 is connected to +5 VDC through a resistor 632 and to ground through a filter capacitor 634. The last of the stationary contacts, namely, terminal 636 is connected to +5 VDC through a resistor 638 and to ground through a filter capacitor 637. The switch terminal 624 is also connected to the microcontroller 152 input port RB0. The switch terminal 630 is also connected to input port RB1 and the switch terminal 636 is connected to input port RB2. When the user activates the switch 18, the switch terminal associated with the channel selected is grounded.

Upon sensing this "low" signal, the microcontroller 137 fetches the data of the associated frequency from its memory and transmit this data to the synthesizer 133. In particular, the microcontroller 137 port RC1 transmits the frequency data for the selected channel to the synthesizer 133 pin 10D. The microcontroller 137 outputs on pin 18 RC0 a clocking signal to the synthesizer 133 pin 9 to clock in the frequency data to the synthesizer 133. The synthesizer 133 accepts a 4.00 MHz signal on pin 1 from a crystal oscillator 642 (discussed below). This 4.00 MHz signal is then internally divided down, creating an internal 100 kHz frequency (not shown). The synthesizer 133 reads the particular frequency serial data provided to it (on pin 10D) by the microcontroller 137 (from pin 19 RC1).

The pre-scaler 135 uses this particular frequency serial data to divide down a feedback frequency signal 673 from the VCO module 656 for internal phase comparison with the internal 100 kHz reference frequency. The feedback frequency signal 673 is the output of the VCO module 656 (frequency modulated signal 672, discussed below) that has been applied to an input network consisting of a resistor 680 and a series capacitor 682. The other side of capacitor 682 is connected to pin 8 of the pre-scaler 135. This closed-loop function, formed between the synthesizer 133, the pre-scaler 135 and the VCO module 656, establishes the particular tuning voltage signal 131 necessary for the VCO module 656 to generate a local oscillator frequency signal 672 such that when it is mixed with the received signal 674 in mixing I circuitry 132, the resulting signal 676 will be a 70 MHz First IF. Moreover, once the VCO module 656 reaches the particular frequency and locks onto that frequency, the closed-loop will maintain the lock and prevent the VCO module 656 from drifting.

As shown in FIG. 8B, the tuning voltage 131 is applied to the VCO module 656 pin 9 through a low pass filter formed by a resistor 658, a capacitor 660, a resistor 662 and a series capacitor 664. The VCO module 656 is powered by +5 VDC applied to pin 1 through a limiting resistor 666. Parallel capacitors 668 and 670 connect pin 1 to ground. Pins 2,7 and 13 are connected directly to ground. Pin 8 is connected to ground through a capacitor 671.

Figure 9A:
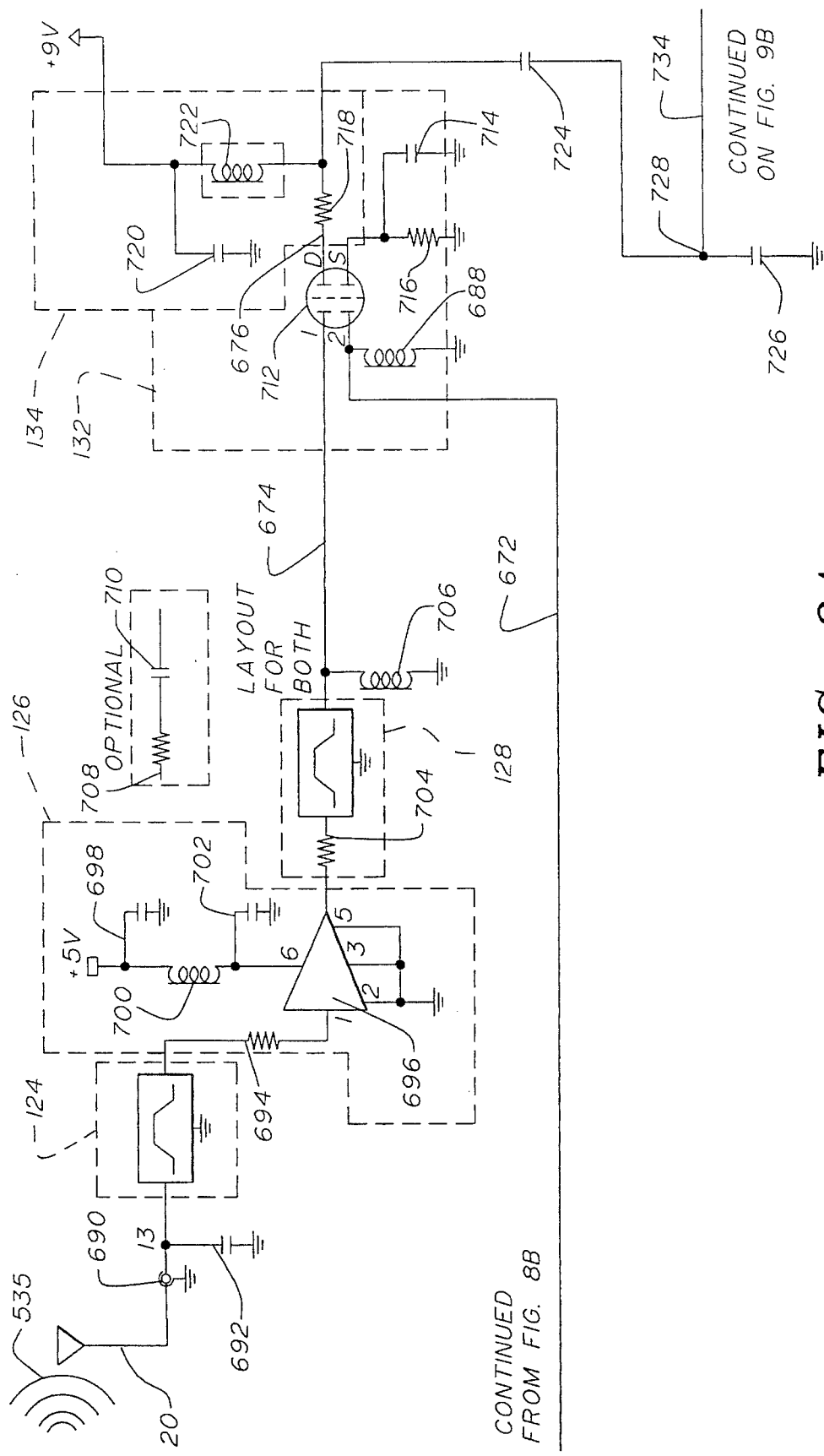
FIGS. 9A through 9D together make up a schematic diagram of the antenna matching and intermediate frequency circuitry and the demultiplexing with audio output circuitry of the receiver.

The local oscillator signal 672 is applied to the mixing I circuitry 132 (discussed below) by way of an input resistor 684 followed by an input capacitor 686 and then into the second gate of a GaAsFET 712 of mixing I circuitry 132 (FIG. 9A). An inductor 688 is connected between the second gate of the GaAsFET 712 and ground to provide appropriate filtering.

Referring to FIGS. 9A-9D, the details of the antenna matching and intermediate frequency (IF) circuitry 114 and the demultiplexing and audio output circuitry 116 will be discussed. Thus, as can be seen in FIG. 9A, the receiver antenna 20 is connected into an antenna input jack 690. The antenna 20 passes the transmitted signal 535 through the antenna input jack 690, whose output forms the input to the circuitry 114. A filter capacitor 692 is connected between the output of the jack 690 and ground. The output of jack 690 is connected to the input of the bandpass filter I circuitry 124. The circuitry 124 is implemented with a TOKO 4DFA914E-10 bandpass filter. The filtered output of the bandpass filter I 124 is applied to a resistor 694 and onto the RF amplifier circuitry 126. The RF amplifier circuitry 126 is implemented with a precision operational amplifier 696 that amplifies the filtered output. Power supplied to the operational amplifier 696 is provided by +5 VDC that has a filtering capacitor 698 tied to ground. The +5 VDC is provided through inductor 700, which is tied to ground through a filtering capacitor 702, and is also tied to operational amplifier 696 power pin 6.

The output of the RF amplifying circuit 126 is applied to the bandpass filter II circuitry 128. The bandpass filter II filters the output of the RF amplifying circuit 126 to select specific signals to which the receiver 6 is set. The bandpass filter II circuitry 128 is implemented with a TOKO 4DFA914E-10 filter, which consists of an input resistor 704 followed by internal filtering, and an inductor 706 which is connected to ground. An alternative implementation of the bandpass filter II circuitry 126 substitutes an 18 ohm input resistor 708 and a 2.2 microfarad capacitor 710 for the TOKO filter. The output of the bandpass filter II circuitry 128 is coupled to one gate (1) of a dual gate GaAsFET 712, which is the main component of the mixing I circuitry 132. The second gate (2) of the GaAsFET 712 is coupled to the output of the local oscillator circuitry 130. The second gate (2) of the GaAsFET 712 is also connected to ground by way of the inductor 688. The source of GaAsFET 712 is coupled to ground by a parallel connection of a capacitor 714 and a resistor 716. The difference of the signal from the bandpass filter II circuitry 128 and the local oscillator circuitry 130, known as the "First IF" 676, is produced at the drain of the GaAsFET 712 which is coupled to the bandpass filter III circuitry 134 through a resistor 718.

The bandpass filter III circuitry 134 consists of an inductor 722, a capacitor 724 and a capacitor 726 connected in series between +9 VDC and ground. The inductor 722 is connected directly to +9 VDC at one end while its other end is connected to the resistor 718. The capacitor 724 is also connected to the resistor 718 and the inductor 722, while the other side of the capacitor 724 is connected to a capacitor 726. The other side of the capacitor 726 is connected to ground. The filtering capacitor 720 is connected between the power side of the inductor 722 and ground. The output of the bandpass filter III circuitry 134 is the connect point 728, located between the capacitors 724 and 726.

Figure 9B:
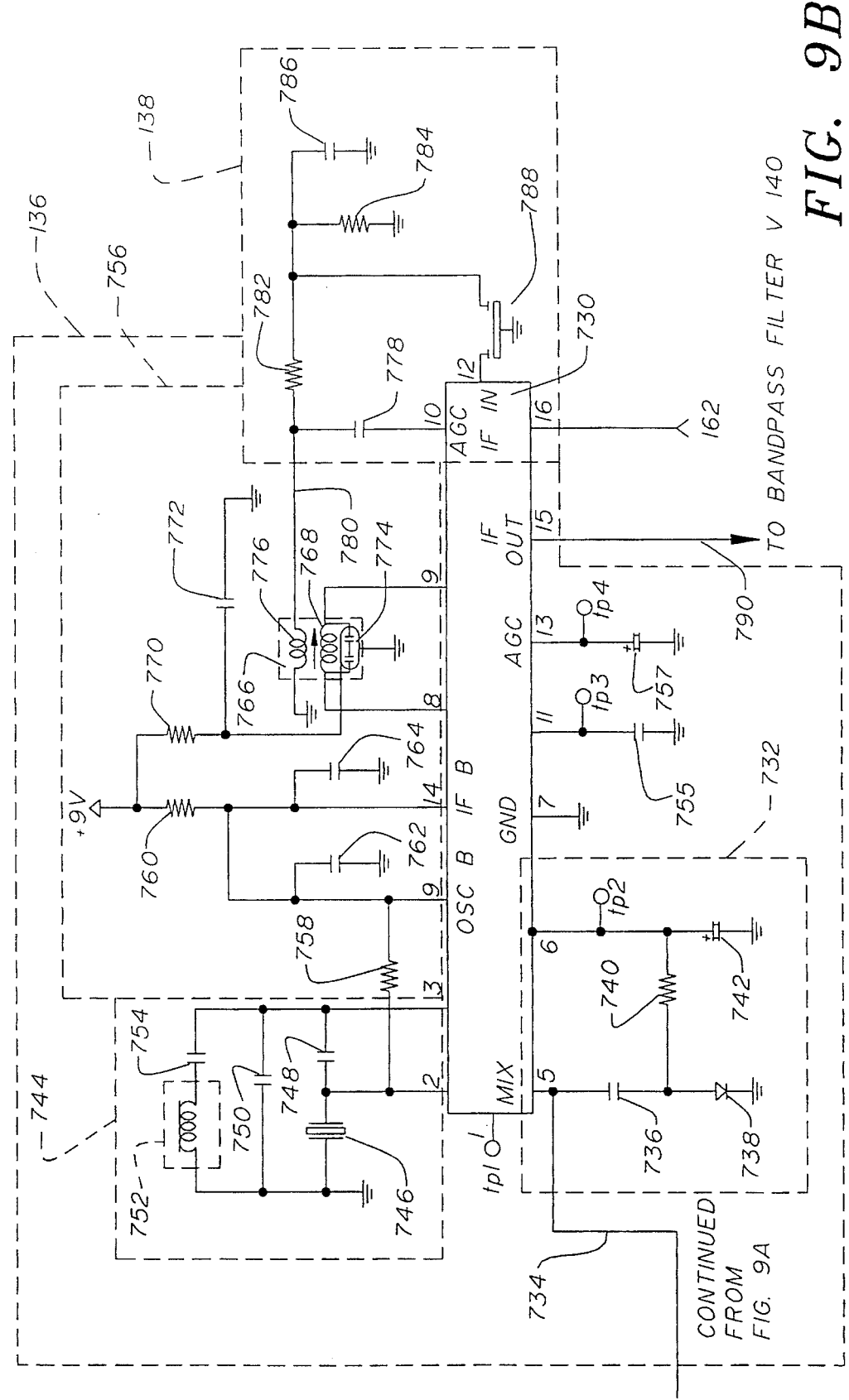

Referring to FIG. 9B, the connect point 728 (FIG. 9A) is connected to the input of the mixing II circuitry 136. The mixing II circuitry 136 has an RF amplification stage and a mixing stage implemented on a single IC 730. The input stage 732 and the internal RF amplification stage (not shown) of the mixing II circuitry 136 acts to control the gain of the input signal 734. The input stage 732 is tied to connect point 728. Pin 5 is the input pin of IC 730. A capacitor 736 is connected between pin 5 and a diode 738, which is connected to ground at its other end. A resistor 740 connects the common point of the capacitor 736 and the diode 738 to pin 6 of IC 730. A filtering capacitor 742 connects pin 6 to ground.

The strength indicating signal 162, generated in the quadrature detection circuitry 146, is transmitted back to the IC 730 pin 16 where it is used by the internal AGC (automatic gain control) circuitry of the IC 730 to reduce the gain of the incoming signal 734, with the diode 738 turning on if the strength indicating signal 162 is strong. Too strong a signal may overload the receiver 6 and it is necessary to turn down the signal strength. If the strength indicating signal 162 is extremely strong, the IC 730 will actually reduce the gain from the GaAsFET 712 in the mixing II circuitry 132.

The second mixing function is also implemented by the IC 730 which generates the 10.7 MHz "Second IF". The IC 730 uses an external oscillator circuit 744 to generate an 80.7 MHz signal to mix with the First IF and thereby create the 10.7 MHz Second IF. The external oscillator circuit 744 is connected between pins 2 and 3 of the IC 730. The crystal oscillator 746 of output frequency 80.7 MHz is connected to ground at one end and to pin 2 at its other end. A capacitor 748 is connected across pin 2 and pin 3. A parallel capacitor 750 is connected across the crystal oscillator 746 and the capacitor 748. Also, a series inductor 752 and capacitor 754 are connected across the crystal oscillator 746 and the capacitor 748.

The output of the external oscillator circuit 744 is applied to the filter network 756 through a resistor 758. Pins 4 and 14 are connected to +9 VDC by way of a resistor 760. Both pins 4 and 14 are connected to ground through filter capacitors 762 and 764, respectively. Filter capacitors 755 and 757 are connected between ground and pins 11 and 13, respectively.

The internally mixed signal is applied to an external transformer 766. The internally mixed signal is applied to one coil 768 connected across pins 8 and 9 of the IC 730. The coil 768 is center tapped and connected to +9 VDC through a resistor 770 and to ground through a filter capacitor 772. A capacitor load network 774 is also connected across the coil 768 internal to the transformer 766 which is also grounded. The other magnetically coupled coil 776 of the transformer 766 is connected between ground, the internal automatic gain control (AGC) circuitry and the bandpass filter IV circuitry 138. This transformed internally mixed signal 780 from the transformer 766 is applied to pin 10 of the IC 730 through an input capacitor 778. Pin 10 is the input to the internal AGC circuitry which uses the strength indicating signal 162 from the quadrature detection circuitry 142 to modify the gain of the second mixed signal.

The signal 780 is simultaneously applied to the bandpass filter IV circuitry 138 which consists of an input resistor 782. The other side of resistor 782 is connected to ground by parallel resistor 784 and capacitor 786. The other side of the resistor 782 is also connected to one side of a ceramic filter 788. The other side of the ceramic filter 788 is connected to pin 12 of IC 730, which is the input of an internal IF amplification circuitry.

Following this amplification, the output of the bandpass filter IV circuitry 138 (pin 15 of the IC 730) is applied to the bandpass filter V circuitry 140. This output signal is known as the "second IF" signal 790.

Figure 9C:
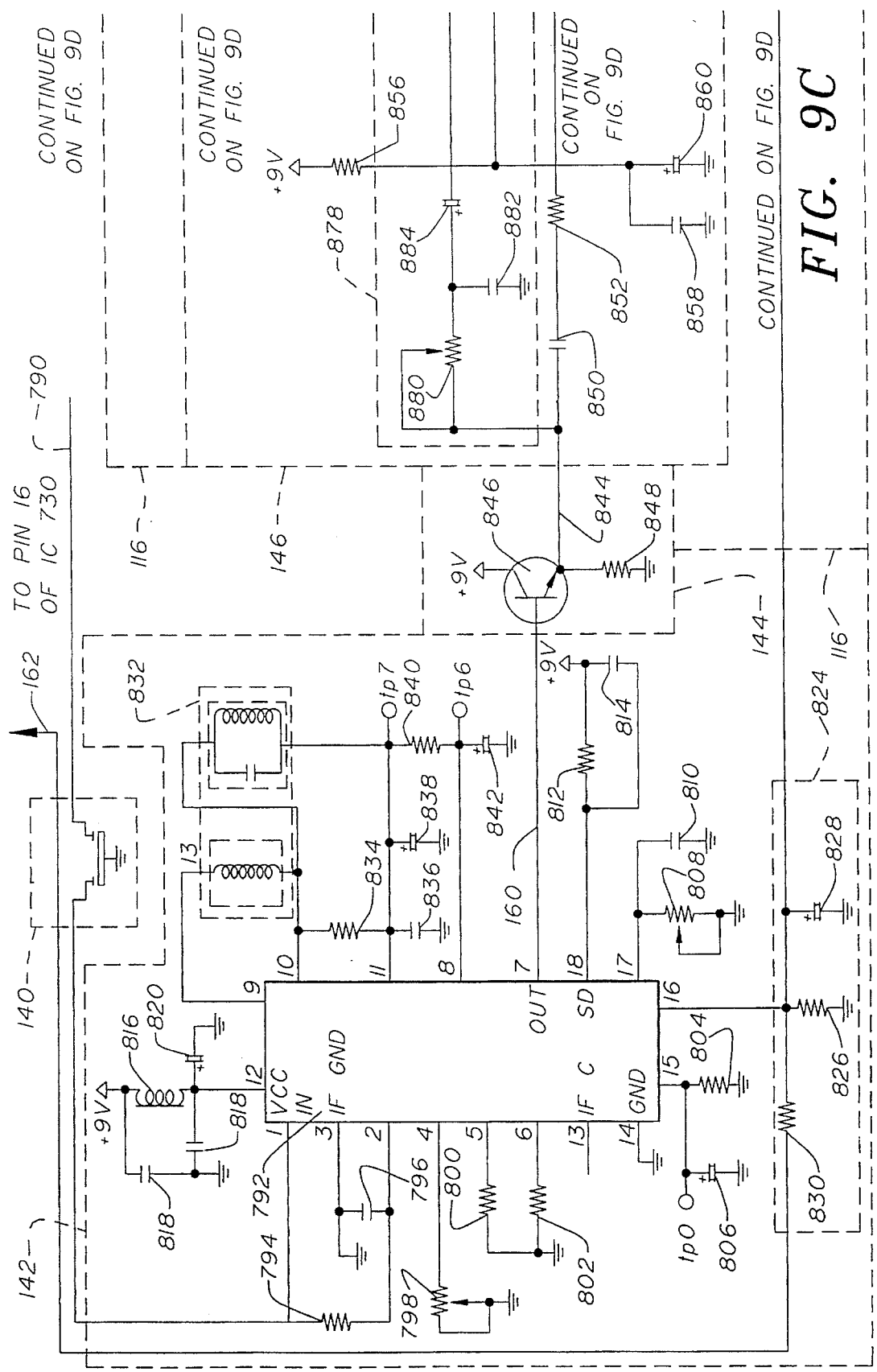

Referring to FIG. 9C, the details of the last stages of the antenna matching and IF circuitry 114 and the input stages to the demultiplexing and audio output circuitry 116 will be discussed. In particular, the second IF signal 790 is applied to the bandpass filter V circuitry 140. This circuitry is implemented in the preferred embodiment using another ceramic filter which is conventionally grounded. This filter provides high selective band pass filtering about the IF frequency. The output of bandpass filtering V circuitry 140 is applied to the quadrature detection circuitry 142.

The quadrature detection circuitry 142 is implemented using an Quadrature Detection IC 792. The IC 792 has an IF amplification stage in addition to the quadrature detection stage. The output of the bandpass filter V circuitry 140 is applied to pin 1 of the IC 792. Pin 1 is the input of a series of three internal IF amplifiers that pre-stage the actual quadrature detection. Pin 1 is connected to pin 3 (which is connected to ground) by a resistor 794, while pin 2 and 3 are connected by a capacitor 796. Pin 4 is connected to ground through a trim potentiometer 798, known as the "mute adjustment." This potentiometer allows the adjustment of the mute threshold. Pins 5 and 6 are tied to ground through resistors 800 and 802, respectively. Pin 15 is connected to a parallel resistor 804 and a parallel capacitor 806, which are both connected to ground. Pin 17 is connected to ground through a trim potentiometer 808 and a parallel capacitor 810. The trim potentiometer 808 and the capacitor 810 form the "station detect adjust." Pin 18 is connected to +9 VDC through a parallel resistor 812 and a parallel capacitor 814. Pin 12 of the IC 792 is coupled to +9 VDC by an inductor 816 for filtering. A capacitor 818 is connected from the +9 VDC side of the inductor 816 to ground. The capacitors 818 and 820 are connected between ground and the other side of the inductor 816.

Quadrature detection processing will now be discussed. Pins 9 and 10 of the IC 792 are coupled to a quadrature detection coil 832, implemented in the preferred embodiment using a Sumida 2217-754 component and a Sumida 2218-457 component. The quadrature detect coil 832 as arranged with the IC 792 provides FM demodulation. Pin 10 is coupled to pin 11 by a resistor 834. Pin 11 is coupled to ground by a capacitor 836 arranged in parallel with a capacitor 838. Pin 11 is coupled to pin 8 through a resistor 840. Pin 8 is then connected to ground by a filtering capacitor 842. The second IF signal 790 is applied to input 1 of the IC 792 where the internal IF amplification circuitry prepares the signal for frequency demodulation; such demodulation is accomplished by internal detection circuitry that is tuned by the quadrature detection coil 832. The strength indicating signal 162 is also internally generated in the IC 792. This signal is fed back to the internal AGC circuitry within the IC 730 (pin 16) to control the gain of the input signal 734 to the mixing II circuitry 136. The strength indicating signal 162 is the output of pin 16 of the IC 792 and this signal is applied to the output network 824. The network 824 consists of a resistor 826 which is connected between pin 16 and ground, a filtering capacitor 828, and a resistor 830 which connects pin 16 of the IC 792 to pin 16 of the IC 730.

The demodulated output of the quadrature detection circuitry 142, the composite signal 160, is applied to the buffering circuit 144. The base of a buffering transistor 846 is directly coupled to output pin 7 of the IC 792. The collector of the transistor 846 is connected to +9 VDC and the emitter is connected to ground through a resistor 848. The buffering circuit 144 buffers the composite signal 160 in preparation for deriving the left and right audio signals. The buffered composite signal 844 is then applied to the demultiplexing and audio output circuitry 116, viz., to the multiplex stereo decoder circuitry 146.

Figure 9D:
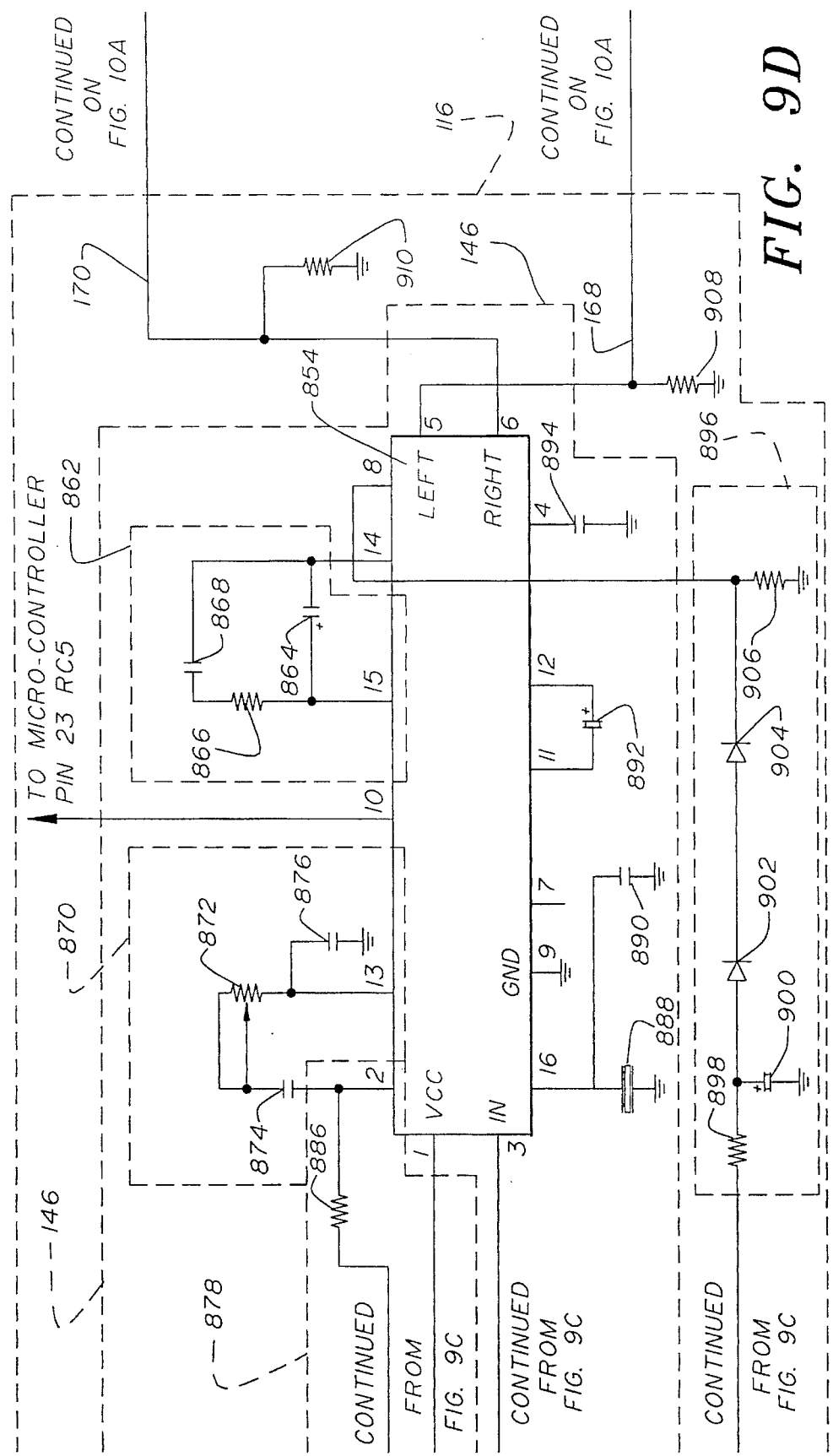

Referring to FIG. 9D, it can be seen that the emitter of the transistor 846 (FIG. 9C) is coupled to the multiplex stereo decoder circuitry 146 by the series arrangement of a capacitor 850 and a resistor 852 to input pin 3 of the multiplex stereo decoder circuitry 146. The multiplex stereo decoder circuitry 146 is implemented in the preferred embodiment using a PLL FM MPX Stereo Demodulator IC 854. The IC 854 is powered by +9 VDC, which is connected to pin 1 through a resistor 856, while parallel capacitors 858 and 860 connect pin 1 to ground.

At pin 3 of the IC 854, the buffered composite signal 844 is applied to an internal phase comparator circuitry (not shown) which is dependent on an external filter circuit 862. The filter 862 consists of a capacitor 864 connected across pins 14 and 15 of the IC 854. A series resistor 866 and a capacitor 868 are connected across pins 14 and 15 also. The output of this internal phase comparator circuitry (at pin 13) is applied to a pilot cancel circuit 870.

The pilot cancel circuit 870 consists of a potentiometer 872 which is connected at one end to pin 13 of the IC 854 and connected at its other end to a capacitor 874 which is in turn connected to pin 2 of the IC 854. A filter capacitor 876 is connected between pin 13 and ground. The potentiometer 872, indicated as "pilot cancel", permits the factory adjustment of the IC 854 to eliminate the pilot signal component which is embedded in the input signal 734; as previously discussed, the pilot signal 69 was introduced into the composite signal 70 by the sine wave shaper circuit 68 in the transmitter 4 and then transmitted to the receiver 6 in the transmitted signal 535. If the pilot signal 69 is successfully sent to the receiver 6, indicating correct transmitter 4 and receiver 6 operation, the pilot signal 69 is no longer needed and is cancelled. This is accomplished by the generation of a sawtooth wave (internal to the IC 854) which is similar in frequency to the pilot signal 69, but whose peaks are 180 degrees out of phase with the pilot signal 69. Upon the summation of the pilot signal 69 with the sawtooth wave at pin 2, the result is to essentially cancel out the pilot signal 69. Fine tuning of this cancelling sawtooth wave is accomplished by way of the pilot cancel circuit 862.

Simultaneously, the buffered composite signal 844 (FIG. 9C) is applied to pin 2 of IC 854 through a separation adjust circuitry 878 (FIG. 9D). The separation adjust circuitry 878 consists of a potentiometer 880 which is connected at one end to the emitter of the transistor 846 and to a filter capacitor 882 at its other end. The connect point of the potentiometer 880 and the filter capacitor 882 is also connected to one side of a capacitor 884. The other side of the capacitor 884 is connected to an input resistor 886. The potentiometer 880, permits the factory adjustment of the phase of the buffered composite signal 844, as processed within the IC 854, to maximize the separation of the left 168 and right 170 audio output signals. Both the output of the pilot cancel circuit 870 and the output of the separation adjust circuitry 878 are summed at pin 2 of the IC 854 (FIG. 9D).

Pin 16 of the IC 854 is coupled to ground by a ceramic resonator 888 to form a 600 kHz signal to clock the IC 854. A parallel capacitor 890 also is connected across the ceramic resonator 888. Pin 10 of the IC 854 is connected to microcontroller 137 pin 23 RC5. If a pilot signal 69 is detected by the receiver 6, pin 10 informs the microcontroller 137 of this by sending a low signal to pin 23 of the microcontroller 137. Pin 10 also serves as the output of an internal driver used to activate the muting circuitry 120, as will be described later. Pin 9 of the IC 854 is coupled to ground. Pins 11 and 12 are connected by a capacitor 892 which is necessary for the internal pilot signal detector in determining whether the pilot signal 69 is being received or not. The capacitor 894, connected between pin 4 and ground, improves noise rejection.

The strength indicating signal 162 is simultaneously sent to the multiplex stereo decoder 146 for correct demultiplexing. Pin 16 of the IC 792 (FIG. 9C) is also connected to an input network 896 (FIG. 9D). The network 896 consists of a resistor 898 with a capacitor 900 connected to ground. The common point between the resistor 898 and the capacitor 900 is connected to a diode 902, whose other side is connected to a second diode 904. The other side of the diode 904 is connected both to pin 14 of IC 854 and to a resistor 906, whose other side is tied to ground. Resistors 898 and 906 act as a ½ bleeder and diodes 902 and 904 provide an appropriate signal for an internal noise control function with the IC 792.

The demultiplexed left 168 and right 170 output signals are provided at the IC 854 pins 5 and 6, respectively. Pin 5 and pin 6 have grounding resistors 908 and 910, respectively, connected between themselves and ground.

At this point, there is no other coupling, mechanical or electrical (except for common use of voltage divider 928 as a reference voltage used at the noninverting terminal of operational amplifier 922 and for first muting circuitry 150) of the left and right output signals 168 and 170. As such the following electrical circuit description will focus only on the left output signal 168 processing; it being understood that the right output signal 170 processing is identical unless otherwise indicated.

Figure 10A:
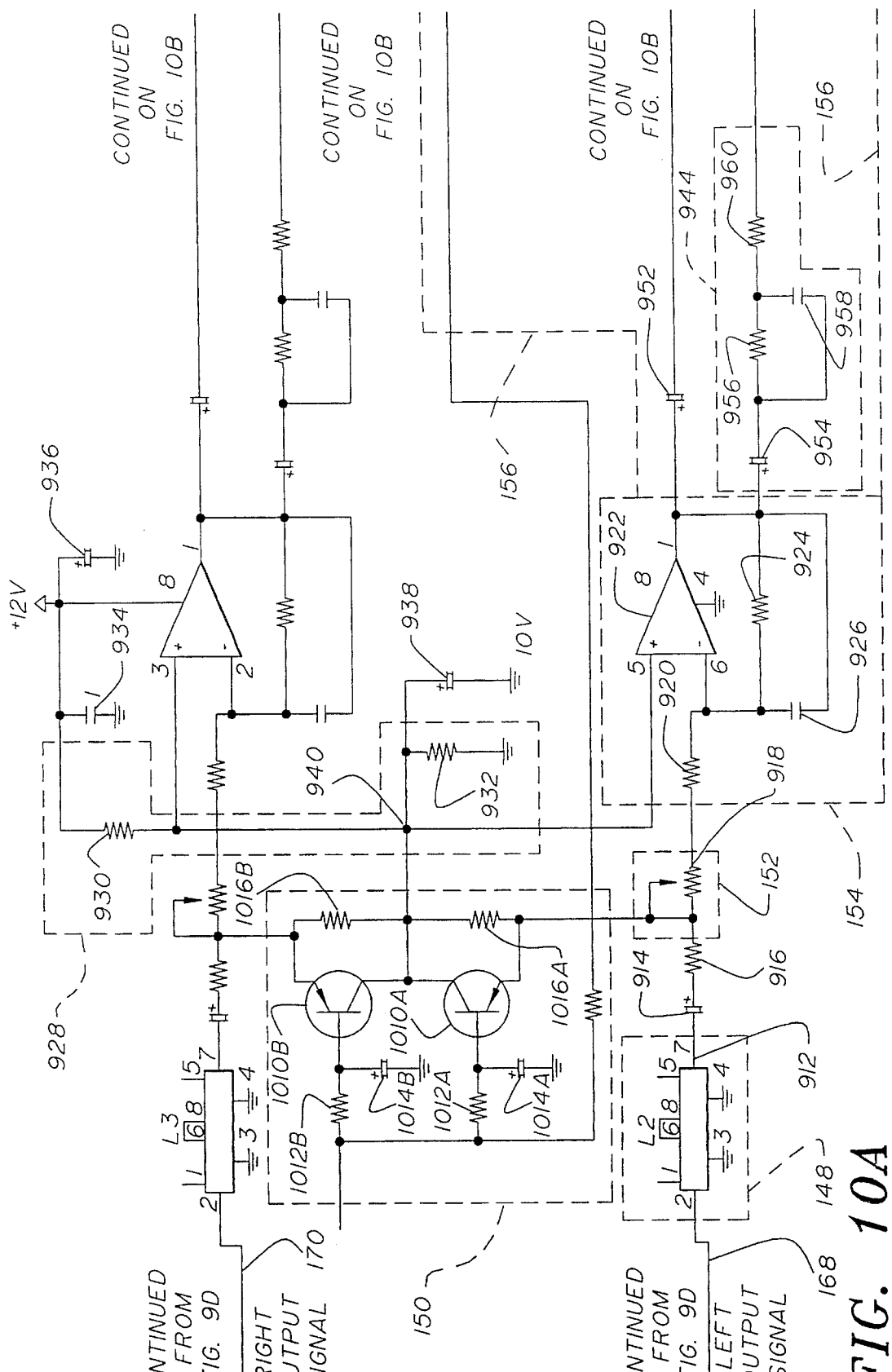
FIGS. 10A and 10B together make up a schematic diagram of the demultiplexing and the audio output circuitry of the receiver.
Figure 10B:
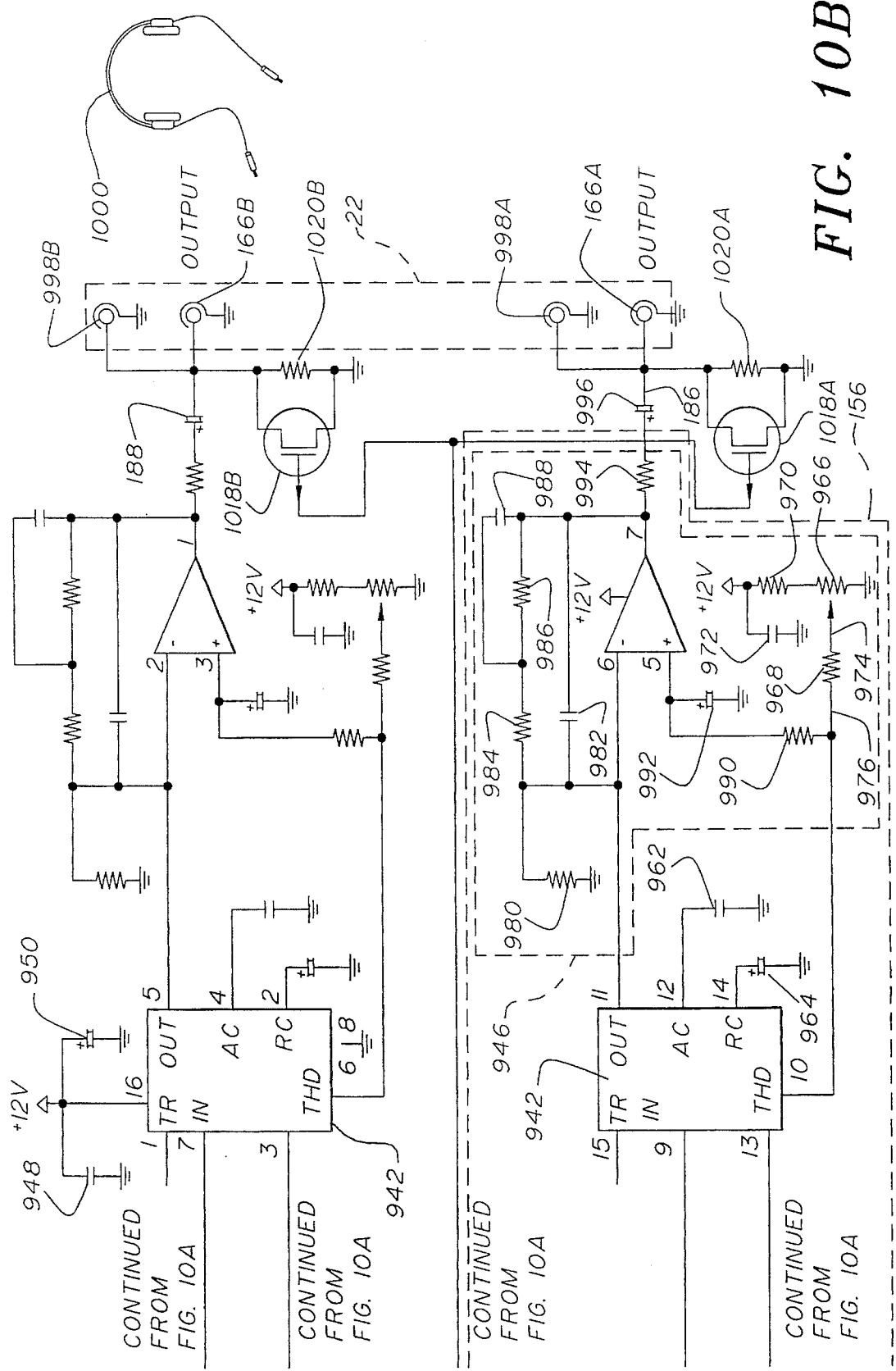

Referring to FIGS. 10A and 10B, the details of the remaining portion of the demultiplexing and audio output circuitry 116 will be discussed. To remove any pilot or multiplexing by-products from the left 168 output signal, the signal 168 is passed through the lowpass filter 148. This filter insures that only signals between 20 Hz and 20 kHz are passed.

A filtered left signal 912 is applied to a coupling capacitor 914, followed by a series resistor, 916. The filtered left signal 912 is applied to the first muting circuitry 150, to be discussed later. If the first muting circuitry 150 is inactive, the filtered left signal 912 is passed directly to the compandor adjust circuitry 152. The compandor adjust circuitry 152 comprises a potentiometer 918 connected between a resistor 916 and an input resistor 920 in the de-emphasis circuitry 154. In this configuration, the adjusting potentiometer 918 modifies the DC gain of an operational amplifier 922, and in effect adjusts the input signal to the downstream expander circuitry 156.

The output of the compandor adjust circuitry 152 is applied to the de-emphasis circuitry 154. The de-emphasis circuitry 154 comprises a filter that has a DC gain and a 50 microsecond time constant. Depending on the setting of the compandor adjust potentiometer 918, the DC gain can vary from −1.4 down to −4.5. The operational amplifier 922 has an input resistance consisting of the potentiometer 918 and the resistor 920. A feedback resistor 924, a feedback capacitor 926, and the resistor 920 are all connected at the inverting terminal of the operational amplifier 922. Both feedback components are connected at their other ends to the output of the operational amplifier 922. The half-power supply voltage (+6 VDC) is applied to the noninverting terminal of the operational amplifier 922 by way of a voltage divider 928, composed of a resistor 930 tied to +12 VDC and a resistor 932 connected to ground. Parallel filter capacitors 934 and 936 are connected between the +12 VDC side of the resistor 930 and ground. A filter capacitor 938 is connected between the connect point 940 of resistors 930 and 932 and ground.

The output of de-emphasis circuitry 154 is applied to the expander circuitry 156. The expander circuitry 156 reverses the effect of the compressor circuitry 54 in the transmitter 6. Expander processing is implemented using a programmable analog expander IC 942. This is the same IC used in the compressor circuitry 54 of the transmitter 4. The expander circuitry 156 also utilizes a similar external filtering circuit 944 and an external operational amplifier circuitry 946. As with the IC 274 (FIG. 4B) used in transmitter 4, the IC 942 used in the receiver 6 accomodates two internal channels for expander processing. Here, as used in the receiver 6, the internal channel A (not shown) processes the right output signal 170, while the internal channel B (not shown) processes the left output signal 168. However, the IC 942 as used in the receiver 6 takes its input from the de-emphasis circuit 154 which precedes the IC 942. The IC 274 as used in the transmitter 4 receives its input in the form of a feedback signal from the output of the operational amplifier 312 (FIG. 4B). Also, power to the IC 942 as used in the receiver 6 is by direct connection of pin 16 connected to +12 VDC, with parallel filter capacitors 948 and 950 connected between +12 VDC and ground. The IC 274 has the resistor 278 connected between its pin 16 and +12 VDC.

The output of the de-emphasis circuitry 154 is connected to the expander IC 942 pin 13 (FIG. 10B, input to the internal channel B full wave rectifier used to detect the average value of the input signal) through an external filtering circuit 944 and to pin 9 through a coupling capacitor 952. An input capacitor 954 is connected directly to the output of the operational amplifier 922. The other side of the capacitor 954 is connected to a resistor 956 and a capacitor 958 which are connected in parallel. The other side of the resistor 956 and the capacitor 958 are connected to an input resistor 960 whose other side is connected to pin 13 of the expander IC 942. The internal channel B expander circuitry is correctly biased with a capacitor 962 connected between pin 12 and ground, and a capacitor 964 connected between pin 14 and ground.

Total Harmonic Distortion (THD) can be externally controlled by a potentiometer. To that end pin 10 is connected to a trim potentiometer 966 through a resistor 968. The potentiometer 966 is connected to +12 VDC through a resistor 970. A filter capacitor 972 is connected between +12 VDC and ground. The other end of the potentiometer 966 is tied to ground. The center tap 974 of the potentiometer 966 is connected to a resistor 968 at its free end. Trimming of the potentiometer 966 changes the THD control signal 976.

The output of the internal channel B, pin 11, is directly connected to the inverting terminal of an operational amplifier 978 in the external operational amplifier circuitry 946. A resistor 980 is connected between ground and the inverting terminal of the operational amplifier 978. A feedback capacitor 982 is connected from the inverting terminal to the output of the operational amplifier 978. A resistor 984 is connected from the inverting terminal to a resistor 986 which is connected to the output of the operational amplifier 978. A capacitor 988 is connected across the resistor 986. The THD control signal 976 also serves as a reference voltage applied to the noninverting terminal of the operational amplifier 978 through a resistor 990. A filter capacitor 992 is connected between the noninverting terminal of the operational amplifier 978 and ground. An output resistor 994 is connected to the output of the operational amplifier 978. A coupling capacitor 996 connects the output expander circuitry 156 (i.e., the resistor 994) to the audio output jacks.

Assuming that the second muting circuitry 158 (discussed below) is inactive, the left 186 and right 188 audio signals are passed to their respective audio output jacks. The left audio signal 186 is passed to the left output jack 166A and the breakout jack 998A. Similarly, the right audio signal 188 is passed to the right output jack 166B and to the breakout jack 998B.

The system is arranged so that the user can attach some external listening device 1000, e.g., headphones or loudspeakers, which include left and right audio inputs into the respective left 166A and right 166B output jacks. The left 998A and right 998B breakout jacks serve the same purpose as discussed with respect to left 186A and right 186B breakout jacks used in the transmitter 4.

Figure 11A:
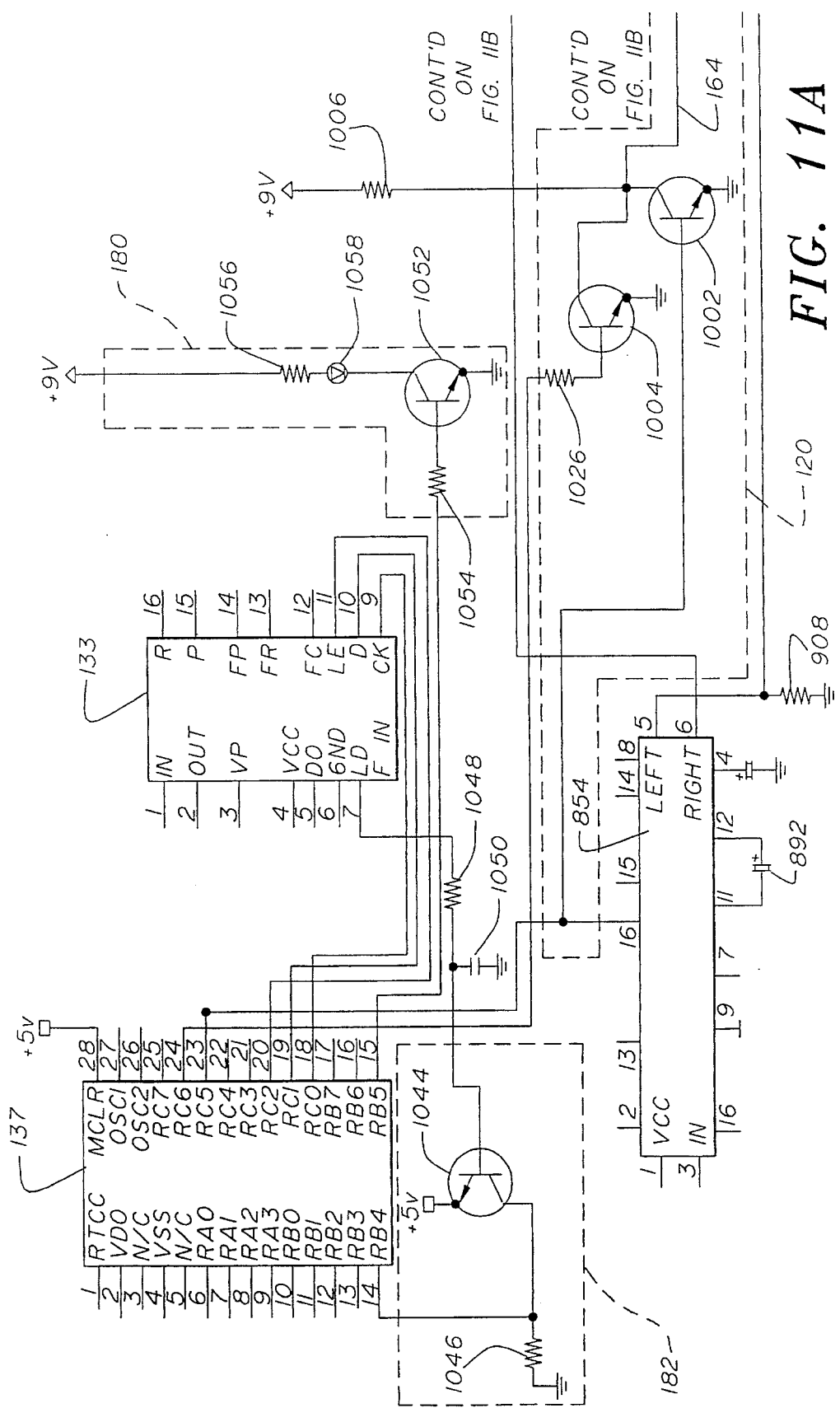
FIG. 11A and 11b together make up a schematic diagram for the microcontroller circuitry and muting control and power circuitry of the receiver.
Figure 11B:
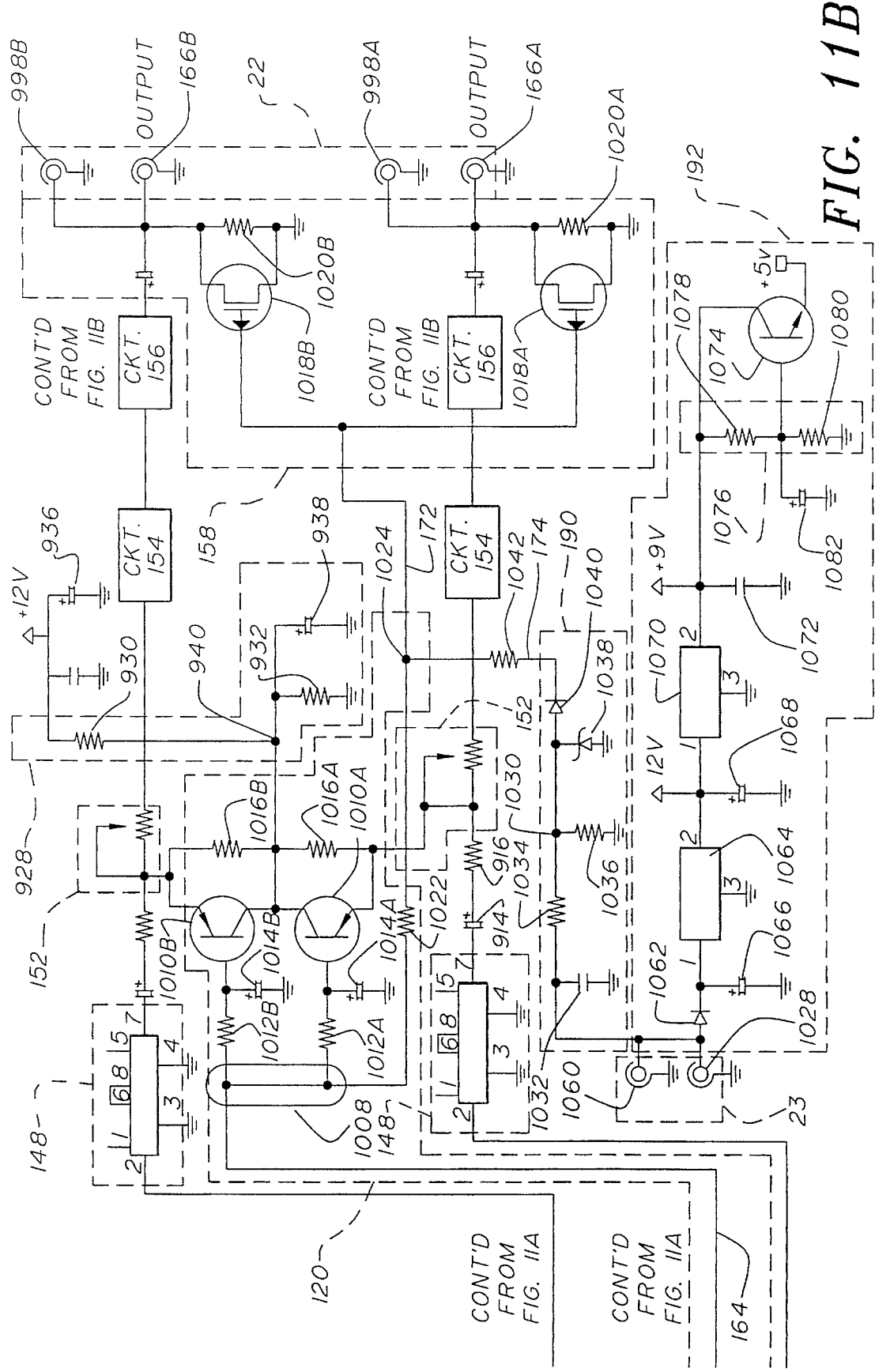

Referring to FIGS. 11A and 11B, the details of the muting control circuitry 120, and the microcontroller circuitry 118, the first 150 and second 158 muting circuits, and the receiver power circuitry 122 will be discussed.

In particular, muting is controlled by pin 10 of the multiplex stereo decoder circuitry 146 (FIG. 11A), by the microcontroller 137 (FIG. 11A), or by the power muting circuitry 190 (FIG. 11B).

The purpose of the first 150 and second 158 muting circuits is to deprive the user of the left 186 and right 188 audio output signals whenever there is no pilot signal 69 being transmitted from the transmitter 4, or whenever there is no signal lock, or whenever power transients are occurring in the receiver 6. Both the first 150 and second 158 muting circuits are driven by the muting control circuitry 120. The muting control circuitry 120 includes the transistors 1002 and 1004 (FIG. 11A), either of which turn on/off the first 150 and second 158 muting circuits. The transistor 1002 is controlled by the multiplex stereo decoder 146 while the transistor 1004 is controlled by the microcontroller 137.

The multiplex stereo decoder circuitry 146 monitors the buffered composite signal 844 for the presence of the pilot signal 69 imposed in the multiplexing circuitry 28 of transmitter 4. If the internal pilot detector in the multiplex stereo decoder 146 does not detect a pilot signal 69, pin 10 of the IC 854 will go high. Because pin 10 is connected to the base of the transistor 1002, this high signal turns on the transistor 1002. The collector of transistor 1002 is coupled to +9 VDC through a resistor 1006 while the emitter of the transistor 1002 is coupled directly to ground. When the transistor 1002 turns on, the collector is driven to ground. This action drives the common point 1008 (FIG. 11B) to ground thus providing the mute control signal 164. When the transistor 1002 turns off, the collector floats up to +9 VDC causing the common point 1008 to also float up to +9 VDC.

The first muting circuitry 150 is as follows: the common point 1008 is connected to the base of a transistor 1010A by way of a resistor 1012A and to the base of a transistor 1010B by way of a resistor 1012B. The respective bases of those transistors are also connected to ground by way of filtering capacitors 1014A and 1014B, respectively. The collectors of the transistors 1010A and 1010B are connected together, and both collectors are coupled to the connect point 940 in the voltage divider 928. A capacitor 938 provides the high frequency path to ground for the diverted left 912 and right signals. Both transistors 1010A and 1010B are p-n-p transistors so that they conduct whenever their emitter is at least 0.7 volts higher than their base. Therefore, whenever the common point 1008 is driven to ground, (i.e., the mute command signal 164 is provided) both transistors 1010A and 1010B conduct. When they conduct, they divert both the filtered left 912 and the filtered right signals away from the input of the compandor adjust circuitry 152 and down to ground through the connect point 940. Whenever the common point 1008 floats up to +9 VDC, it shuts off the transistors 1010A and 1010B, restoring the filtered left 912 and filtered right signals to the input of their respective compandor adjust circuitry 152.

The bias resistors 1016A and 1016B (FIG. 11B) are connected across the emitter-to-collector of transistors 1010A and 1010B, respectively. The emitter of the transistor 1010B is connected to the output of the low pass filter circuitry 148, just following the resistor 916. The emitter of the transistor 1010A is connected to the output of the low pass filter circuitry 148, just before the equivalent resistor of 916.

The second muting circuitry 158 consists of one p-channel JFET (junction field effect transistor) connected between the output of the expander circuitry 156 and ground for the left audio signal 186 and the right audio signal 188. Specifically, the JFET 1018A has its drain connected to the left audio jack 166A and its source connected to ground. Similarly, the JFET 1018B has its drain connected to the right audio jack 166B and its source connected to ground. An isolation resistor 1020A is connected between the drain and source of the JFET 1018A, while an isolation resistor 1020B is connected between the drain and source of the JFET 1018B. The gate of JFET 1018A is connected to the gate of JFET 1018B which are then coupled to an input resistor 1022 at the junction point 1024. The other side of the resistor 1022 is connected to the collector of the transistors 1002 and 1004.

Whenever the voltage at the gate of the JFET 1018A and 1018B is low (i.e., a mute command signal 172 is provided), both JFETs turn on, shorting their respective isolation resistors and thereby diverting the respective left 186 and right 188 audio signals to ground. Whenever the common point 1008 is driven to ground (i.e., mute command signal 164 and mute command 172 provided), the JFETs 1018A and 1018B are turned on, diverting the two audio signals to ground. Whenever the common point 1008 goes high, mute command signal 172 vanishes (depending on the power muting command 174 discussed below), shutting off JFETs 1018A and 1018B, restoring the left audio signal 186 and the right audio signal 188 to their respective output jacks.

Both the first muting circuitry 150 and the second muting circuitry 158 can be identically driven by the microcontroller 137. The microcontroller 137 pin 24 RC6 is connected to the base of the transistor 1004 through resistor a 1026 (FIG. 11A). Because the collector of the transistor 1004 is directly coupled to the collector of the transistor 1002, turning on and off the transistor 1004 creates the same command signal 164 and its effects as described above.

The power muting circuitry 190 (FIG. 11B) drives only the second muting circuitry 158 to prevent the "thumping" noise to the listener's output that occurs when there are power transients. The power muting circuitry 190 takes +15 VDC provided at the power jack 1028 and applies it to a voltage divider 1030. The power jack 1028 is also connected to a filter capacitor 1032, which is connected to ground. The voltage divider 1030 consists of a resistor 1034 and a resistor 1036. The resistor 1034 is connected to a filter capacitor 1032 at one end and to a resistor 1036 at the other end. The other side of the resistor 1036 is connected to ground. The connect point of the resistor 1034 and the resistor 1036 remains at +14 VDC whenever external +15VDC power is applied at the power jack 1028. The output of the voltage divider 1030 is connected to a zener diode 1038 whose other side is connected to ground. The output of the voltage divider 1030 is applied to a diode 1040. The other side of the diode 1040 is connected to a resistor 1042. The other side of the resistor 1042 is connected to the resistor 1022 at the junction point 1024, which is coupled directly to the gates of the JFETs 1018A and 1018B.

The power muting circuitry 190 operates as follows: as long as +14 VDC is present at the output of the voltage divider 1030, the gates of the JFET 1018A and JFET 1018B remain off and the left 186 and right 188 audio signals are passed to their respective output jacks. However, if power should fail, the output of the voltage divider 1030 goes low (i.e., the power mute command 174 provided) driving the gates of JFETs 1018A and 1018B low and thereby turning on both JFETs as described above. The muting JFETs serve to prevent the "thumping" noise to the listener's output that occurs when there are power transients.

However, the upstream muting command 164 can turn on the JFETs 1018A and 1018B despite the presence of +14 VDC at the output of the voltage divider 1030. The resistor 1022 is a 10 k ohm resistor which connects the common point 1008 to the gate of each JFET 1018A and 1018B. The resistor 1042 is a 100 k ohm resistor which connects the voltage divider 1030 output to the gates of each JFET. Since the resistor 1022 has a lower impedance than the resistor 1042, the mute command signal 164 will override the presence of the +14 VDC at the voltage divider 1030 and the gates of the JFET 1018A and 1018B will be driven low. The result is that the left 186 and right 188 audio signals will be diverted to ground.

The microcontroller circuitry 118 includes the unlock detection circuitry 182 and the signal-ok indicator circuitry 180 (FIG. 11A).

The microcontroller 137 is informed of signal lock status by way of the unlock detection circuitry 182. The unlock detection circuitry 182 consists of a p-n-p transistor 1044 whose emitter is directly connected to +5 VDC and whose collector is connected to ground through a resistor 1046. The collector of the transistor 1044 is also connected to the microcontroller 137 pin 14 RB4. The synthesizer 133 pin 7 controls the turn-on/off of the transistor 1044 through a resistor 1048. A filter capacitor 1050 is connected between the resistor 1048 and ground. Should signal lock be lost, pin 7 of the synthesizer 133 will go low, turning on the transistor 1044 and causing +5 VDC to find a path to ground through the resistor 1046. The voltage developed across the resistor 1046 will signal pin 14 RB4 of the microcontroller 137 of the unlock condition. As discussed earlier, the microcontroller 137 will, in response to the unlock condition, issue a mute command.

The signal-ok indicator circuitry 180 operates as follows: the microcontroller 137 pin 15 RB5 provides the turn-on/off signal to a transistor 1052 through a resistor 1054. The resistor 1054 is connected to the base of the transistor 1052. +9 VDC is connected to a resistor 1056 whose other side is connected to an LED 1058. The other side of the LED 1058 is connected to the collector of the transistor 1052. If the receiver 6 is operating with signal lock and the pilot signal 69 is being received, the microcontroller 137 issues a forward biasing voltage to the base of the transistor 1052 through the resistor 1054, causing the transistor 1052 to conduct, sinking the +9 VDC signal and illuminating the LED 1058, indicating to the listener that the receiver 6 is operating correctly.

The receiver power circuitry 122 (shown in FIG. 11B by its component circuits 190 and 192) takes +15 VDC power in at the power jack 1028. The breakout jack 1060 allows another device to tap into the +15 VDC applied to the receiver 6. The receiver power circuitry 122 (i.e., the circuits 190 and 192) brings power to all the receiver 6 circuits through the use of the power path 192. A diode 1062 passes the +15 VDC to a regulator 1064. A filter capacitor 1066 is connected to ground between the diode 1062 and the regulator 1064. The regulator 1064 provides regulated +12 VDC with a filtering capacitor 1068 connected between the regulator 1064 output and ground. The regulator 1064 +12 VDC output is then applied to a regulator 1070 which outputs a regulated +9 VDC. This output is also filtered by a capacitor 1072 connected between the regulator 1070 output and ground. The +9 VDC is then applied to the collector of a transistor 1074 which functions as a current amplifier. A voltage divider 1076 consists of a resistor 1078 and a resistor 1080 connected in series between +9 VDC and ground. The common tie point between the resistors 1078 and 1080 is connected to the base of the transistor 1074 and provides +6.48 VDC to the base. The emitter is held to +5 VDC and acts as the source of the receiver 6 +5 VDC power. A filter capacitor 1082 is connected between the common tie point of the voltage divider 1076 and ground.

In another embodiment of the transmitter 4 and the receiver 6, the transmitter 4 and the receiver 6 are modified to eliminate the multiplexing and demultiplexing features of these devices. More specifically, multiplexing and demultiplexing are not required where the transmitter 4 and receiver 6 are used to transmit composite digital signals which may be produced by any digital information source, such as a CD ROM player which provides the multiplexing feature. This digital signal may be provided to a device which includes demultiplexing to convert the composite digital signal to left and right digital signals.

The transmitter 4 would be modified by eliminating the left audio input 42 and right audio input 44 and the associated circuits 46, 48, 50, 52, 54, 56 and the stereo multiplexor 58. The programmable divider 66 would be eliminated. The receiver 6 would be modified by eliminating the multiplex stereo decoder 146 and the provision of the strength indicating signal 162 from the quadrature detection circuitry 142. Additionally, circuits 148, 152, 154 and 156 would be eliminated.

It will be understood that the above description is of the invention and that the invention is not limited to the specific form described herein. For example, as previously discussed, the above-described transmitter and receiver may be modified for use in transmitting digital signals which are audio signals or digital data signals for other systems such as computer systems. Various other substitutions, modifications, changes and omissions may be made in the design and arrangement of the elements without departing from the spirit of the invention as expressed in the claims.

APPENDIX

TABLE I

COMPONENT, CIRCUIT & SIGNAL IDENTIFICATION 2 system
4 transmitter
6 receiver
8A channel A input connector
8B channel B input connector
8C channel C input connector
9A channel A level select switch
9B channel B level select switch
9C channel C level select switch
10 transmitter house code select switch
12 transmitter antenna
14 transmitter power connector
16 receiver house code select switch
18 3-position channel select switch
20 receiver antenna
22 audio output connector
23 receiver power connector
24 one channel
26 audio input circuitry
28 multiplex circuitry
30 RF circuitry
32 multiplex control circuitry
34 combination broadcast circuitry
36 microcontroller circuitry
38 pilot kill circuitry
40 transmitter power circuitry
42 left audio input signal
44 right audio input signal
46 input level select circuitry
48 buffer circuit
50 low pass filter circuit:TOKO 257BLR-3718N
52 gain circuit
54 compression circuit
56 pre-emphasis circuit
58 multiplexor circuitry
60 buffer circuit
62 composite filter circuit
64 oscillator circuit
66 programmable frequency divider circuit
68 sine wave shaper circuit
69 pilot signal
70 composite signal
72 tagged composite signal
74 deviation adjust circuit
76 local oscillator circuit
78 buffering circuit
80 RF amplifier circuit
82 VCO module Murata MQC515-915
84 tuning voltage signal
86 channel A MB1501 Serial Input PLL Frequency Synthesizer
88 channel A pre-scaler (part of the MB15011C)
90 EPROM-Based 8-Bit CMOS Microcontroller PIC16C5X
94 RF amplified modulated signals
96 ferrite combiner TOKO 458DS-1014
98 bandpass filter TOKO 4DFA914E-10
100 combined signal
106 unlock detection circuitry
108 transmit-ok-indication circuitry
110 regulator circuitry 112 power muting circuitry
114 IF circuitry
116 audio output circuitry
118 receiver microcontroller circuitry
120 muting control circuitry
122 receiver power circuitry
124 bandpass filter I circuitry
126 RF amplifying circuitry
128 bandpass filter II circuitry
130 receiver local oscillator circuitry
131 tuning voltage signal
132 mixing I circuitry
133 MB1501 Serial Input PLL Frequency Synthesizer
134 bandpass filter III circuitry
135 receiver pre-scaler (part of the MB1501 IC)
136 mixing II circuitry
137 EPROM-Based 8-Bit CMOS Microcontroller PIC16C5X
138 bandpass filter IV circuitry
140 bandpass filter V circuitry
142 quadrature detection circuitry
144 buffer circuitry
146 multiplex stereo decoder circuitry
148 low pass filter TOKO 257BLR-3718N
150 first muting circuitry
152 compandor input adjust circuit
154 de-emphasis circuitry
156 expandor circuitry
158 second muting circuitry
160 composite signal
162 strength indicating signal
164 first mute command signal
166 A left audio output jack
166 B right audio output jack
168 left output signal
170 right output signal
172 second mute command signal
174 power presence signal
180 signal-ok indicator circuitry
182 unlock detect circuitry
184 pilot status signal
186 left audio signal
188 right audio signal
190 muting control path
192 regulator path
194 audio source #1
196A channel A left audio input jack
196B channel A right audio input jack
198A channel A left audio breakout jack
198B channel A right audio breakout jack
200A ground resistor 100 k
202A left signal attenuator
202B right signal attenuator
204A resistor 16 k ohms
204B resistor 16 k ohms
206A resistor 28 k ohms
206B resistor 28 k ohms
208A resistor 4 k ohms
208B resistor 4 k ohms
210A resistor 1 k ohms
210B resistor 1 k ohms
212A coupling capacitor 10 microfarads
212B coupling capacitor 10 microfarads
214A pick-off point
214B pick-off point
216A pick-off point
216B pick-off point
218A pick-off point
218B pick-off point
222A terminal
222B terminal
224A terminal
224B terminal
226A terminal
226B terminal
228A switch lever
228B switch lever
230A left audio pole
230B right audio pole
232 coupling capacitor 10 microfarads
234 operational amplifier
236 feedback resistor 10 k ohms
238 resistor 10 k ohms
240 voltage divider
242 resistor 2 k2 ohms
244 resistor 2 k2 ohms
246 filter capacitor 220 microfarads
248 tie point
250 resistor 100 k ohms
252 output resistor 3 k3 ohms
254 resistor 3 k3 ohms
256 feedback resistor 3 k ohms
258 operational amplifier
260 coupling capacitor 10 microfarads
262 resistor 62 k ohms
264 mylar capacitor 0.0047 microfarads
266 filter
268 resistor 18 k ohms
270 resistor 12 k ohms
272 voltage divider
274 programmable analog expander IC NE/SA572
276 external operational amplifier circuit
278 limiting resistor 22 ohms
280 filter capacitor 100 microfarads
282 mylar parallel capacitor 0.022 microfarads
284 parallel capacitor 22 picofarads
286 parallel capacitor 10 microfarads
288 parallel capacitor 22 picofarads
290 filter circuit
292 capacitor 10 microfarads
294 mylar parallel capacitor 0.01 microfarads
296 parallel resistor 30 k ohms
298 resistor 3 k3 ohms
300 coupling capacitor 10 microfarads
302 resistor 510 k ohms
304 center tap
306 THD adjust trim potentiometer 20 k ohms
308 resistor 27 k ohms
310 THD control signal
312 operational amplifier
314 resistor 1 k ohms
316 mylar capacitor 4.7 microfarads
318 internal channel B output
320 capacitor 22 picofarads
322 feedback capacitor 100 picofarads
324 feedback resistor 3 k1 ohms
326 feedback resistor 9 k ohms
328 capacitor 10 microfarads
330 external operational amplifier output
332 resistor 10k ohms
334 resistor 1 k ohms
336 mylar capacitor 0.0047 microfarads
338 operational amplifier
340 coupling capacitor 10 microfarads 342 feedback resistor 47 k ohms
344 voltage divider
346 resistor 1 k ohms
348 resistor 2 k2 ohms
350 resistor 2 k2 ohms
352 filtering capacitor 220 microfarads
354 filtering capacitor 10 microfarads
356 left emphasized signal
358 right emphasized signal
360 voltage reference signal
362 left audio signal transmission gate IC CMOS 4066
364 right audio signal transmission gate IC CMOS 4066
366 filtering capacitor 0.01 microfarads
368 left multiplex control signal
370 right multiplex control signal
372 inverter
374 feedback capacitor 22 picofarads
376 feedback resistor 20 k ohms
378 operational amplifier
380 input resistor 20 k ohms
382 output resistor 1 k8 ohms
384 filter TOKO 12 ANS-T1102Z
386 capacitor network
388 capacitor 470 picofarads
390 capacitor 0.0015 microfarads
392 capacitor 390 picofarads
394 coupling network
396 series resistor 2 k ohms
398 series resistor 20 k ohms
400 mylar capacitor 0.0015 microfarads
402 ceramic resonator
404 inverter
406 inverter
408 feedback resistor 1M ohms
410 resistor 4 k7 ohms
412 loading capacitor 330 picofarads
414 loading capacitor 470 picofarads
416 resistor 10 ohms
418 filtering capacitor 0.01 microfarads
420 mylar capacitor 0.015 microfarads
422 resistor 15 k ohms
424 capacitor 0.001 microfarads
426 operational amplifier
428 resistor 15 k ohms
430 feedback resistor 15 k ohms
432 mylar capacitor 0.0015 microfarads
434 mylar capacitor 0.0015 microfarads
436 resistor 2 k2 ohms
438 resistor 100 k ohms
440 capacitor 33 microfarads
442 potentiometer 10 k ohms
444 center tap
446 modulation output
448 resistor 100 ohms
450 mylar filtering capacitor 10 microfarads
452 feedback frequency signal
454 resistor 18 ohms
456 resistor 18 ohms
458 capacitor 22 picofarads
460 resistor 1 k8 ohms
462 mylar capacitor 1 microfarad
464 mylar capacitor 47 microfarads
466 series resistor 150 ohms
468 limiting resistor 33 ohms
470 parallel capacitor 22 picofarads
472 mylar capacitor 47 microfarads
474 resistor 47 k ohms
476 resistor 47 k ohms
478 resistor 47 k ohms
480 resistor 47 k ohms
481 filter capacitor 0.1 microfarads
482 external oscillator circuit
484 4 MHz oscillator
486 capacitor
487 capacitor 0.001 microfarads
488 capacitor
490 adjustable capacitor
492 frequency modulation signal
494 input resistor 18 ohms
496 transistor
498 feedback resistor 30 k ohms
500 resistor 270 ohms
502 filter capacitor 22 picofarads
504 capacitor 22 picofarads
506 resistor 10 ohms
508 resistor 18 ohms
510 resistor 39 ohms
512 capacitor 22 picofarads
514 transistor
516 voltage divider
518 resistor 2 k7 ohms
520 resistor 1 k8
522 inductor 8.2 nanoHenries
524 parallel resistor 270 ohms
526 parallel capacitor 22 picofarads
528 filter capacitor 22 picofarads
530 capacitor 15 picofarads
532 resistor 1 k ohms
534 capacitor 9 picofarads
535 transmitted signal
536 external power source
538 power jack
540 input diode IN4148
542 filter capacitor 1000 microfarads
544 filter capacitor 0.1 microfarads
546 regulator
548 bus point
550 capacitor 0.1 microfarad
552 current limiting resistor 1 k5 ohms
554 light emitting diode
556 resistor 10 k ohms
558 zener diode
560 resistor 10 k ohms
562 transistor
564 connect point
566 resistor 2 k2 ohms
568 transistor
570 resistor 10 k ohms
572 signal
574 transistor
576 resistor 10 k ohms
578 resistor 33 k ohms
580 capacitor 1 microfarad
582 diode IN4148
584 transistor
586 resistor
588 feedback resistor
590 mylar capacitor
592 A OR diode IN4148
592 B OR diode IN4148
592 C OR diode IN4148
594 A series resistor
594 B series resistor
594 C series resistor 596 OR junction
598 transistor
600 input resistor 10 k ohms
602 resistor 1 k2 ohms
604 light emitting diode
606 resistor 47 k ohms
608 resistor 47 k ohms
610 resistor 47 k ohms
612 resistor 47 k ohms
614 filter capacitor 0.01 microfarads
616 filter capacitor 0.01 microfarads
618 filter capacitor 0.01 microfarads
620 filter capacitor 0.01 microfarads
622 pole
624 switch terminal
626 resistor 47 k ohms
628 capacitor 0.01 microfarads
630 switch terminal
632 resistor 47 k ohms
634 capacitor 0.01 microfarads
635 filtering capacitor 0.1 microfarads
636 switch terminal
637 filter capacitor 0.01 microfarads
638 resistor 47 k ohms
639 resistor 4 k7 ohms
640 microcontroller external oscillator circuit
642 4 MHz oscillator
644 capacitor
646 capacitor
648 adjustable capacitor 30 microfarads
650 input capacitor 0.001 microfarads
652 resistor 100 ohms
654 mylar capacitor 10 microfarads
655 resistor
656 VCO module Murata MQC505-836
658 resistor 1 k8 ohms
660 mylar capacitor 1 microfarad
662 resistor 150 ohms
664 capacitor 47 microfarads
666 resistor 33 ohms
668 capacitor 22 picofarads
670 mylar capacitor 47 microfarads
671 capacitor 0.01 microfarads
672 local oscillator signal
673 feedback frequency signal
674 filtered received signal
676 resulting signal
678 resistor 18 ohms
680 feedback resistor 18 ohms
682 series capacitor 1 picofarad
684 input resistor 18 ohms
686 input capacitor 2 picofarad
688 inductor 15 nanoHenries
690 antenna input jack
692 filter capacitor
694 resistor 27 ohms
696 operational amplifier
698 filter capacitor 22 picofarads
700 inductor 18 nanoHenries
702 filter capacitor 22 picofarads
704 input resistor 10 ohms
706 inductor 22 nanoHenries
708 optional resistor 18 ohms
710 optional capacitor 2.2 microfarads
712 mixer GaAsFET dual gate
714 capacitor 0.047 microfarads
716 resistor 270 ohms
718 resistor 47 ohms
720 filter capacitor 0.1 microfarads
722 inductor 224 nanoHenries TOKO E528DNAS-100002
724 capacitor 22 picofarads
726 capacitor 100 picofarads
728 connect point
730 mixer LA1175 FM Front End
732 input stage
734 input signal
736 capacitor 0.02 microfarads
738 diode
740 resistor 100 ohms
742 filtering capacitor 10 microfarads
744 external oscillator circuit
746 crystal oscillator
748 capacitor 22 picofarads
750 parallel capacitor 27 picofarads
752 TOKO E538DNAS-100084, 290 nanoHenries
754 capacitor 0.001 microfarads
756 filter network
758 resistor 10 k ohms
760 resistor 39 ohms
762 filter capacitor 0.02 microfarads
764 filter capacitor 0.02 microfarads
766 external transformer T3 Sumida 4199-038
768 one internal coil
770 resistor 100 ohms
772 filter capacitor 0.02 microfarads
774 capacitor load network
776 second internal/magnetically-coupled coil
778 capacitor 47 picofarads
780 internal mixed signal
782 resistor 330 ohms
784 resistor
786 capacitor
788 ceramic filter
790 Second IF signal
792 LA1145 FM IF Quadrature Detection IC
794 resistor 330 ohms
796 capacitor 0.02 microfarads
798 trim potentiometer 100 ohms
800 resistor 39 k ohms
802 resistor 100 k ohms
804 parallel resistor 99 k ohms
806 parallel capacitor 2.2 microfarads
808 trim potentiometer 20 k ohms
810 capacitor 0.02 microfarads
812 parallel resistor 10 k ohms
814 mylar parallel capacitor 0.001 microfarads
816 inductor 2.2 microHenries
818 capacitor 0.02 microfarads
820 capacitor 10 microfarads
824 output network
826 resistor 10 k ohms
828 capacitor 0.1 microfarads
830 resistor 22 k ohms
832 detect coil Sumida 2217-754 and 2218-457
834 resistor 6 k8 ohms
836 capacitor 0.02 microfarads
838 capacitor 10 microfarads
840 resistor 6 k2 ohms
842 capacitor 1 microfarad
844 buffered composite signal
846 transistor
848 resistor 2 k2 ohms
850 mylar capacitor 0.047 microfarads
852 resistor 2 k2 ohms 854 LA3430 PLL FM MPX Stereo Demodulator
856 resistor 10 ohms
858 parallel capacitor 0.1 microfarad
860 parallel capacitor 100 microfarad
862 external filter circuit
864 mylar capacitor 0.22 microfarads
866 resistor 4 k7 ohms
868 capacitor 1 microfarad
870 pilot cancel circuit
872 pilot cancel potentiometer 100 k ohms
874 mylar capacitor 0.0033 microfarad
876 capacitor 0.022 microfarads
878 separation adjust circuit
880 separation adjust potentiometer 5 k ohms
882 capacitor 390 picofarads
884 coupling capacitor 100 microfarads
886 resistor 8 k2 ohms
888 ceramic resonator
890 capacitor
892 capacitor 1 microfarad
894 mylar capacitor 0.01 microfarads
896 input network
898 resistor 16 k ohms
900 capacitor 1 microfarad
902 diode
904 diode
906 resistor 6 k8 ohms
908 resistor 3 k3 ohms
910 resistor 3 k3 ohms
912 filtered left signal
914 filtered right signal
916 resistor 1 k5 ohms
918 compandor input adjust potentiometer
920 resistor 22 k ohms
922 operational amplifier
924 feedback resistor 100 k ohms
926 mylar feedback capacitor 470 picofarads
928 voltage divider
930 resistor 680 ohms
932 resistor 680 ohms
934 filter capacitor 0.1 microfarads
936 filter capacitor 10 microfarads
938 voltage divider capacitor 220 microfarads
940 connect point
942 programmable analog expander IC NE/SA572
944 external filter circuit
946 external operational amplifier circuit
948 filter capacitor 1 microfarad
950 filter capacitor 1 microfarad
952 coupling capacitor 10 microfarads
954 mylar coupling capacitor 3.3 microfarads
956 resistor 30 k ohms
958 mylar parallel capacitor 0.01 microfarads
960 resistor 3 k3 ohms
962 mylar biasing capacitor 0.022 microfarads
964 filtering capacitor 10 microfarads
966 THD adjust trim potentiometer 20 k ohms
968 center tap resistor 510 k ohms
970 resistor 27 k ohms
972 filter capacitor 0.1 microfarads
974 center tap
976 THD control signal
978 operational amplifier
980 grounding resistor 56 k ohms
982 feedback capacitor 100 picofarads
984 series feedback resistor 18 k ohms
986 series feedback resistor 62 k ohms
988 feedback capacitor 0.0047 microfarads
990 resistor 1 k ohms
992 mylar filter capacitor 4.7 microfarads
994 output resistor 620 ohms
996 coupling capacitor 10 microfarads
998 A left audio output breakout jack
998 B right audio output breakout jack
1000 external listening device
1002 pnp transistor
1004 pnp transistor
1006 power resistor 1 k ohms
1008 common point
1010A pnp transistor
1010A pnp transistor
1012A base resistor 10 k ohms
1012B base resistor 10 k ohms
1014A filter capacitor 10 microfarads
1014B filter capacitor 10 microfarads
1016A bias resistor 1 k8 ohms
1016B bias resistor 1 k8 ohms
1018A JFET
1018B JFET
1020A isolation resistor 47 k ohms
1020B isolation resistor 47 k ohms
1022 resistor 10 k ohms
1024 junction point
1026 resistor 4 k7 ohms
1028 power jack
1030 voltage divider
1032 filter capacitor 1 microfarad
1034 resistor 1 k ohms
1036 resistor 18 k ohms
1038 zener diode
1040 diode
1042 resistor 100 k ohms
1044 pnp transistor
1046 resistor 1 k ohms
1048 resistor 10 k ohms
1050 filter capacitor 0.1 microfarad
1052 pnp transistor
1054 base resistor 10 k ohms
1056 current limiting resistor 1 k ohms
1058 light emitting diode
1060 breakout power jack
1062 power diode
1064 12 V regulator 7812
1066 filter capacitor 1000 microfarads
1068 filter capacitor 0.1 microfarads
1070 9 V regulator 7809
1072 filter capacitor 0.1 microfarads
1074 pnp 5 V transistor
1076 voltage divider
1078 resistor 24 k ohms
1080 resistor 62 k ohms
1082 mylar filter capacitor 10 microfarads

TABLE II

APPENDIX
TEN GROUPS OF DISTINCT CARRIER
FREQUENCIES ABOVE 900 MHz

| HOUSE CODE | CARRIER FREQUENCY (MHz) | | |
|---|---|---|---|
| SELECT SWITCH POSITIONS | CHANNEL A | CHANNEL B | CHANNEL C |
| 1 | 902.8 | 923.6 | 925.2 |

TABLE II-continued

APPENDIX
TEN GROUPS OF DISTINCT CARRIER
FREQUENCIES ABOVE 900 MHz

| HOUSE CODE | CARRIER FREQUENCY (MHz) | | |
|---|---|---|---|
| SELECT SWITCH POSITIONS | CHANNEL A | CHANNEL B | CHANNEL C |
| 2 | 903.6 | 917.2 | 924.4 |
| 3 | 918.8 | 922.8 | 926.0 |
| 4 | 920.4 | 922.0 | 926.8 |
| 5 | 921.2 | 919.6 | 915.6 |
| 6 | 918.0 | 916.4 | 914.8 |
| 7 | 904.4 | 906.8 | 910.0 |
| 8 | 905.2 | 907.6 | 911.6 |
| 9 | 906.0 | 909.2 | 914.0 |
| 10 | 908.4 | 910.8 | 912.4 |

Without further elaboration, the foregoing will so fully illustrate the invention that others may, by applying current or future knowledge, adopt the same for use under various conditions or service.

I claim:

1. A system for transmitting and receiving plural electrical signals, each of said plural electrical signals representing respective electrical input signals provided from at least respective first and second high fidelity audio sources to said system, said system comprising:

(a) transmitter means comprising:

(1) input means for receiving said plural electrical signals;

(2) selectable sinusoidal carrier signal producing means for selectably providing at least a first group of sinusoidal carrier signals from plural groups of plural sinusoidal carrier signals, each of said groups comprising at least a first carrier signal and a second carrier signal, said first carrier signal of each of said groups being associated with said first audio source, said second carrier signal of each of said groups being associated with said second audio source, each of said sinusoidal carrier signals of each of said group being preselected and different from the others of said groups and at a frequency of at least 900 MHz, said selectable sinusoidal carrier signal producing means comprising a set of frequency synthesizer means, one respective frequency synthesizer means for each of said electrical input signals, said frequency synthesizer means generating said different sinusoidal carrier signals of said frequency of at least 900 MHz;

(3) modulating means for modulating each of said carrier signals of said first group with a respective one of said plural electrical signals to produce a plurality of modulated carrier signals;

(4) combining means for combining said modulated carrier signals into a combined signal;

(5) antenna means for radiating said combined signal over the air; and (b) receiver means for receiving said combined signal.

2. The system of claim 1 wherein each of said frequency synthesizer means comprises a local oscillator and wherein each of said local oscillators has a Q value of approximately 400 and each of said oscillator has a respective output.

3. The system of claim 2 wherein said transmitter means additionally comprises high impedance buffering means coupled directly to said respective output of each oscillator, said high impedance buffering means isolating said oscillators from said antenna means.

4. The system of claim 3 wherein each of said frequency synthesizer means further comprises means for varying the frequency of said local oscillator.

5. The system of claim 4 wherein said transmitter means comprises a first microcontroller having means for storing digital information representing a desired carrier frequency for each one of said oscillators.

6. The system of claim 5 wherein each of said synthesizer means provides a reference signal and further comprises a frequency divider and means for accepting said stored digital information.

7. The system of claim 6 wherein each of said oscillators provides an output signal to a respective one of said frequency dividers, and each of said frequency dividers provides a first signal having a frequency equal to the frequency of said output signal divided down by a factor determined by said stored digital information.

8. The system of claim 7 wherein each of said synthesizer means further comprises a comparator which compares the frequency of said first signal to the frequency of said reference signal and generates a second signal representing the difference between the frequencies of said first signal and said reference signal.

9. The system of claim 8 wherein said second signals are connected to respective ones of said oscillators, and wherein said means for varying the frequency of said oscillator is responsive to said second signal, to equalize the frequencies of said first signal and said reference signal.

10. The system of claim 1 wherein said electrical input signals are stereo audio signals.

11. The system of claim 1 wherein said receiver means comprises:

(a) antenna means for receiving said combined signal;

(b) means, coupled to said antenna means, for selecting one of said plurality of modulated carrier signals of said received combined signal;

(c) means, coupled to said selecting means, for demodulating said selected one of said plurality of modulated carrier signals into a demodulated signal;

(d) means for connecting said receiver means to a transducer means for converting said demodulated signal into its associated electrical input signal.

12. The system of claim 11 wherein said receiver means further comprises a first oscillator and high impedance buffering coupled directly to an first oscillator output for isolating said first oscillator from said antenna means.

13. The system of claim 12 wherein said means for demodulating further comprises a synthesizer, said synthesizer being connected to and having a means for varying the frequency of said oscillator.

14. The system of claim 13 wherein said receiver means further comprises a second microcontroller with a means for storing digital information representing the frequencies of said plurality of carrier signals.

15. The system of claim 14 wherein said synthesizer further provides a reference signal, and further comprises a frequency divider and means for accepting said stored digital information.

16. The system of claim 15 wherein said oscillator provides an output signal to said frequency divider, said frequency divider providing a first signal having a frequency equal to the frequency of said output signal divided down by a factor determined by said stored digital information.

17. The system of claim 16 wherein said synthesizer further comprises a comparator which compares the frequency of said first signal to the frequency of said reference signal and generates a second signal representing the difference between the frequencies of said first signal and said reference signal.

18. The system of claim 17 wherein said second signal is connected to said oscillator, and wherein said means for varying the frequency of said oscillator is responsive to said second signal to equalize the frequencies of said first signal and said reference signal.

19. The system of claim 18 wherein said means for demodulating further comprises a first mixer for mixing said output signal with said selected one of said plurality of modulated carrier signals to generate a first intermediate frequency signal.

20. The system of claim 19 wherein said means for demodulating further comprises a second oscillator of a constant frequency which produces a second output signal and a second mixer for mixing said second output signal with said first intermediate frequency signal to generate a second intermediate frequency signal.

21. The system of claim 1 wherein said selectable sinusoidal carrier signal producing means further comprises a microcontroller and a multi-position switch, said switch being connected to said microcontroller.

22. The system of claim 21 wherein said electrical input signals comprise three stereo audio signals.

23. The system of claim 22 wherein said transmitter means provides ten groups of carrier signals, and wherein each of said groups includes a set of three carrier signals, one for each of said electrical input signals.

24. The system of claim 1 wherein said receiver means comprises:

(a) antenna means for receiving said combined signal;

(b) means, coupled to said antenna means, for demodulating a selected one of said plurality of modulated carrier signals;

(c) first selecting means for selecting one of said groups of carrier signals in accordance with said group selected in said transmitter means;

(d) second selecting means, coupled to said first selecting means, for selecting said one of said plurality of modulated carrier signals of said received combined signal, said second selecting means being coupled to, and directing, said demodulating means to demodulate said selected one of said plurality of modulated carrier signals into a demodulated signal, and (e) means for connecting said receiver means to a transducer means for converting said demodulated signal into its associated electrical signal.

25. The system of claim 24 wherein said receiver means further comprises a first oscillator and high impedance buffering coupled directly to an first oscillator output for isolating said first oscillator from said antenna means.

26. The system of claim 25 wherein said means for demodulating further comprises a synthesizer, said synthesizer being connected to and having a means for varying the frequency of said oscillator.

27. The system of claim 26 wherein said receiver means further comprises a second microcontroller with a means for storing digital information representing the frequencies of said plurality of carrier signals.

28. The system of claim 27 wherein said synthesizer further provides a reference signal, and further comprises a frequency divider and means for accepting said stored digital information.

29. The system of claim 28 wherein said oscillator provides an output signal to said frequency divider, said frequency divider providing a first signal having a frequency equal to the frequency of said output signal divided down by a factor determined by said stored digital information.

30. The system of claim 29 wherein said synthesizer further comprises a comparator which compares the frequency of said first signal to the frequency of said reference signal and generates a second signal representing the difference between the frequencies of said first signal and said reference signal.

31. The system of claim 30 wherein said second signal is connected to said oscillator, and wherein said means for varying the frequency of said oscillator is responsive to said second signal to equalize the frequencies of said first signal and said reference signal.

32. The system of claim 31 wherein said means for demodulating further comprises a first mixer for mixing said output signal with said selected one of said plurality of modulated carrier signals to generate a first intermediate frequency signal.

33. The system of claim 32 wherein said means for demodulating further comprises a second oscillator of a constant frequency which produces a second output signal and a second mixer for mixing said second output signal with said first intermediate frequency signal to generate a second intermediate frequency signal.

34. The system of claim 1 wherein said transmitter means comprises a means for creating a pilot signal to inform said receiver means of normal operation of said transmitter means, said pilot signal being combined with each of said electrical input signals, said pilot signal being created independently of said sinusoidal carrier signal producing means.

35. The system of claim 34 wherein said transmitter means comprises an automatic suppression means coupled to said pilot signal creation means to prevent the transmission of said pilot signal to said receiver means in response to an undesirable condition present in said transmitter means, such suppression automatically occurring for the duration of said undesirable condition.

36. The system of claim 35 wherein said receiver means comprises demodulation means, said demodulation means including a pilot signal detection means for determining the presence or absence of said pilot signal.

37. The system of claim 36 wherein said receiver means provides an audio output and includes a muting means, coupled to said pilot signal detection means, to silence said audio output whenever said pilot signal is absent.

38. The system of claim 36 wherein said receiver means includes an externally coupled listening device and a pilot signal elimination means, said pilot signal elimination means being coupled to said pilot detection means, to eliminate said pilot signal, independently of said externally coupled listening device, after said pilot signal is detected by said receiver means.

* * * * *